(12) United States Patent
Kopman et al.

(10) Patent No.: US 11,719,504 B1
(45) Date of Patent: Aug. 8, 2023

(54) PROJECTILE FEEDING AND LAUNCHING SINGLE MOTOR MECHANISMS

(71) Applicant: Hasbro, Inc., Pawtucket, RI (US)

(72) Inventors: Vladislav Kopman, New York, NY (US); Robert James Victor, New York, NY (US)

(73) Assignee: HASBRO, INC., Pawtucket, RI (US)

( * ) Notice: Subject to any disclaimer, the term of this patent is extended or adjusted under 35 U.S.C. 154(b) by 529 days.

(21) Appl. No.: 16/883,697

(22) Filed: May 26, 2020

Related U.S. Application Data

(60) Provisional application No. 62/853,020, filed on May 26, 2019.

(51) Int. Cl.
| | |
|---|---|
| *F41B 4/00* | (2006.01) |
| *B64C 39/02* | (2023.01) |
| *B64D 1/02* | (2006.01) |
| *A63B 69/40* | (2006.01) |
| *B64U 10/13* | (2023.01) |
| *B64U 101/00* | (2023.01) |

(52) U.S. Cl.
CPC ............. *F41B 4/00* (2013.01); *B64C 39/024* (2013.01); *B64D 1/02* (2013.01); *A63B 69/406* (2013.01); *B64U 10/13* (2023.01); *B64U 2101/00* (2023.01)

(58) Field of Classification Search
CPC ................................ A63B 69/406; F41B 4/00
See application file for complete search history.

(56) References Cited

U.S. PATENT DOCUMENTS

| | | | |
|---|---|---|---|
| 1,441,975 A | 1/1923 | Edelin | |
| 1,488,995 A | 4/1924 | McCollom | |
| 2,715,299 A | 8/1955 | Steitz | |
| 2,737,942 A | 3/1956 | Horowitz et al. | |
| 3,054,536 A | 9/1962 | Sagarin | |
| 3,420,133 A | 1/1969 | Proll | |
| 3,990,426 A | 11/1976 | Stokes | |
| 4,170,215 A | 10/1979 | Kettlestrings | |
| 4,248,202 A | 2/1981 | Jaworski et al. | |
| 4,323,048 A * | 4/1982 | Saito ................... | A63B 69/406 124/78 |
| 4,659,320 A | 4/1987 | Rich et al. | |
| 4,723,532 A | 2/1988 | Osojnak | |
| 4,841,945 A | 6/1989 | Braden | |
| 4,890,404 A | 1/1990 | Ferri | |
| 5,471,967 A | 12/1995 | Matsuzaki et al. | |

(Continued)

*Primary Examiner* — John A Ricci
(74) *Attorney, Agent, or Firm* — Perry Hoffman

(57) ABSTRACT

Apparatus and methods of toy projectile storage, feeding and launch structures having feeding and launching functionality in a single motor combination with a carriage structure including a launch channel being supporting along with a magazine. A propelling mechanism is includes flywheels in communication with the launch channel for propelling projectiles from the magazine. A transmission gear assembly powered with the single motor to sequence and activate the feeding mechanism and the propelling mechanism for activation. Additionally stationary, mobile, dart and projectiles launcher or hand-held structures for propelling darts, balls or other projectiles. The flywheels include an elastomeric expanding flywheel structure mechanism with a flywheel hub and an expanding elastomeric tire allowing the expanding elastomeric tire to move inward and outward along a peripheral circumference.

20 Claims, 45 Drawing Sheets

(56) References Cited

U.S. PATENT DOCUMENTS

| | | | |
|---|---|---|---|
| 5,529,050 A | 6/1996 | D'Andrade | |
| 5,947,101 A * | 9/1999 | Kerr | F41B 4/00 |
| | | | 124/78 |
| 6,093,117 A * | 7/2000 | Sherlock | A63B 69/406 |
| | | | 124/78 |
| 6,488,019 B2 | 12/2002 | Kotsiopoulos | |
| 6,523,535 B2 * | 2/2003 | Rehkemper | F41B 4/00 |
| | | | 124/78 |
| 6,739,325 B1 * | 5/2004 | Paulson | F41B 4/00 |
| | | | 124/78 |
| 7,011,084 B2 | 3/2006 | Richard | |
| 7,040,309 B2 * | 5/2006 | Johndreau | A63B 69/406 |
| | | | 124/78 |
| 7,051,727 B2 | 5/2006 | Wu | |
| 7,111,620 B2 * | 9/2006 | Johndreau | F41B 4/00 |
| | | | 124/78 |
| 8,082,909 B2 | 12/2011 | Sopinsky et al. | |
| 8,127,753 B1 | 3/2012 | Brooks et al. | |
| 8,353,277 B2 | 1/2013 | Huebl | |
| 8,397,705 B2 | 3/2013 | DeHaan et al. | |
| 8,567,378 B2 | 10/2013 | Nugent | |
| 8,695,579 B2 | 4/2014 | Huebl | |
| 8,833,355 B2 | 9/2014 | Paulson | |
| 8,875,688 B2 | 11/2014 | Nugent | |
| 8,955,503 B2 * | 2/2015 | Corsiglia | A63B 69/406 |
| | | | 124/78 |
| 8,967,130 B2 | 3/2015 | Victor et al. | |
| 9,022,016 B1 * | 5/2015 | Hafer | F41B 4/00 |
| | | | 124/78 |
| 9,027,541 B2 | 5/2015 | Huebl | |
| 9,050,520 B2 * | 6/2015 | Lu | A63B 69/002 |
| 9,194,646 B2 | 11/2015 | Victor et al. | |
| 9,389,042 B1 | 7/2016 | Clayton | |
| 9,958,230 B1 | 5/2018 | Nugent et al. | |
| 2002/0166551 A1 | 11/2002 | Lee | |
| 2009/0095272 A1 | 4/2009 | Zimmerman | |
| 2010/0206281 A1 | 8/2010 | Kanitz et al. | |
| 2013/0112184 A1 | 5/2013 | Corsiglia et al. | |
| 2013/0312722 A1 | 11/2013 | Price | |

\* cited by examiner

PROJECTILE FEEDING AND LAUNCHING SINGLE MOTOR MECHANISMS

1. FIELD OF THE INVENTION

The present invention relates to various toy projectile launchers including stationary, mobile surface, or hand-held structures, and more particularly to apparatus and methods employing a single-motor-driven mechanism for energizing projectile-propelling flywheels and a projectile-feeding mechanism in a novel fashion to reduce mechanism mass and cost and provide for automatic and sequenced projectile-launching operation. Alternate flywheel assembly embodiments includes various novel projectile-launching apparatus employing elastomeric expanding flywheel mechanisms.

2. BACKGROUND OF THE INVENTION

Rather than using two separate motors for each flywheel and a third separate motor for the projectile-feeder, the present inventions disclose projectile-feeding mechanisms configured in a novel fashion to reduce mechanism mass and cost using a single motor. Propelling mechanisms include novel elastomeric expanding flywheel structures for expanding elastomeric flywheels to move inward and outward at their circumference. The inventions additionally provide for automatic and sequenced projectile-launching operations through use of a power-transmission element to inject a projectile or dart into a launch-channel for engagement with the projectile-feeding mechanism operating with the single-motor configuration including feeding and launching flywheel operations.

SUMMARY OF THE INVENTION

A single-motor-driven mechanism for energizing projectile-propelling flywheels and a projectile-feeding mechanism, apparatus and methods. A projectile-feeding mechanism is configured to reduce mechanism mass and cost while providing for automatic and sequenced projectile-launching operations in a novel fashion that may be configured within toy projectile-feeding and launching apparatus, with control features that may use remote control (RC) or mountable remotely-operable mobile surface or flight platform structures having single-motor-driven apparatus for energizing projectile-propelling flywheels. The projectile-feeding mechanism disclosed herein operates in accord with the single-motor and flywheels through use of a power-transmission element to inject a projectile or dart into a launch-channel for engagement with rotating flywheels or drive wheels to launch the projectile upon the rotating flywheels being spun-up to a desired projectile-launching rotational speed.

A first embodiment employs a single-motor to power two (2) components, flywheels and projectile-feeding mechanism off a power-transmission element which may include a gear-train, or the like such as pinion gears, rather than using two separate motors for each flywheel and a third separate motor for the projectile-feeder. The gear-train is arranged and timed such that the projectile-feeding mechanisms begins injecting when or after the rotating flywheels have spun-up to desired projectile-launching rotational speed. A second embodiment addresses this projectile-feeding mechanism limitation through the inclusion of a centrifugal clutch, which is located between the flywheel-drive system and the projectile-feed mechanism. A third embodiment employs an actuated-clutch to initiate the projectile-feeding mechanism when a fire-button is activated by the user, after a flywheel-button is activated by the user, to provide power to the motor and spin-up the flywheels.

In a further alternate embodiment the flywheel assembly under-carriage includes a novel projectile-launching apparatus employing elastomeric expanding flywheel mechanisms. The novel elastomeric expanding flywheel structure mechanism includes an expanding elastomeric tire, where the expanding elastomeric tire is facilitated to move inward and outward about its peripheral circumference. The flywheels may each include elastomeric expanding flywheel structure mechanisms such as an expanding elastomeric tire with a flywheel hub allowing the expanding elastomeric tire to move inward and outward at its circumference.

Briefly summarized toy projectile apparatus and methods are disclosed for storage, feeding and launch structures having feeding and launching functionality in a single motor combination with a carriage structure including a launch channel being supporting along with a magazine. A feeding mechanism with the magazine injects projectiles from the magazine into the launch channel. A propelling mechanism is coupled with the carriage structure that includes flywheels in communication with the launch channel for propelling projectiles from the magazine. The propelling mechanism facilitates elastomeric expanding flywheels for expanding elastomeric tires to move inward and outward at their circumference. A transmission gear assembly powered with the single motor to sequence and activate the feeding mechanism and the propelling mechanism for activation. The toy projectile launchers may include stationary, mobile surface, flight platform drone-mounted or hand-held structures, with reduces mechanism mass with automatic and sequenced projectile launching operation.

BRIEF DESCRIPTION OF THE DRAWINGS

For the purpose of facilitating an understanding of the inventions, the accompanying drawings and description illustrate preferred embodiments thereof, from which the inventions, structure, construction and operation, and many related advantages may be readily understood and appreciated.

FIG. 11B allowing for loading individually at quadrants; FIG. 12 B with a Hinged-style magazine structure allowing for the magazine to flip upward allowing full backside loading of the circular magazine.

FIG. 16B showing a cross-sectional view of the elastomeric expanding flywheel structure mechanism of FIG. 16A, illustrating an elastomeric expanding tire rim with an angled inner rim wall and a rounded elastomeric expanding tire retaining feature.

FIG. 16D showing a cross-sectional view of the elastomeric expanding flywheel structure mechanism of FIG. 16C, illustrating an elastomeric expanding tire rim with angled inner and outer rim walls and a tapered retaining feature.

FIG. 16F showing a cross-sectional view of the elastomeric expanding flywheel structure mechanism of FIG. 16E, illustrating an elastomeric expanding tire rim with angled outer rim wall and a straight-walled retaining feature situated radially adjacent to the elastomeric expanding tire rim.

FIG. 16H showing a cross-sectional view of the elastomeric expanding flywheel structure mechanism of FIG. 16G, illustrating an elastomeric expanding tire rim with straight rim walls and a straight-walled retaining feature situated radially adjacent to the elastomeric expanding tire rim.

FIG. 16J showing a cross-sectional view of the elastomeric expanding flywheel structure mechanism of FIG. 16I, illustrating a high mass elastomeric expanding tire rim with straight rim walls and a retaining feature with a rounded outer wall and a hub structure that compresses the elastomeric expanding tire retaining feature.

FIG. 16L showing a cross-sectional view of the elastomeric expanding flywheel structure mechanism of FIG. 16K, illustrating an elastomeric expanding tire rim with a filleted inner rim wall and a straight-walled retaining feature situated radially adjacent to the elastomeric expanding tire rim.

FIG. 16N showing a cross-sectional view of the elastomeric expanding flywheel structure mechanism of FIG. 16M, illustrating an elastomeric expanding tire rim with straight rim walls and a high mass straight-walled retaining feature situated radially adjacent to the elastomeric expanding tire rim.

DETAILED DESCRIPTION OF THE EMBODIMENTS

The following description is provided to enable those skilled in the art to make and use the described embodiments set forth in the best modes contemplated for carrying out the inventions. Various modifications, however, will remain readily apparent to those skilled in the art. Any and all such modifications, equivalents, and alternatives are intended to fall within the spirit and scope of the disclosed inventions.

Figure 1:
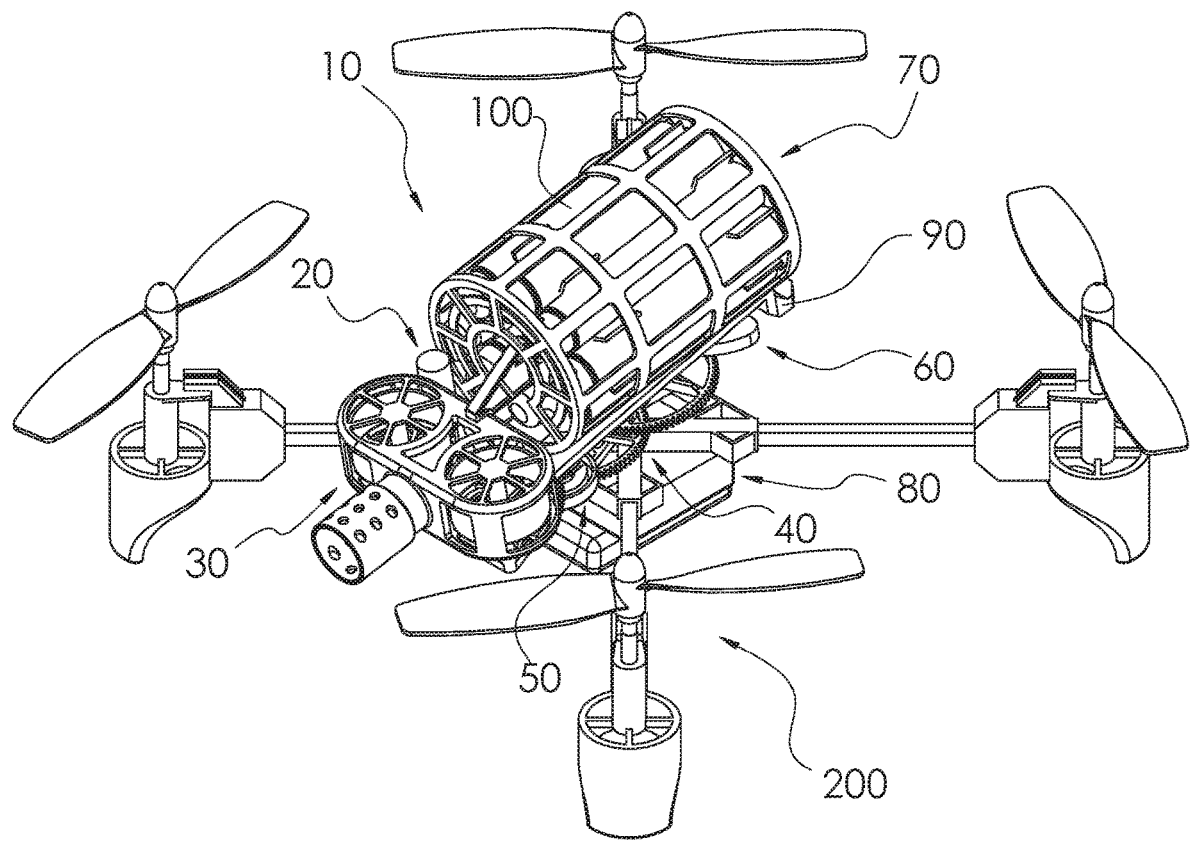
FIG. 1 is a perspective view of a single-motor projectile-launching apparatus in accordance with an embodiment of the present application.
Figure 2:
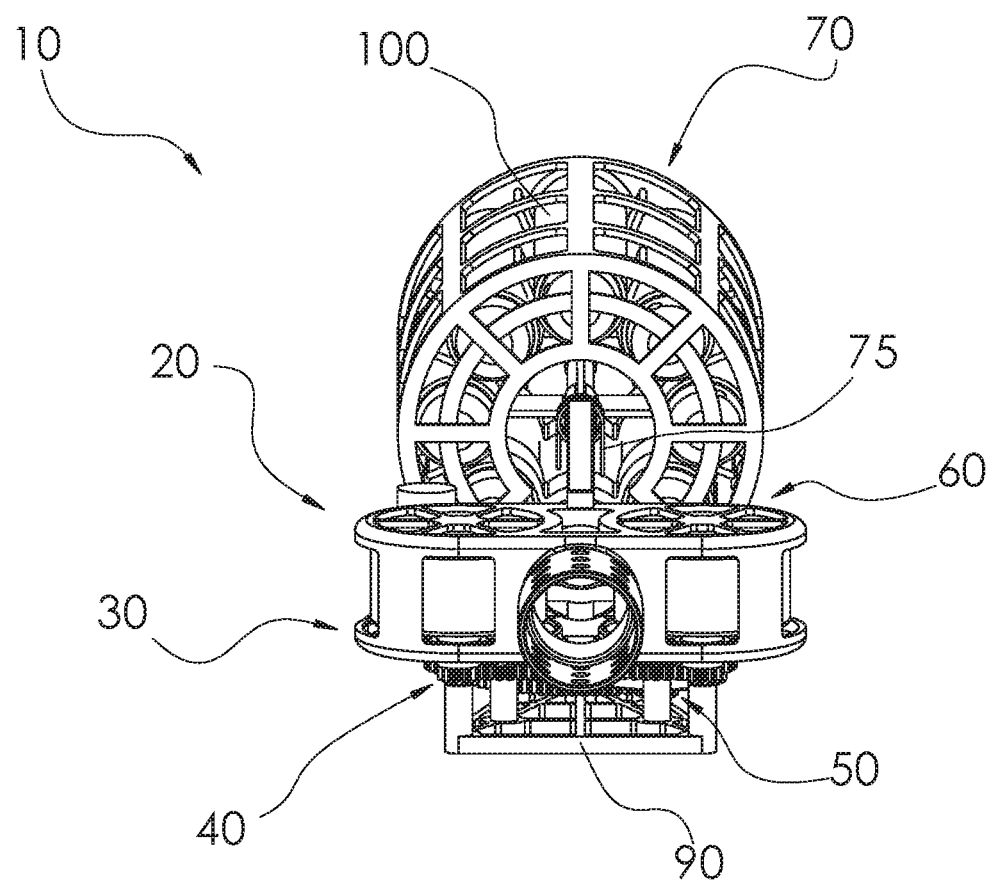
FIG. 2 is a front view of the single-motor projectile-launching apparatus of FIG. 1.
Figure 3:
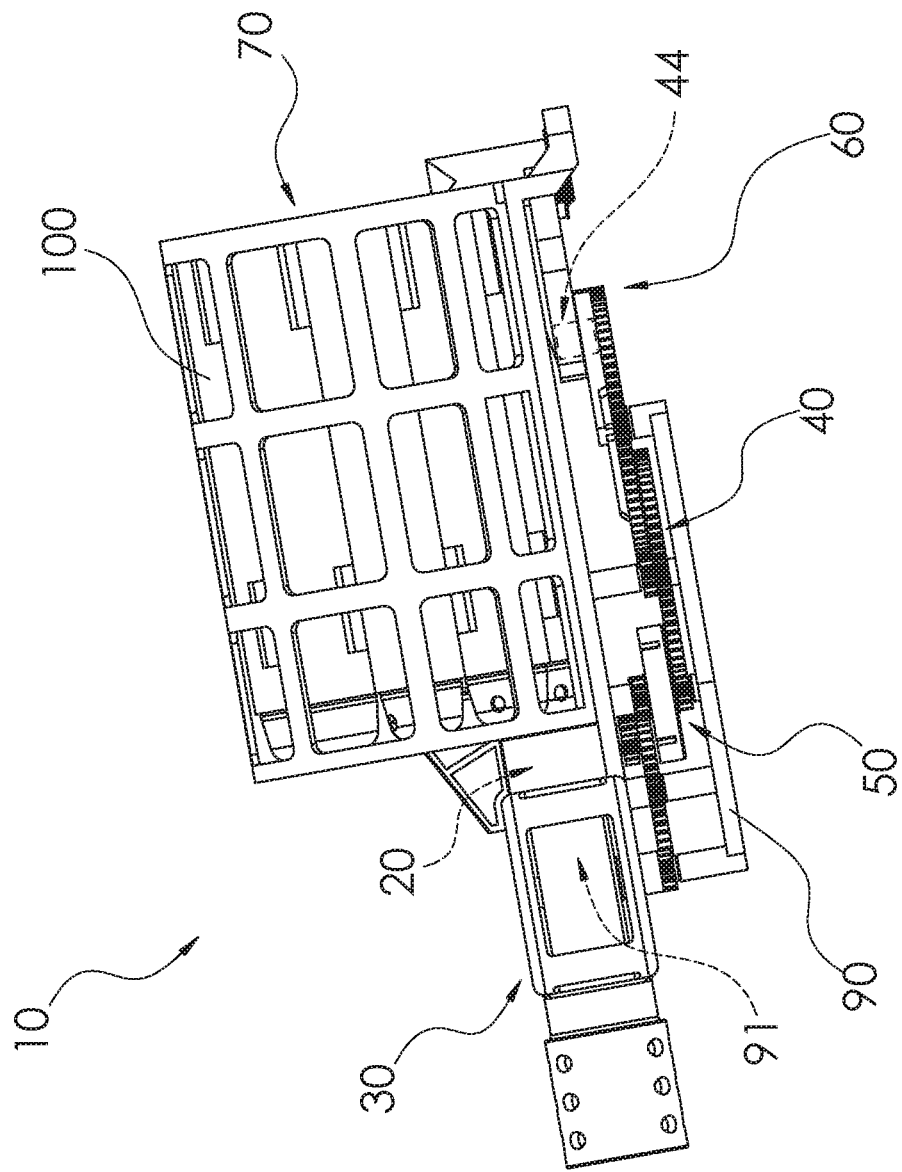
FIG. 3 is a side view of the single-motor projectile-launching apparatus of FIG. 1.
Figure 4:
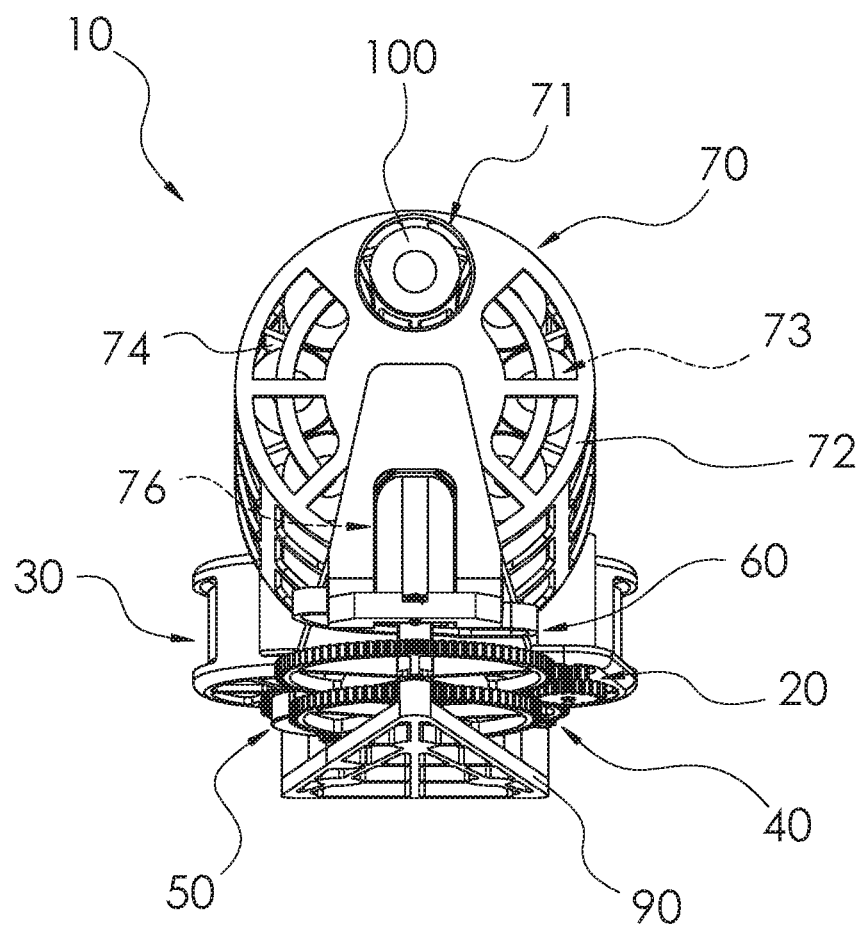
FIG. 4 is a rear view of the single motor projectile-launching apparatus of FIG. 1.

A toy single-motor projectile-launching apparatus 10, as seen in FIGS. 1-4 illustrate the single-motor launching apparatus 10 as including a motor assembly 20, flywheel assembly 30, power-transmission element or gear-train 40 for power transmission which may include the gear-train 40 or the like, such as pinion gears as shown and described further below. The flywheels may each include elastomeric expanding flywheel structure mechanisms such as an expanding elastomeric tire with a flywheel hub allowing the expanding elastomeric tire to move inward and outward at its circumference. The launching apparatus 10 also includes clutching element 50, projectile-feeding mechanism 60, projectile-magazine 70, power and control electronics 80, and housing 90 for launching a projectile or dart 100, mounted on an exemplary mobile platform 200. While a clutching element is illustrated in FIGS. 1-4, any suitable structure for connecting or disconnecting mechanical power or no clutching element may be used, if desired, without departing from the spirit of the inventions. FIGS. 2, 3 and 4 are respective elevational front, side and rear views thereof. Further, the single-motor projectile-launching apparatus may be configured to operate without a mobile platform, if desired. Accordingly the apparatus of FIG. 1 is contemplated as configurable for being used within mobile surface, or flight platform drone-mounted housings such as the structures illustrated with exemplary mounted magazine projectile feeding and launcher mobile platforms as low weight small flying systems.

Darts are loaded by the user into the magazine 70 through an opening 71 (see FIG. 4) at the top-rear of the magazine-housing 72. Upon insertion of a dart 100 into a magazine-slot 73 that is vacant, the magazine-cylinder 74 is rotated within the magazine-housing 72 by the user to expose the next vacant magazine-slot 73 for loading the next dart 100. Structurally a single motion is achieved to rotate magazine and launch. Rotation of the magazine-cylinder 74 primes a return-spring 75 (see FIG. 2) used to rotationally progress the cylinder 74 after a dart 100 is pushed from the magazine 70 and shuttled into a launch-channel 91 (see FIG. 3) during the projectile-launching sequence. The magazine-cylinder 74 is prevented from rotating under force of return-spring 75 by a pawl and ratchet mechanism 76 (see FIG. 4). The pawl and ratchet mechanism 76 is toggleable to allow the magazine-cylinder 74 to progress, under force of the return-spring 75, one dart-position at a time between dart-launches.

Figure 5:
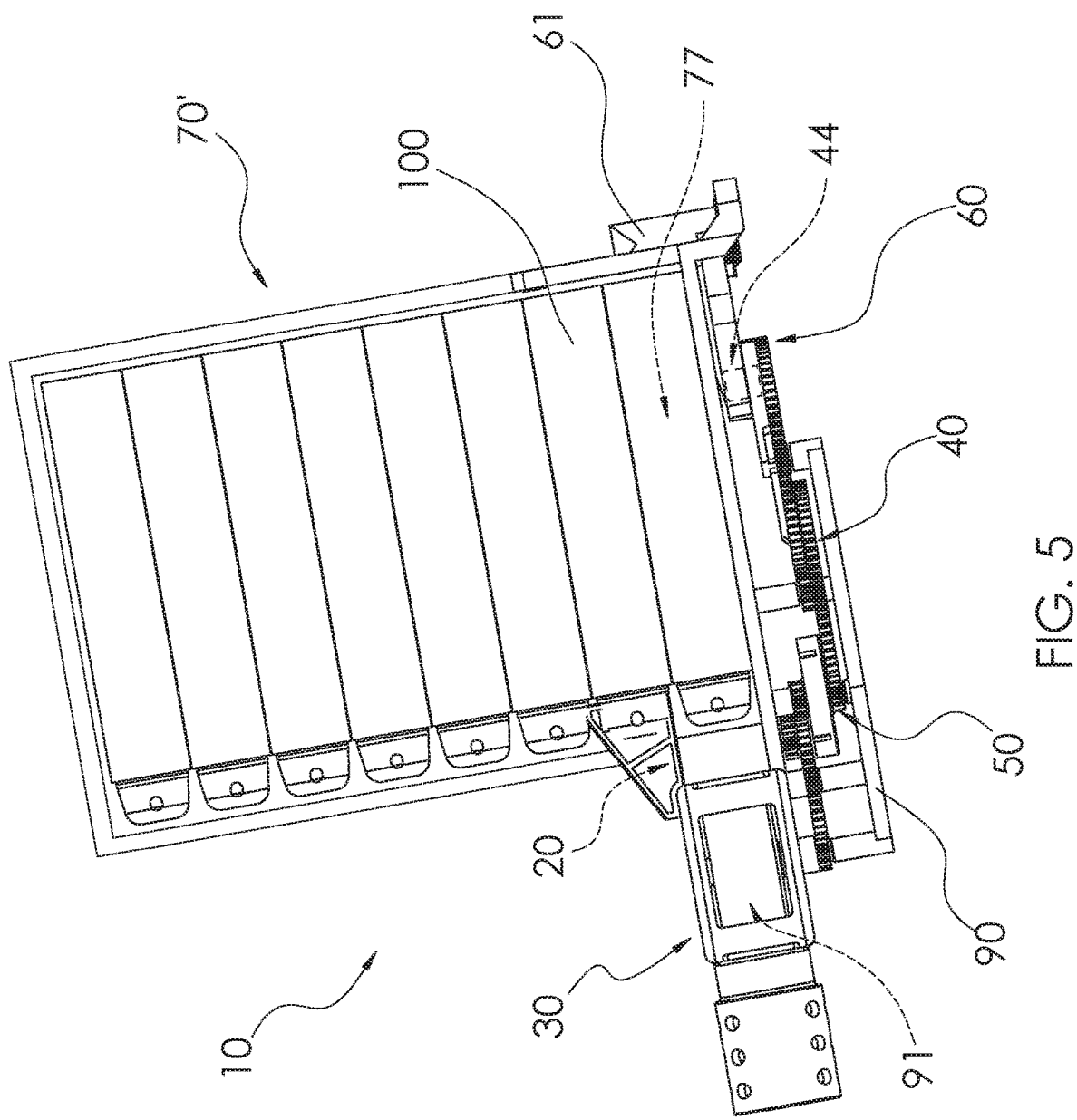
FIG. 5 is a side view of a single-motor projectile-launching apparatus in accordance with an embodiment of the present application with an exemplary vertical-magazine.

While FIGS. 1-4 illustrate a carousel-style magazine, any form of projectile- or dart-retaining magazine may be used, if desired, including an alternate gravity-fed box magazine 70' that stacks darts vertically (employed numerals primes ', '', ''', et. seq. designations referenced with drawings herein to exemplify alternate componentry/alternate described embodiments). FIG. 5 shows an example Vertical-magazine, where the box magazine 70' retains darts 100 in at least one vertical stack such that the force of gravity draws the darts into a chamber 77 within the housing 90 for transfer into the launch channel 91 by the projectile-feeder 61.

Figure 11A:
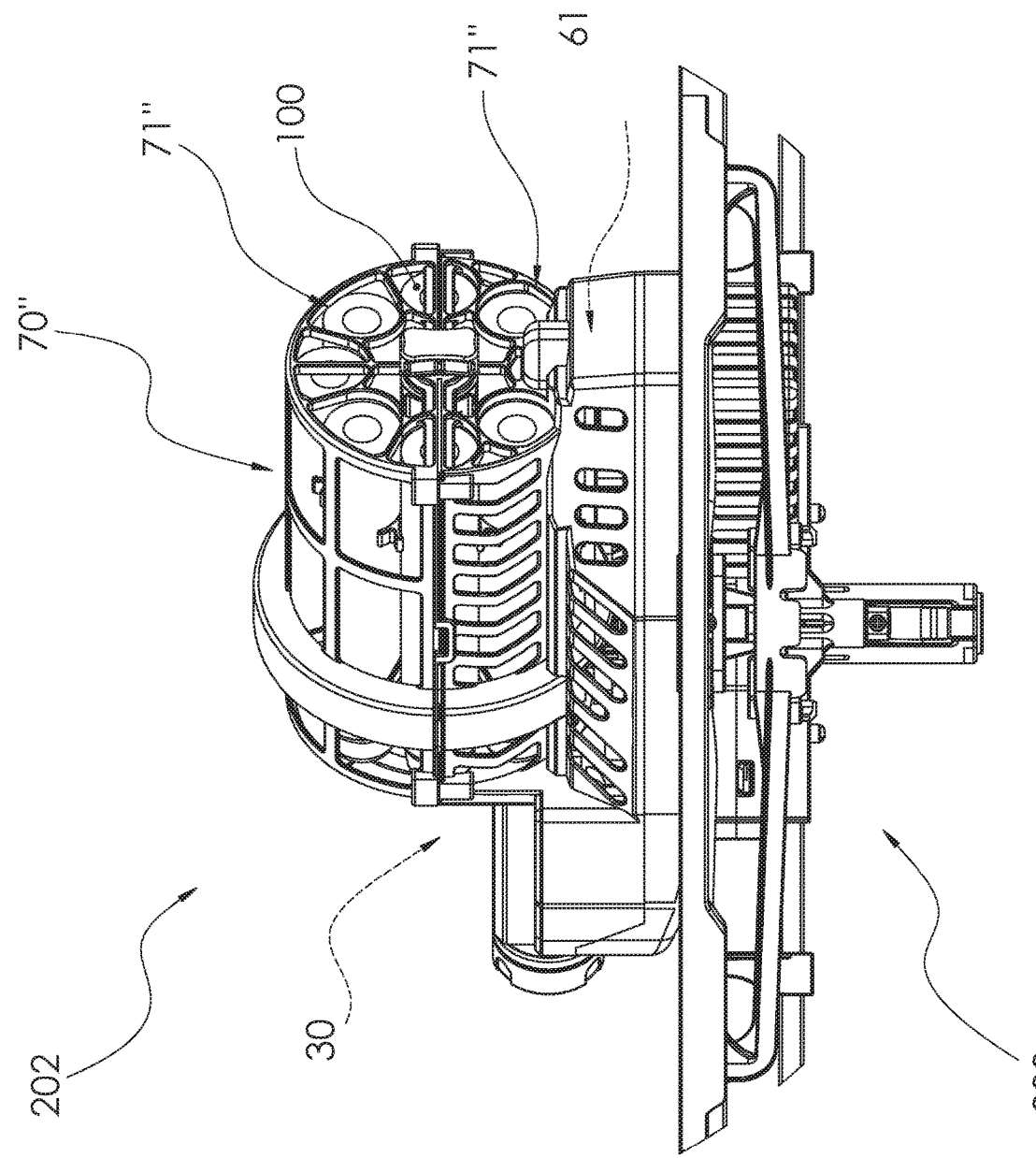
FIGS. 11A-11B and 12A-12B illustrate alternative Static and Hinged-style magazines.
Figure 11B:
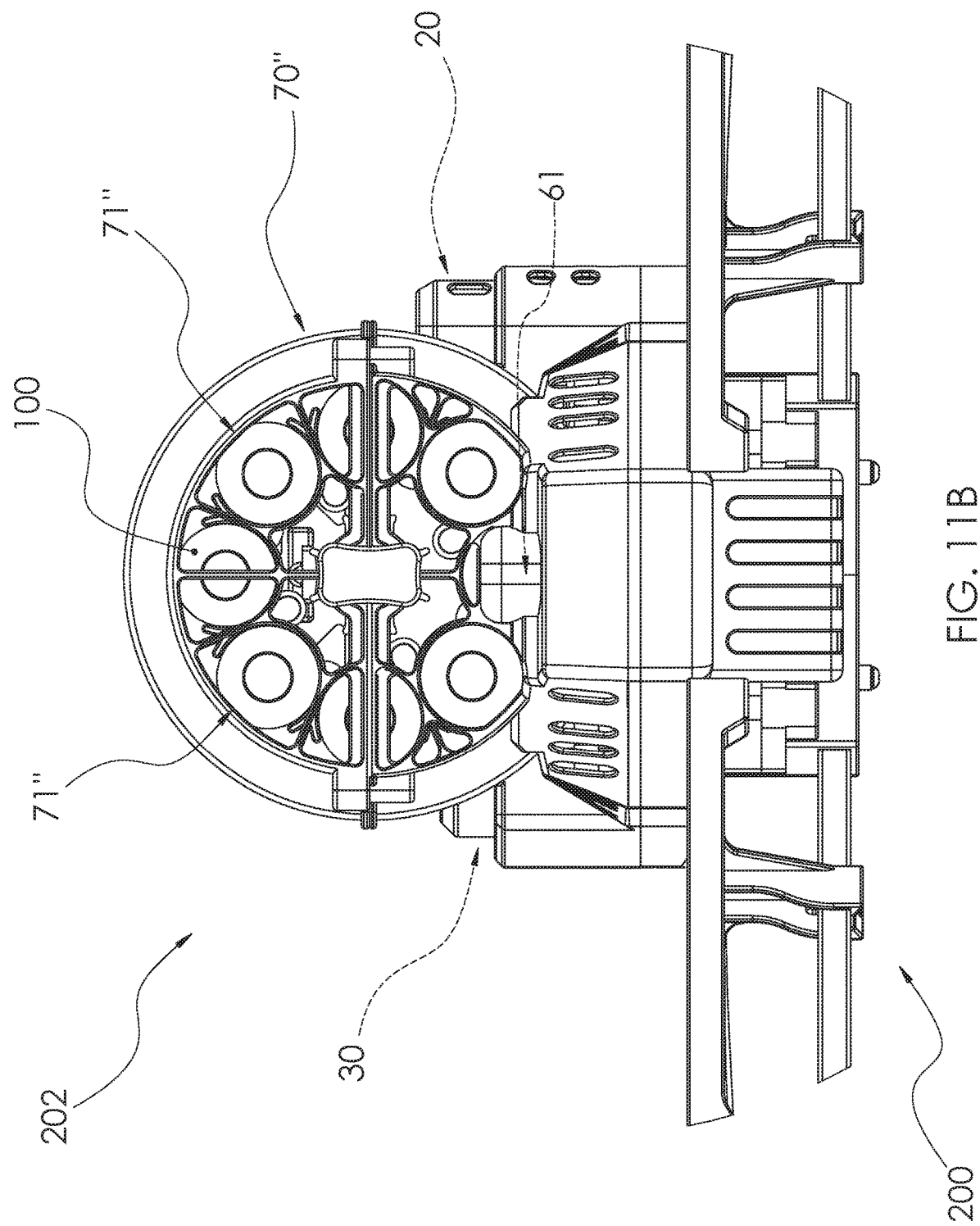
Figure 12A:
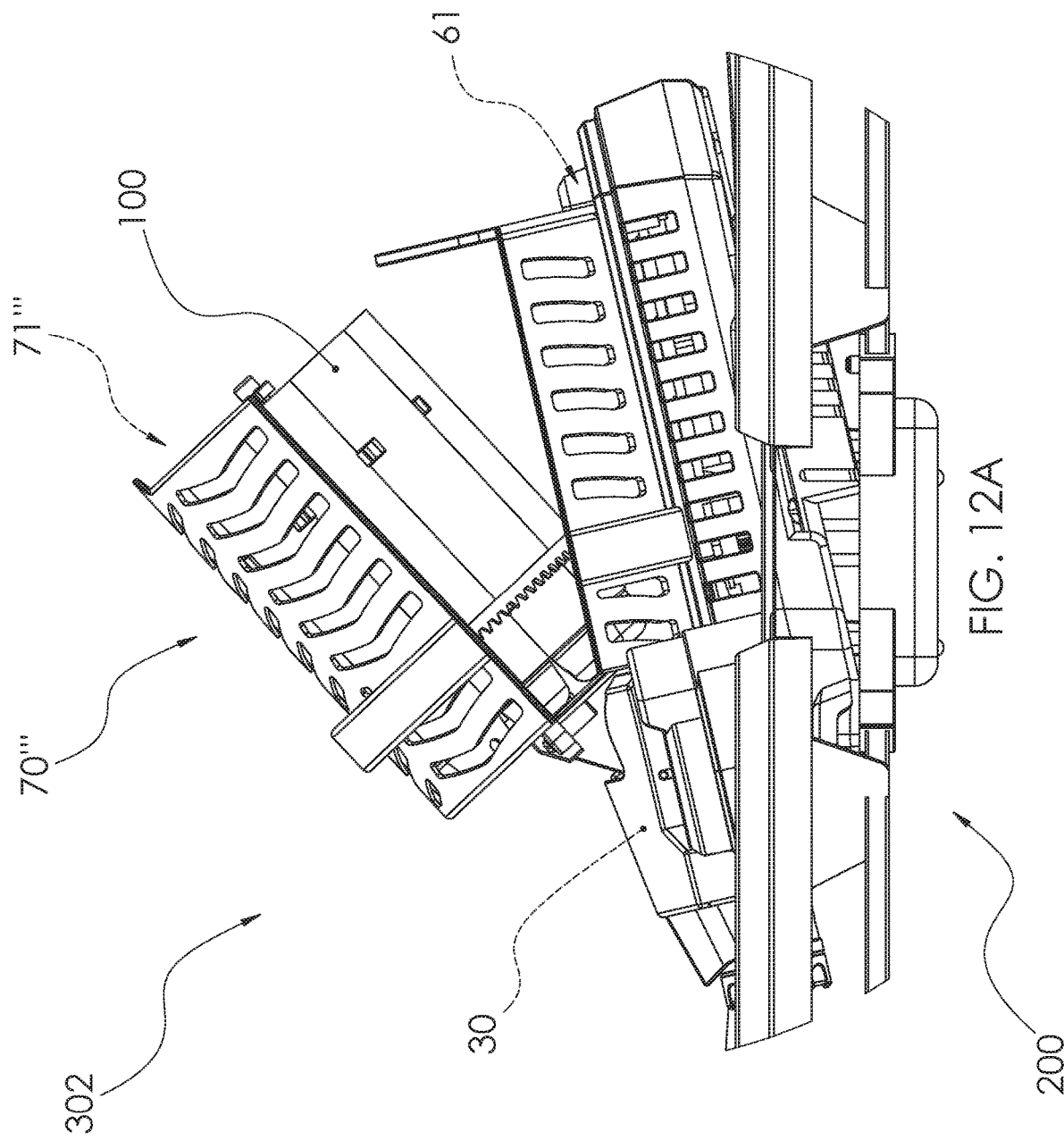
Figure 12B:
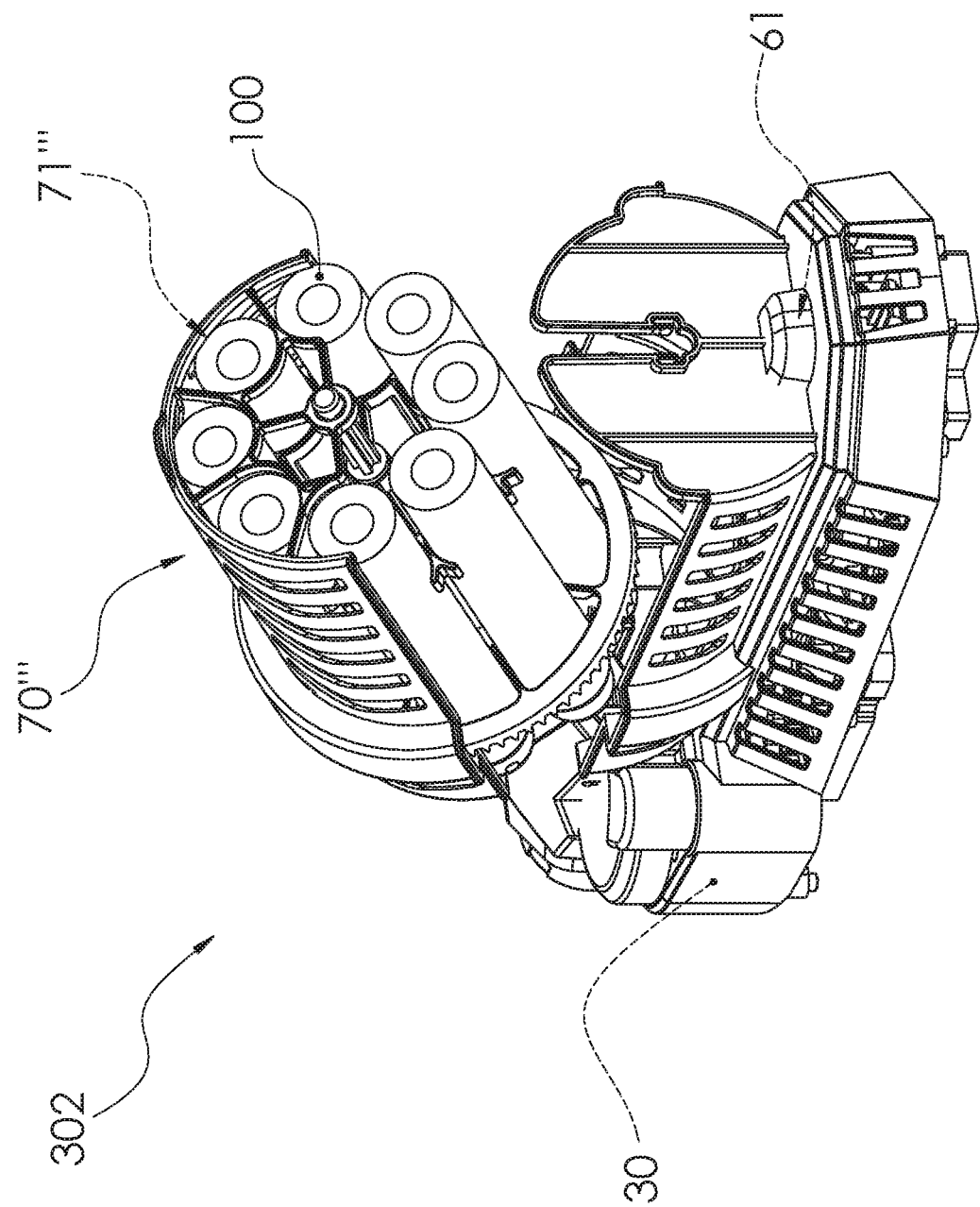

FIGS. 11A-11B and 12A-12B illustrate alternate Static Barrel and Hinged-style magazines, as dart-retaining magazines that may be used alternatively. For example, FIG. 11B illustrated an exemplary static-magazine allowing for the static loading individually of four (4) darts at four quadrants in the unobstructed corners of the circular magazine, as opposed to darts only being loaded by the user into the magazine 70 through an opening 71 (see FIG. 4) at the top-rear of the magazine-housing 72. FIG. 12 B shows a Hinged-style magazine structure allowing for the magazine to flip upward allowing eight (8) darts as illustrated in the entirely unobstructed backside of the circular magazine. For a given fixed dimension and payload-carrying capacity (allowable payload mass) of the craft, the number of darts allowable onboard relates to the dart size and mass. For example, one (1) 8 g dart/projectile may take the place of eight (8) 1 g darts. Similarly, six (6) 1.3 g darts or three (3) 2.6 g darts may be, instead, implemented. Alternatively, providing additional payload-carrying capacity to the craft by, for example, mass-reducing other structures, providing a more powerful propulsion system (i.e. batteries, motors, propellers, etc.), and/or increasing the scale of the craft would allow additional darts to be sufficiently supported.

Figure 6:
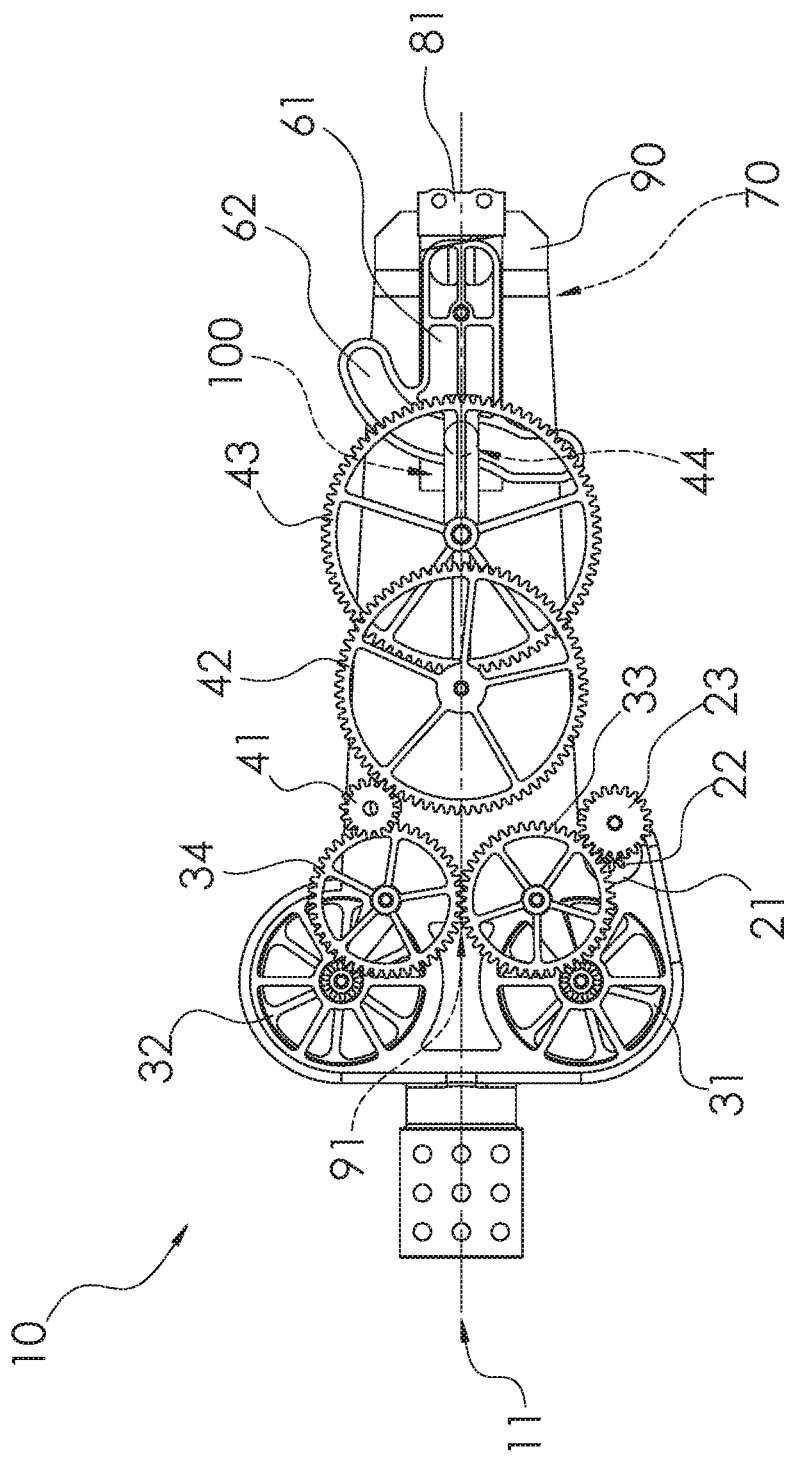
FIG. 6 is an under-carriage view of a single-motor projectile-launching apparatus in accordance with an embodiment of the present application including a clutch-less projectile-feeding mechanism.
Figure 9:
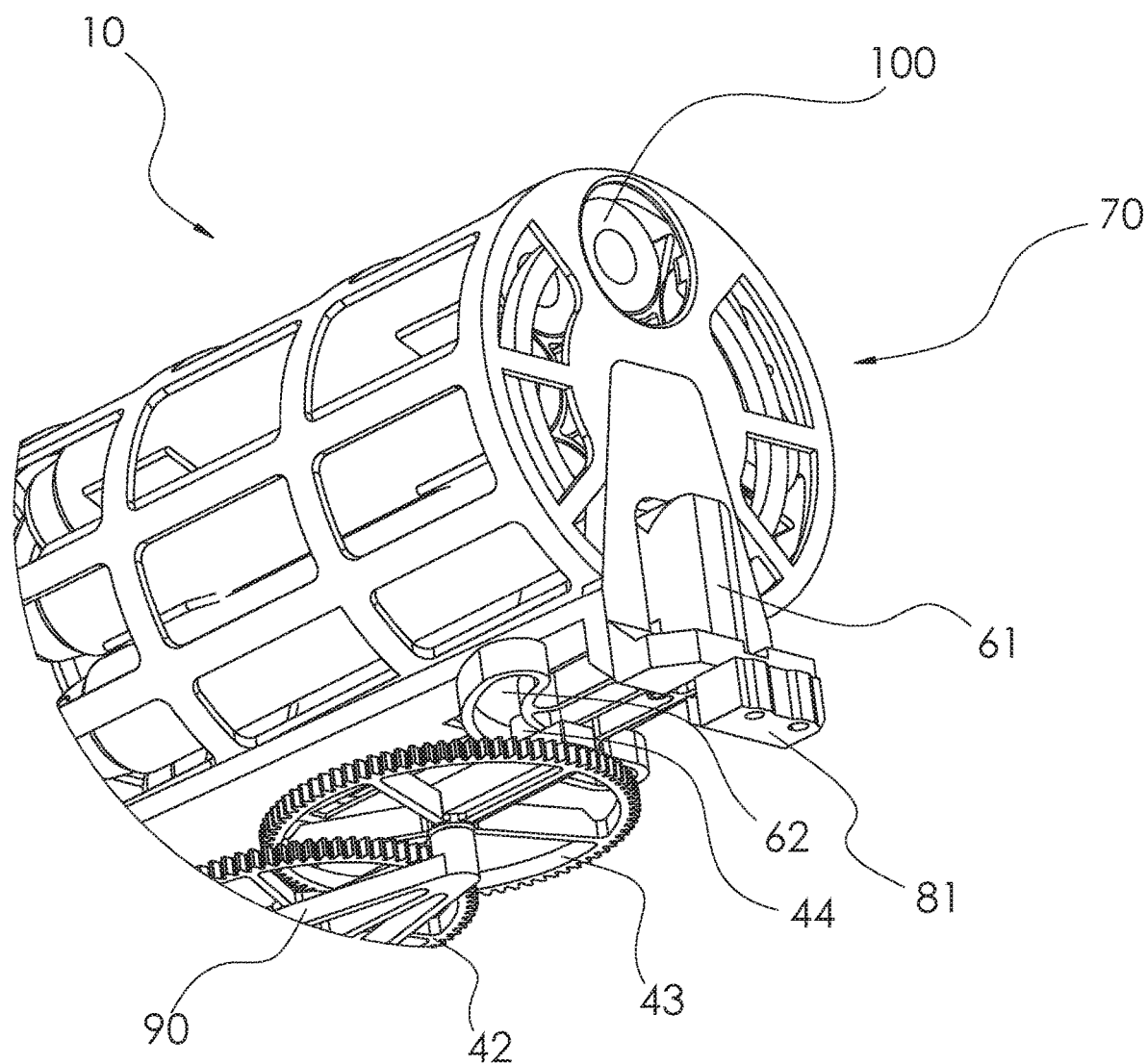
FIG. 9 shows a detailed view of a single-motor projectile-launching apparatus in accordance with an embodiment of the present application showing a cam and follower interaction between a follower-gear and a projectile-feeder.

FIG. 6 is an under-carriage view of a single-motor projectile-launching apparatus in accordance with an embodiment of the present application including a clutch-less projectile-feeding mechanism. FIG. 6 illustrates the first embodiment where a pinion 22 of a motor 21 is meshed to an output-gear 23 of motor assembly 20. The output-gear 23 drives a first idler-gear 33 that is meshed to a first flywheel 31 and to a second idler-gear 34 of the same tooth count as the first idler-gear 33. The second idler-gear 34 is meshed to a second flywheel 32 and to the input of a compound-gear 41. The output of the compound-gear 41 is meshed to the input of a compound-gear 42. The output of the compound-gear 42 is meshed to the input of a follower-gear 43 that may also be referred to as a crank gear. The follower 44 or crank gear in mechanical communication with the follower-gear 43 is engaged with the cam 62 of the projectile-feeder 61 (see FIG. 9). The projectile-feeder 61 translates freely along an axis 11 such that a dart 100 can be shuttled from the magazine 70 into the launch-channel 91 for engagement with the flywheels 31 and 32 for launching the dart 100 in the usual way. FIG. 9 has the single-motor projectile-launching apparatus with its cam and follower interaction between a follower-gear and a projectile-feeder.

The cam 62 of the projectile-feeder 61 is shaped and formed to allow the follower-gear 43 to rapidly accelerate the projectile-feeder 61 in the direction that pushes or shuttles a dart 100 from the magazine 70 into engagement with the flywheels 31 and 32. The cam 62 may also be referred to as a yoke having cam track or cam wall surface within in mechanical communication with the follower 44 of the follower-gear 43 as a crank gear cam mechanism. The cam 62 is also formed and shaped to allow the projectile-feeder 61 to dwell in its fully forward position, distal to its retracted-position, for a pre-determined time after a dart 100 has been injected into engagement with the flywheels 31 and 32. The cam 62 is further formed and shaped to allow the projectile-feeder 61 to return to its retracted-position after the dwell time has elapsed via a spring biased cam follower from the transmission gear assembly to engage and shuttle a dart from the magazine. The velocity profile as between a quick start, dwell and slow return come back are defined accordingly for respective rate of shooting and return with the elapsed dwell time profile. The feeding mechanism is thus provided with spring biased cam follower from the transmission gear assembly. The spring biased cam follower which extends and retracts between a first extended and a second retracted position to engage and shuttle additional projectiles from the magazine, returning to the second retracted position to engage another projectile from the magazine. It will become apparent to anyone skilled in the art that the cam 62 may be formed and shaped in a way that allows for any order or combination of the aforementioned or otherwise possible projectile-feeder 61 motions as desired without departing from the spirit of the inventions.

Figure 13A:
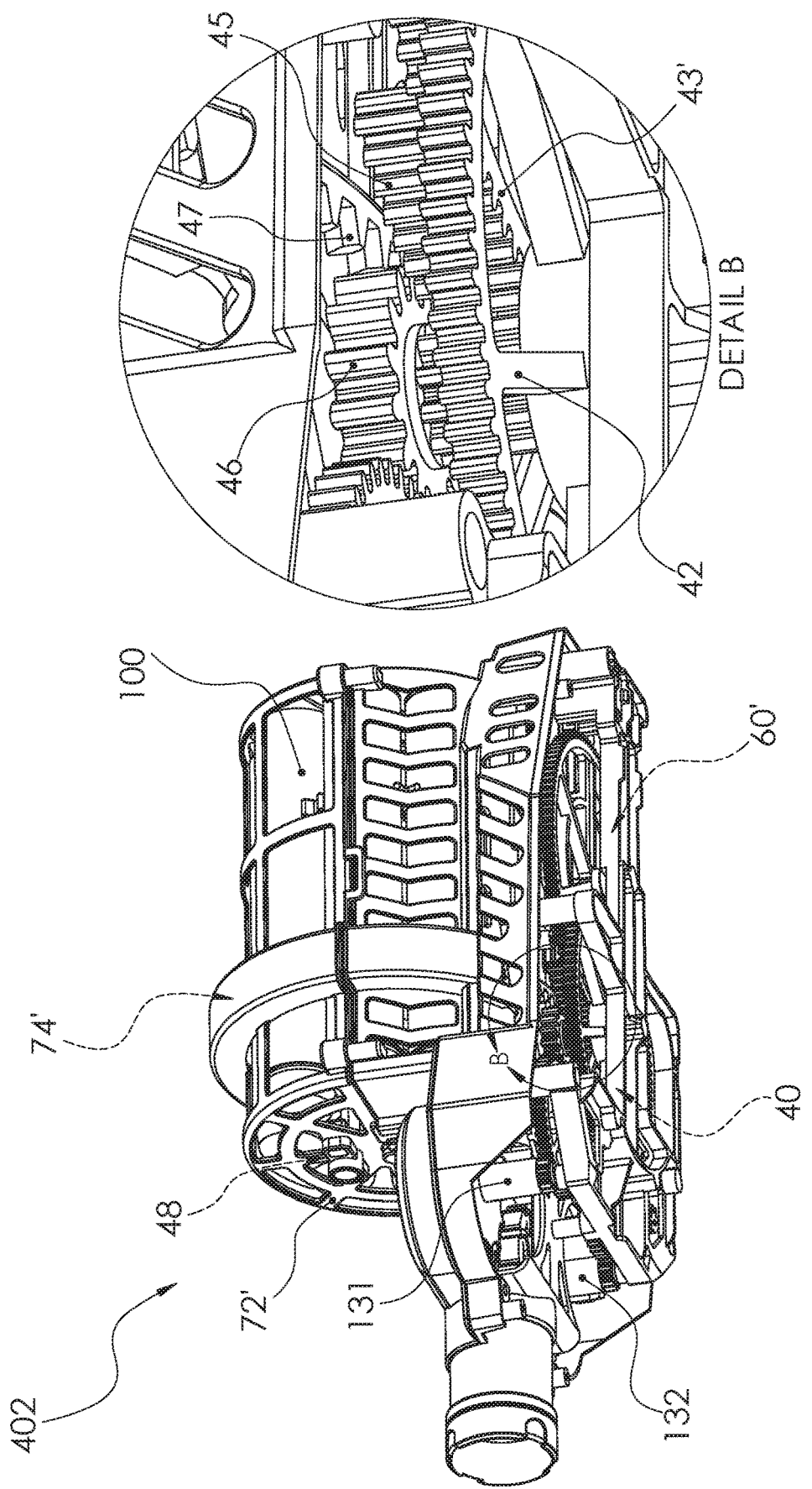
FIGS. 13A-13C show an alternative configuration to rotationally progress the cylinder-magazine for aligning projectiles with the projectile feeding and launching mechanisms.
Figure 13B:
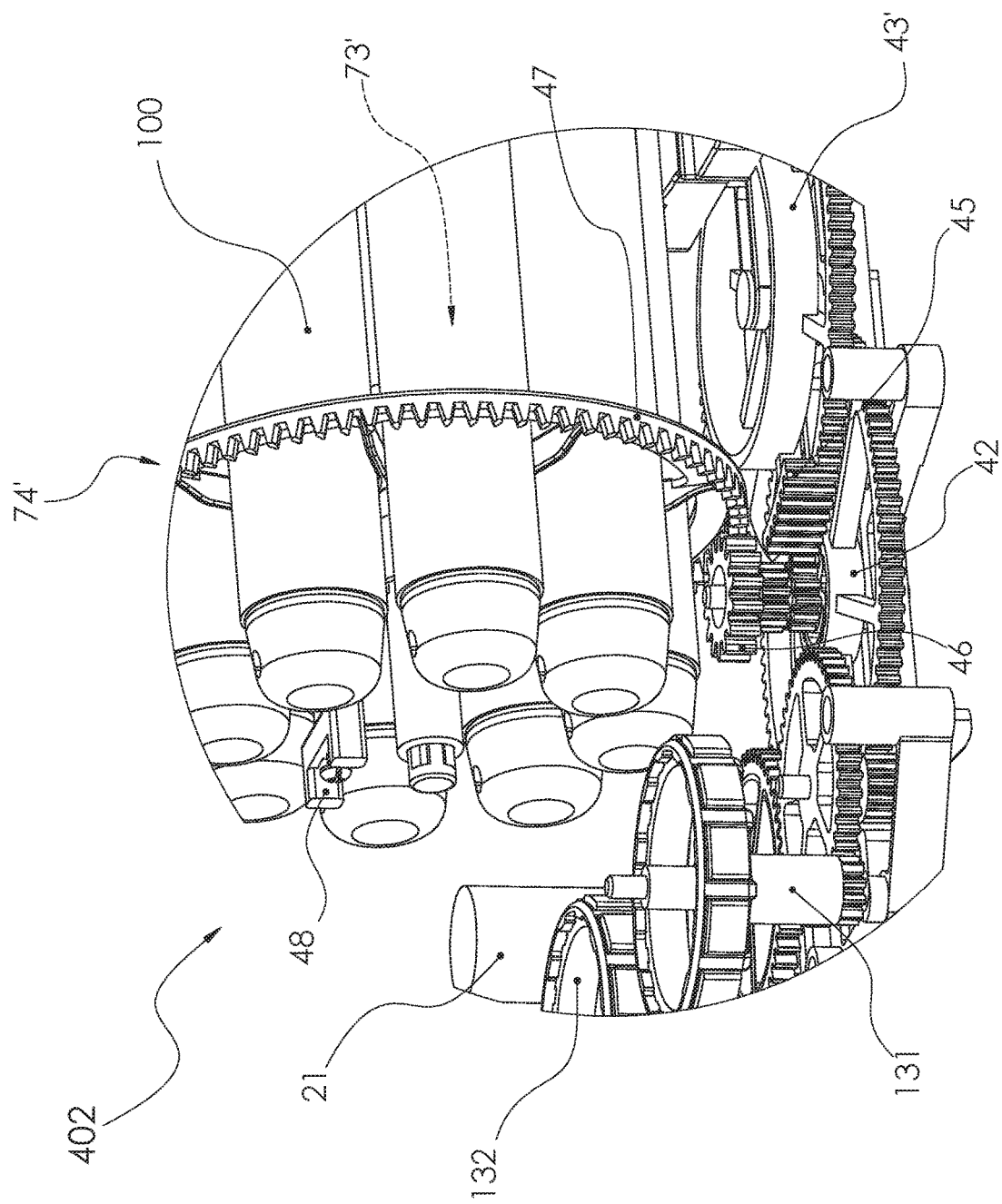

In an alternative embodiment, a magazine-cylinder 74' is rotationally progressed by a projectile feeding mechanism 60' through direct-drive (see FIG. 13A, for example), negating the need for a return-spring 75 and a pawl and ratchet mechanism 76. More specifically, a sector-gear rack 45 protrudes from the follower-gear 43' such that it axially extends the gear-tooth profile and engages a magazine-cylinder pinion 46 (see FIG. 13B). The magazine-cylinder pinion 46, in turn, engages an annular crown-gear 47 which is attached to the magazine-cylinder 74', allowing the pinion 46 to rotate the magazine-cylinder 74' upon the sector-gear rack 45 engaging the pinion 46. The number of teeth on the sector-gear rack 45, pinion 46, and crown gear 47, are configured such that for the duration of engagement between the sector-gear rack 45 and pinion 60, the magazine-cylinder 74' rotationally progresses until the next dart magazine-slot 73' is aligned with the mid-sagittal plane of the firing mechanism, preparing a dart 100, contained within a magazine-slot 73', for injection into the flywheel mechanisms 131 and 132, for example. The timing of rotational progression of the magazine-cylinder 74' is also configured to occur when the projectile-feeder 61 is near the vicinity of its fully-retracted position, to allow the magazine-cylinder 74' to rotate without obstruction.

Figure 13C:
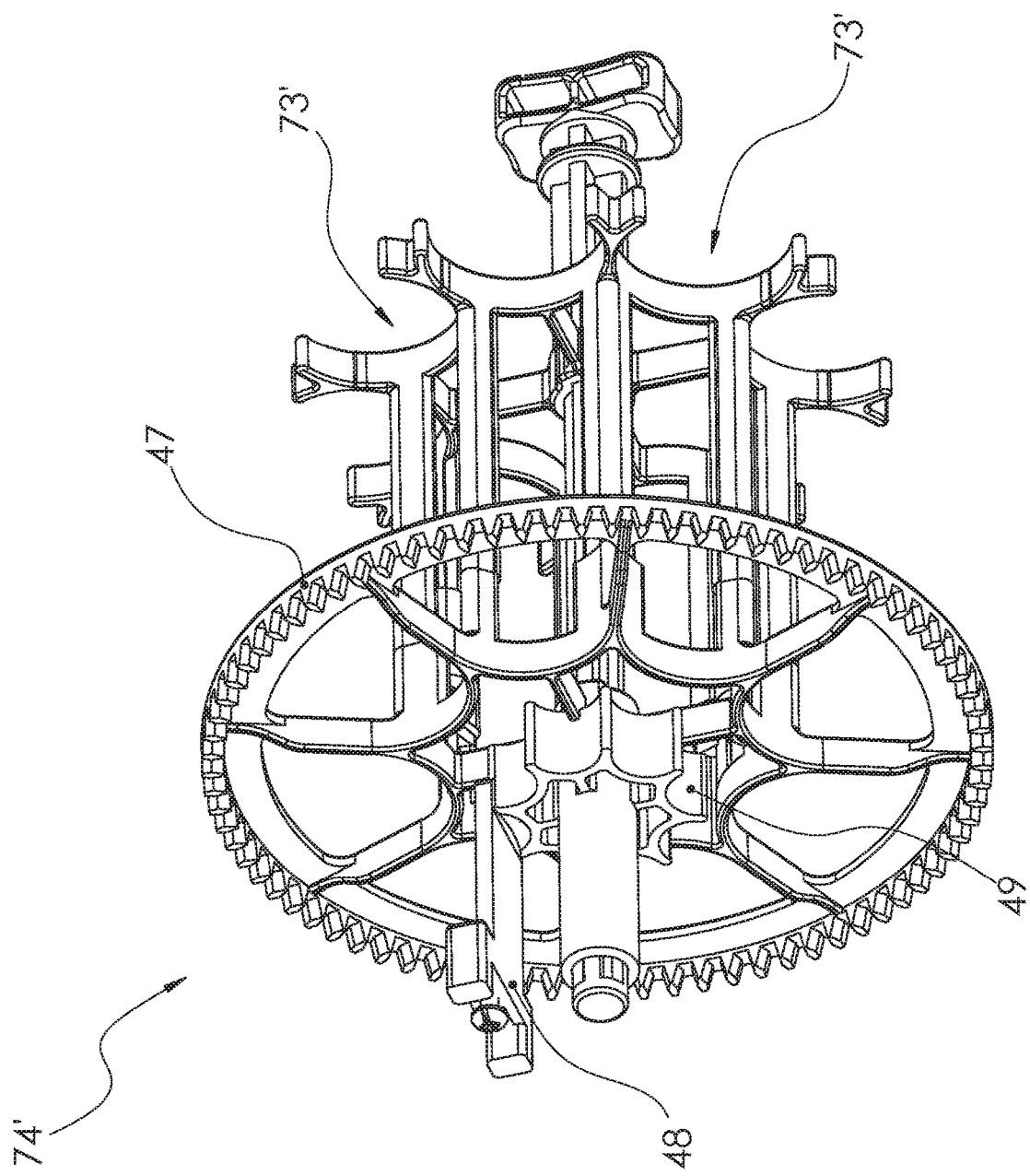

When the sector-gear rack 45 does not engage the pinion 46, the pinion 46 and the magazine-cylinder 74' are otherwise free to rotate about their respective axes of rotation. In light of this, a plastic, cantilever indexing-spring 48, mounted to the magazine housing 72' (see FIG. 13A), engages an indexing-wheel 49, coaxially attached to magazine-cylinder 74 (see FIG. 13C), to rotationally bias the magazine-cylinder 74 to a discrete number of rotational positions, corresponding to the number of provided dart magazine-slots 73', which in the said embodiment amounts to eight (8) discrete rotational positions, set 45 degrees apart.

An electromechanical contact switch 81, located at the back of the housing 90, distal to the flywheel assembly 30, detects when the projectile-feeder 61 is in its retracted-position toward the end of the housing 90 distal to the flywheel assembly 30 (see FIG. 6). The switch 81 electrically connects to the power and control electronics 80 which provide power to the motor 21 for operating the projectile-launching apparatus and for assuring that the projectile-feeder is returned to its retracted-position after each projectile-launching sequence is complete.

The gear-train 40 in a first embodiment configured such that upon application of electrical power to the motor 21, the flywheels 31 and 32 begin spinning-up to the desired projectile-launching rotational speed while the projectile-feeder 61 begins pushing a dart 100 from the chamber 77 into the launch-channel 91. The gear-train 40 is also configured such that the projectile-feeder 61 completes shuttling the dart 100 into the launch-channel 91 and into engagement with the flywheels 31 and 32 once or after the flywheels 31 and 32 have spun-up to the desired projectile-launching rotational speed. The gear-train is further configured to return the projectile-feeder to its retracted-position after the dart 100 has been launched.

Figure 7:
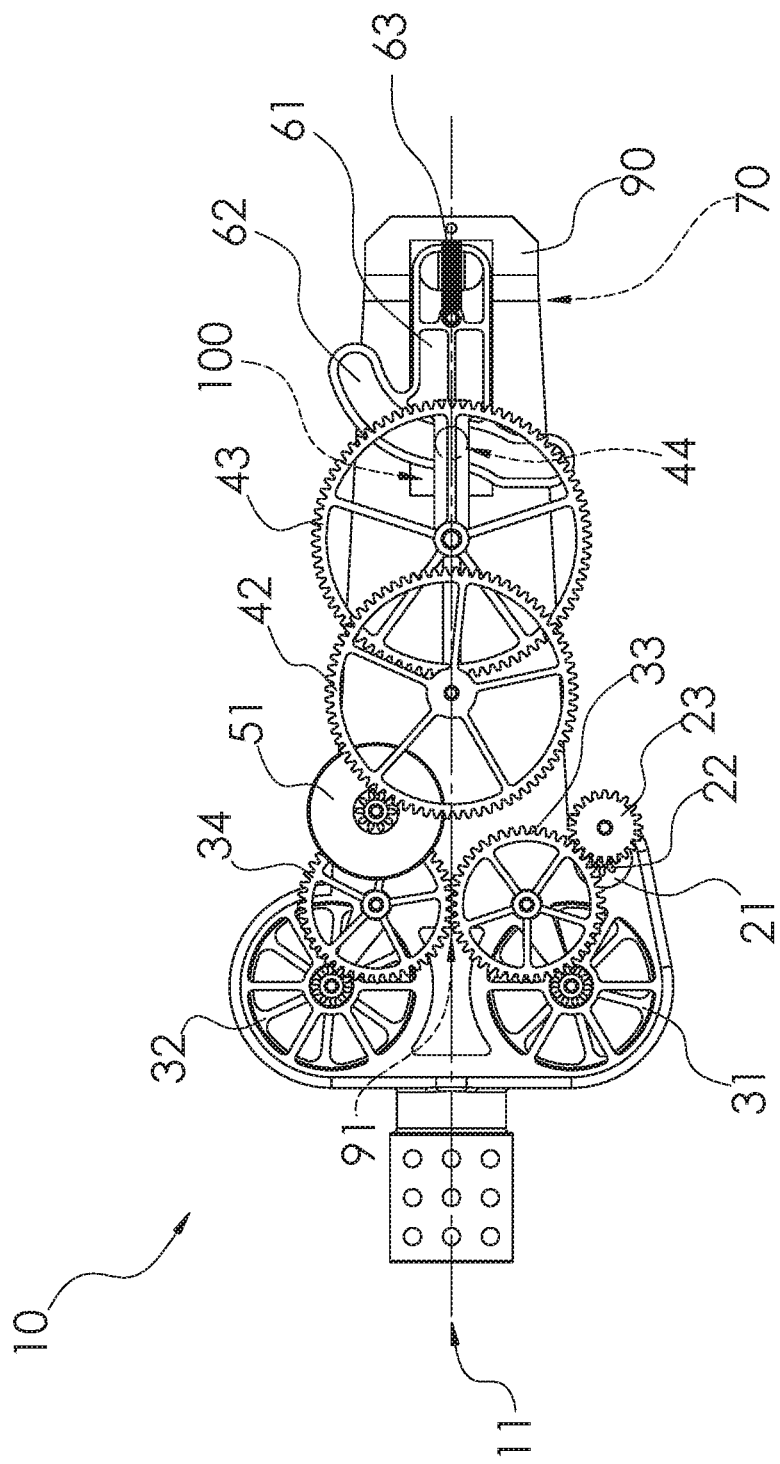
FIG. 7 is an under-carriage view of a single-motor projectile-launching apparatus in accordance with an embodiment of the present application including a centrifugal-clutch-engaged projectile-feeding mechanism.

FIG. 7 is an under-carriage view of a single-motor projectile-launching apparatus in accordance with an embodiment of the present application including a centrifugal-clutch-engaged projectile-feeding mechanism. FIG. 7 illustrates the second embodiment where the second idler-gear 34 is meshed to the input of a centrifugal-clutch 51. The output of the centrifugal-clutch 51 is meshed to the input of the compound-gear 42 engaged to transfer power from the motor to projectile feeder. As the centrifugal-clutch 51 mechanism spins with its expansion therein provides speed sensing for an achieved clutching delay. The centrifugal-clutch 51 is configured such that it is normally-disengaged and self-engages when the flywheels 31 and 32 have achieved a desired rotational speed allowing for the transfer of mechanical power from the motor 21 to the projectile-feeder 61 via the idler-gears 33 and 34, compound-gear 42, and follower-gear 43 for launching the dart 100 in the usual way. The projectile-feeder 61 is biased into a retracted-position toward the end of the housing 90, distal to the flywheel assembly 30 by a spring 63 such that the projectile-feeder 61 can freely engage and shuttle a dart 100 from the chamber 77. The centrifugal-clutch 51 is also arranged such that the projectile-feeder 61 returns to and remains in its retracted-position when the centrifugal-clutch 51 is disengaged.

The first embodiment components include the flywheels and projectile-feeding mechanism, with the gear-train arranged and timed such that the projectile-feeding mechanisms begins injecting when or after the rotating flywheels have spun-up to desired projectile-launching rotational speed via the single motor.

First Embodiment Mechanism Steps:
1. Fire-button is activated by user—3 things happen (cycle repeats while fire-button is activated)
   1. Electrical power is provided to the single-motor and flywheels and projectile-feeding mechanism are energized through gear-train
      i. Projectile-feeding mechanism begins injecting projectile into launch-channel
   2. Flywheel obtain desired projectile-launching rotational speed
      i. Projectile-feeding mechanism completes injecting projectile into launch-channel
      ii. Projectile engages flywheels and is launched
   3. Projectile-feeder returns to original position and engages next projectile for injection
2. Fire-button is de-activated by user—3 things happen
   1. Motor continues to receive electrical power 2. System waits for projectile-feeding mechanism to return to retracted-position (sensor or other detection element monitors position of projectile-feeder)
3. Electrical power is cut to the motor or motor is braked or motor is reversed The first embodiment has the benefit of being the simplest from a mechanical standpoint, since the flywheel-drive system and the projectile-feeding mechanism are directly geared together without being separated by a clutch. This implies that the projectile-feeding system is activated simultaneously with the flywheel-drive system. In other words, when the flywheel motor is energized, the dart-feeder immediately begins the process of injecting a dart into the flywheels. In order to prevent feeding a dart into the flywheels before the flywheels are fully up to speed, this system intentionally limits the speed at which the dart-feeder mechanism moves. For example, if it is determined that the motor can bring the flywheels fully up to speed from a standing start in 0.5 seconds, then the gear-ratio of the dart-feeder system must be tailored so that it takes at least 0.5 seconds to transfer a projectile from the magazine to the flywheels. The disadvantage to this approach is that each subsequent shot also must occurs at intervals of 0.5 seconds, and no faster, even though the flywheels themselves may be capable of handling a rate-of-fire that is faster than this once they are fully up to speed. Therefore, the system described in embodiment one has a rate-of-fire that is fundamentally limited by the time it takes the flywheels to get up to speed from a standing start, which in the above example would be 0.5 seconds per shot, even though the flywheels may be capable of handling a rate of fire of perhaps 0.2 seconds per shot once they are spinning. The lower rate-of-fire implicit in the first embodiment may in some cases limit the play-value of the launcher.

The second embodiment also employs a single-motor and a centrifugal-clutch to initiate the projectile-feeding mechanism when or after the rotating flywheels have spun-up to desired projectile-launching rotational speed. In comparing the first embodiment (no clutch employed) in comparison to the second and third embodiments (each employing a clutch to achieve delay), a benefit of the clutch is to initiate the feeding only after the desired rotational speed has been achieved. This second embodiment addresses the projectile-feeding mechanism with the inclusion of a centrifugal clutch, which is located between the flywheel-drive system and the projectile-feed mechanism.

Second Embodiment Mechanism Steps:
1. Fire-button is activated by user—5 things happen (cycle repeats while fire-button is activated)
   1. Electrical power is provided to the single-motor
   2. Flywheels are spun-up through gear-train up to desired projectile-launching rotational speed
   3. Centrifugal-clutch self-activates and initiates projectile-feeding mechanism to inject projectile into launch-channel
   4. Projectile engages flywheels and is launched
   5. Projectile-feeder returns to retracted-position and engages another projectile for transfer
2. Fire-button is de-activated by user—5 things happen
   1. Motor continues to receive electrical power
   2. System waits for projectile-feeding mechanism to complete injection of projectile into flywheels (sensor or other detection element monitors position of projectile-feeder)
   3. Electrical power is cut to the motor or motor is braked or motor is reversed
   4. Centrifugal-clutch self-deactivates
   5. Projectile-feeder return to retracted-position and engages another projectile for transfer The second embodiment addresses this limitation through the inclusion of a centrifugal clutch, which is located between the flywheel-drive system and the projectile-feed mechanism. A centrifugal clutch is essentially a simple mechanical speed sensor, which in this case allows gear 51 (FIG. 7) to slip until a predetermined rotational speed has been attained, at which point the gear stops slipping and begins transferring rotation to the adjacent gear (42). In this embodiment, the centrifugal clutch ensures that the projectile-feed system is not activated until the flywheels have reached their full speed. This facilitates the speed of the projectile-feed system as being no longer limited by the start-up speed of the flywheels. For example, if it is determined that the motor can bring the flywheels fully up to speed from a standing start in 0.5 seconds, but that the flywheels are subsequently capable of handling a feed-rate of 0.2 darts per second after they are up to speed, then the gear ratio of the feed-system can be designed to operate at the faster feed-rate of 0.2 darts per second, while the centrifugal clutch ensures that the feed-system is not activated until the flywheels have passed through the 0.5 second start-up phase. In effect, the second embodiment allows the system to launch darts at a higher rate-of-fire, which may enhance the play-value.

The third embodiment employs a mechanically actuated-clutch to initiate the projectile-feeding mechanism which may be manually mechanically actuated when a fire-button is activated by the user, after a flywheel-button is activated by the user, to provide power to the motor and spin-up the flywheels.

Third Embodiment Mechanism Steps:
1. Flywheel-button is activated by user—2 things happen
   1. Electrical power is provided to the single-motor
   2. Flywheels are spun-up through gear-train to desired projectile-launching rotational speed
2. Fire-button is activated by user—3 things happen (cycle repeats while fire-button is activated)
   1. Clutch is engaged and transmits mechanical power to the projectile-feeding mechanism to inject projectile into launch-channel
   2. Projectile engages flywheels and is launched
   3. Projectile-feeder returns to retracted-position and engages another projectile for transfer
3. Fire-button is de-activated by user—4 things happen
   1. Motor continues to receive electrical power
   2. System waits for projectile-feeding mechanism complete injection of projectile into flywheels through a sensor or detection element
   3. Electrical power is cut to the motor and clutch is de-activated
   4. Projectile-feeder returns to retracted-position and engages another projectile for transfer
4. Flywheel-button is de-activated by user—4 things happen
   1. Motor continues to receive electrical power
   2. System waits for projectile-feeding mechanism complete injection of projectile into flywheels through a sensor or detection element
   3. Electrical power is cut to the motor or motor is braked or motor is reversed and clutch is de-activated
   4. Projectile-feeder returns to retracted-position and engages another projectile for transfer Regarding the third embodiment, this system is similar to the second embodiment, but it replaces the centrifugal clutch with an actively-controlled clutch. This approach provides the same benefit as the centrifugal clutch, in that it is possible to have a time-between-shots (or rate-of-fire) which is faster than the initial start-up time of the flywheels. However, it provides the added advantage of allowing the user to start the flywheels and maintain them at full speed indefinitely without the dart-feeder system being activated. With this arrangement, the launcher can be made to fire the first dart on much shorter notice, since the flywheels may already up to speed when the projectile-feed system is activated. To give a practical example, imagine that the user is aware that a target might be appearing at any moment, and they wish to be prepared to launch a projectile with the shortest possible delay. In such a case, the user might elect to energize the flywheels and bring them up to full operating speed, and then leave the system running in that state. Then, when a target subsequently appears, the user simply needs to actuate the clutch, which immediately activates the projectile-feed system. This approach allows for a much quicker first shot than if the user had to wait for the flywheels to first come up to speed before they were able to fire. The disadvantage of this embodiment is that a separate actuator is required to drive the clutch, which increases the overall cost and weight of the system.

On the other hand, if the intention is to adapt the third embodiment for use as a hand-held launcher as opposed to a drone-mounted launcher, then the aforementioned disadvantages of the additional actuator become irrelevant. Thus a trigger or fire-button may be activated/de-activated by user facilitates shoot anytime via the trigger actuator. In a hand-held launcher, there are typically two triggers—the first trigger controls the start of the flywheels, and the second trigger controls the projectile-feed mechanism. If the system described in the third embodiment were to be adapted for hand-held use, such a system would similarly have two triggers. Specifically, the first trigger would control the start of the flywheels, and the second trigger would engage the clutch, thereby starting the projectile-feed mechanism and causing the system to launch a dart. With this arrangement, the user pressing on the firing trigger acts as the actuator, thereby making a separate actuator unnecessary.

All three of the above embodiments ultimately achieve the same basic function of transferring a projectile from a magazine to a pair of spinning flywheels, thereby launching the projectile. However, depending on the particular user-experience that is desired, a certain embodiment may be preferable over the other two.

Figure 8:
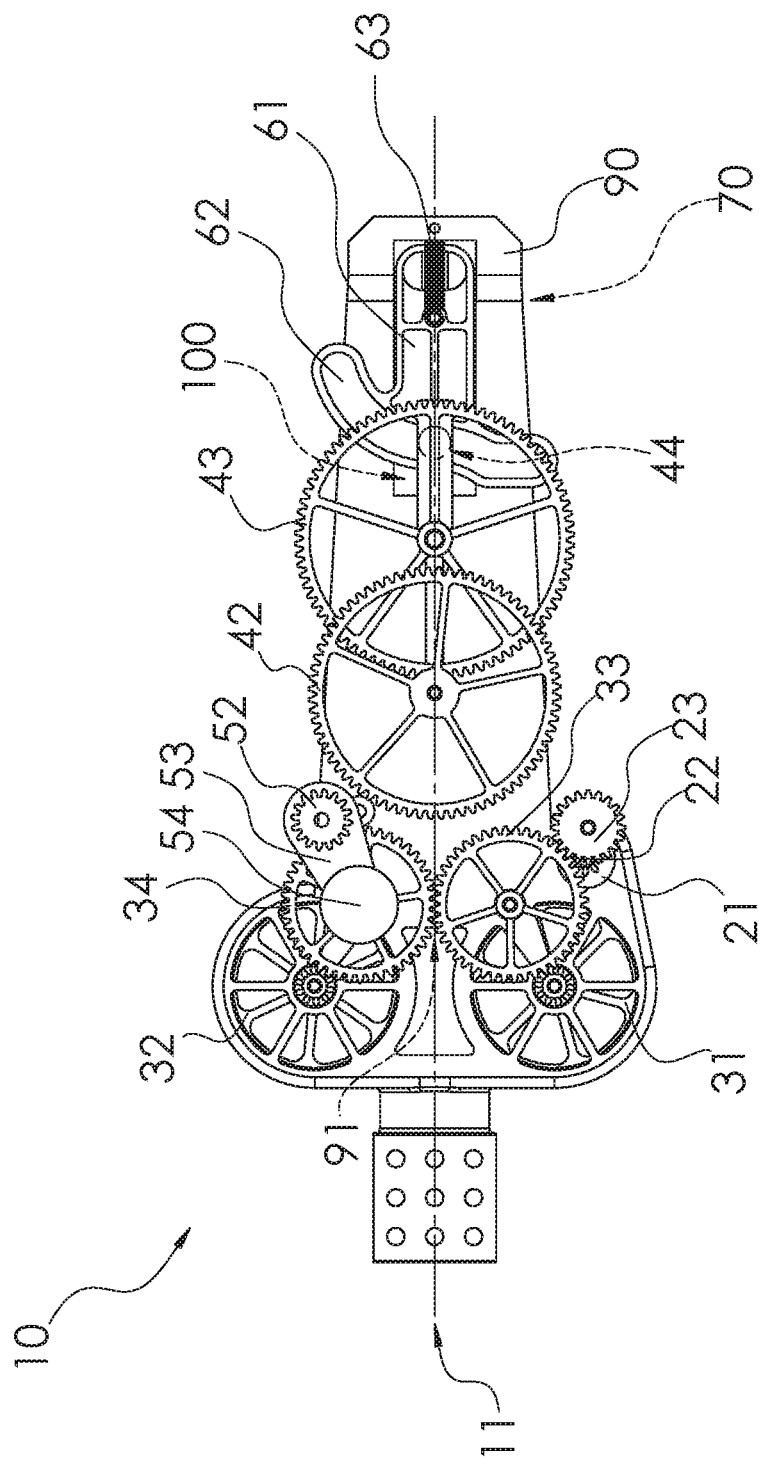
FIG. 8 is an under-carriage view of a single-motor projectile-launching apparatus in accordance with an embodiment of the present application including an actuated-clutch-engaged projectile-feeding mechanism.

FIG. 8 is an under-carriage view of a single-motor projectile-launching apparatus in accordance with an embodiment of the present application including an actuated-clutch-engaged projectile-feeding mechanism. FIG. 8 illustrates the third embodiment where the second idler-gear 34 is meshed to the input of a compound swing-gear 52. The swing-gear 52 is rotatably attached to a swing-arm 53 which pivots about the second idler-gear 34 rotational axis. An actuator and return-spring assembly 54 is positioned at the swing-arm 53 rotational axis. The actuator and return-spring assembly 54 biases the swing-arm 53 and attached swing-gear 52 away from engagement with the compound-gear 42 when the actuator and return-spring assembly 54 is not receiving electrical power from the power and control electronics 80 via an electrical connection. Accordingly trigger or fire-button user activation is achieved allowing speeding up and shooting anytime via trigger actuator with return-spring assembly 54 to clutch manually if desired. When electrically powered, the actuator and return-spring assembly 54 brings the swing-gear 52 into mesh with the input of the compound-gear 42 allowing for the transfer of mechanical power from the motor 21 to the projectile-feeder 61 via the idler-gears 33 and 34, compound-gear 42, and follower-gear 43 for launching the dart 100 in the usual way.

As discussed above, FIG. 9 shows the single-motor projectile-launching apparatus having the cam and follower interaction between the follower-gear and the projectile-feeder. Herein the output of the compound-gear 42 is meshed to the input of the follower-gear 43. The follower 44 of the follower-gear 43 is engaged with the cam 62 of the projectile-feeder 61.

Figure 10A:
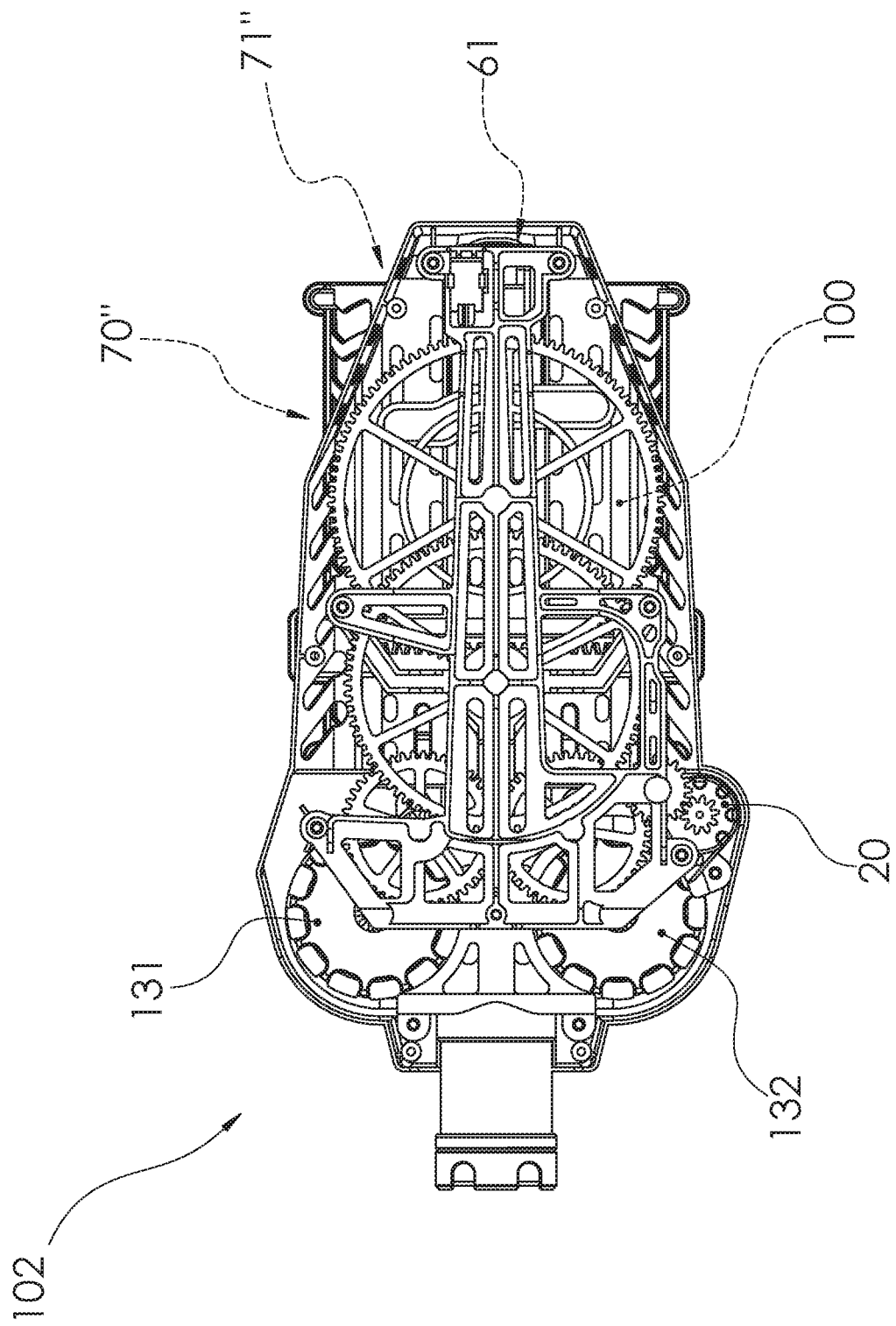
FIG. 10A shows a partial under-carriage view of an alternate embodiment flywheel assembly projectile-launching apparatus in accordance with flywheels employed to include elastomeric expanding flywheel mechanisms, and FIGS. 10B through 10I each show various views of the novel elastomeric expanding flywheel structure mechanism including a flywheel cage with an expanding elastomeric tire therein, where the expanding elastomeric tire includes numerous tire lugs that are free to move inward and outward at peripheral apertures along the circumference of the flywheel cage.
Figure 10B:
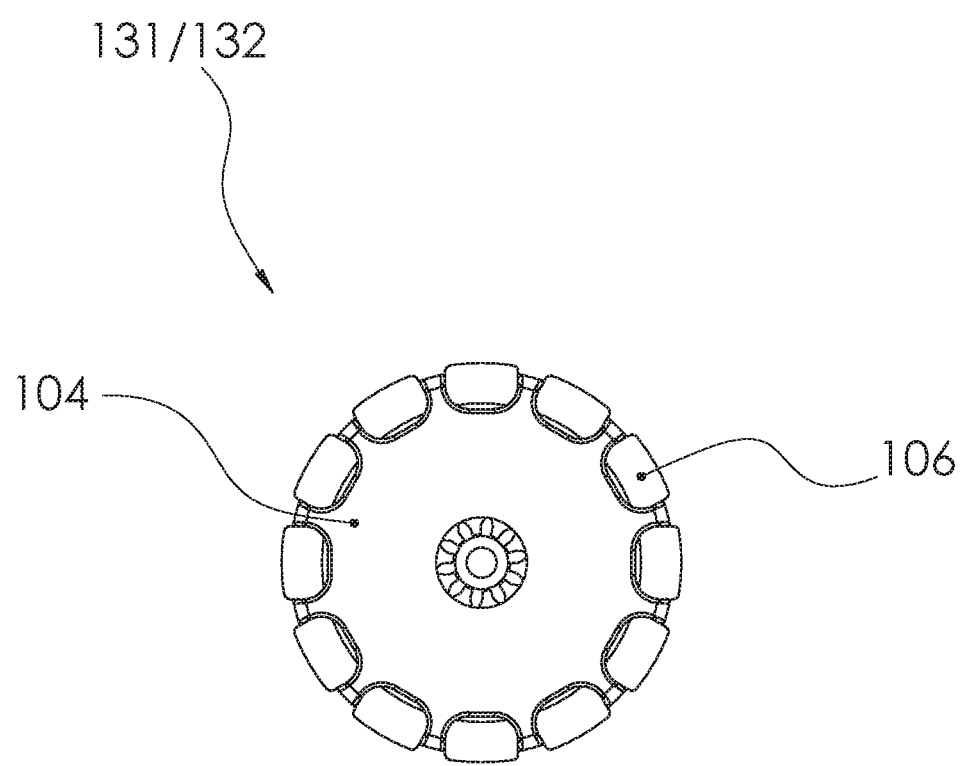
Figure 10C:
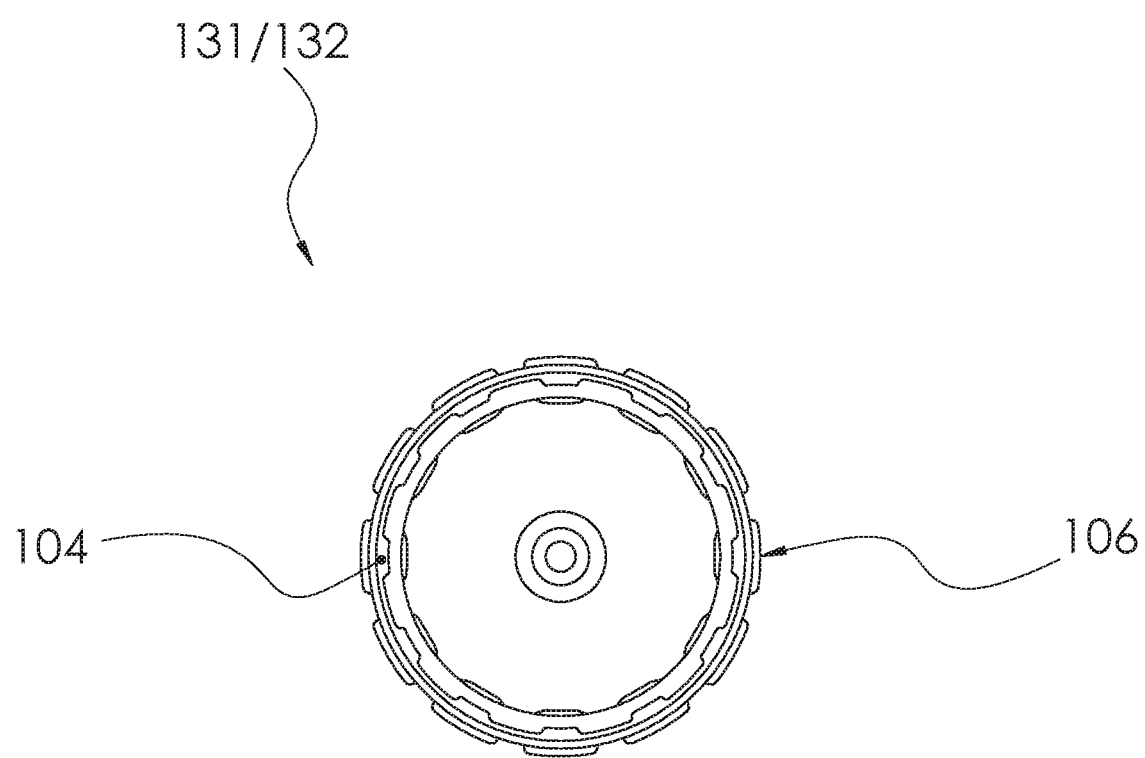
Figure 10D:
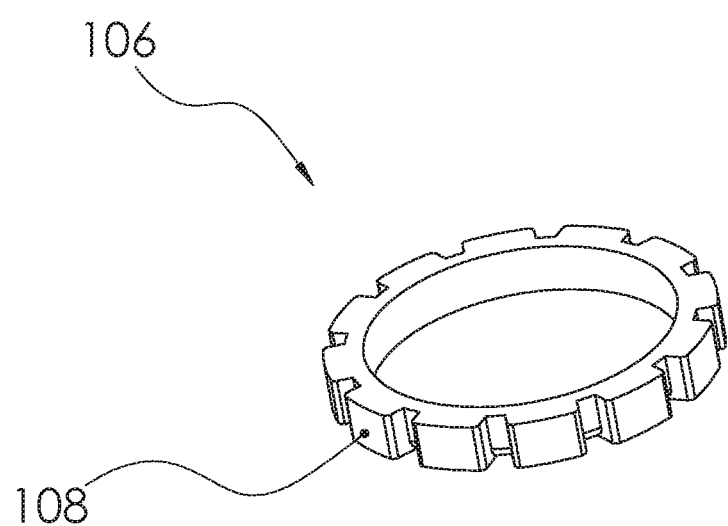
Figure 10E:
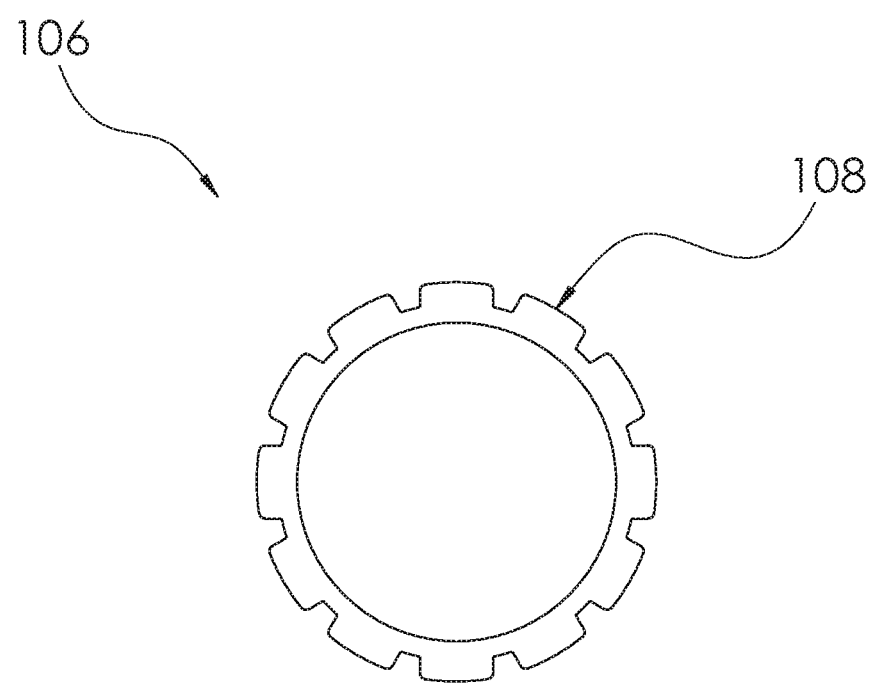

FIG. 10A shows a partial under-carriage view of an alternate embodiment flywheel assembly projectile-launching apparatus 102 in accordance with flywheels employed to include elastomeric expanding flywheel mechanisms 131 and 132 therein. The flywheels may each include elastomeric expanding flywheel structure mechanisms such as an expanding elastomeric tire with a flywheel hub allowing the expanding elastomeric tire to move inward and outward at its circumference. FIGS. 10B and 10C respectively show exemplary bottom and top plan views of a novel elastomeric expanding flywheel structure mechanism 131. Each of the two expanding flywheel mechanisms 131 and 132 employed includes structures having a flywheel cage 104 and an expanding elastomeric tire 106 therein. FIGS. 10B, 10C, 10D, 10E, 10F, 10G, 10H, 10I each show various views of the novel elastomeric expanding flywheel structure mechanism including a flywheel cage with an expanding elastomeric tire therein, where the expanding elastomeric tire includes numerous tire lugs that are free to move inward and outward at peripheral apertures along the circumference of the flywheel cage.

The expanding elastomeric tire 106 includes numerous tire lugs 108 that are free to move inward and outward at peripheral apertures 110 along the circumference of the flywheel cage 104. The tire lugs 108 effectively inflate to provide expandable ridges along the peripheral circumference of the expanding flywheel mechanisms 131, 132 so as to increase flywheel traction while the expanding flywheel mechanisms 131 and 132 are rotated during operation; yet while idle reducing the operational flywheel traction during slow rotation, decelerating or while stopped when tire lugs 108 thereby move inward at peripheral apertures 110.

The flywheel mechanisms 131 and 132 may be integrated into the projectile feeding and launching mechanism by directly replacing the conventional flywheels 31 and 32, so long as ample radial clearance is provided within the flywheel housing to account for the inflating expansion of the tire lugs 108. The described power-transmission motor 21 drives pinion 22 operating output-gear 23 to drive first idler-gear 33 which is meshed to first elastomeric expanding flywheel mechanism 131. The first idler-gear 33 is also meshed with second idler-gear 34 thereby driving second elastomeric expanding flywheel mechanism 132, and further with compound-gear 41 for operating projectile-feeder assembly as discussed above, e.g., at FIG. 6, et seq. providing translation of darts shuttled freely from the dart magazine and along axis 11 into the launch-channel 91 for engagement with the novel elastomeric expanding flywheel mechanisms 131 and 132 for launching the darts in a novel fashion employing the elastomeric expanding flywheel structures discussed herein, to launch injected projectiles upon the elastomeric expanding flywheel mechanisms 131 and 132 being spun-up to a desired rotational speed.

The elastomeric expanding flywheel mechanisms 131 and 132 in novel fashion facilitate reduced cost and mechanism mass for flywheel housing assemblies with less required structure (plastic) about the flywheels, and operationally in addition to increased traction provides for longer projectile accelerating time, very low required dart pinch between flywheels, decreased mechanical/electrical load on motor, decreased electrical load on the batteries, facilitating operation with batteries near full depletion, smaller motor sizes, more constant flywheel revolutions per minute (RPM), increased battery life, decreased mechanical loads on flywheels, with very low pinch reducing projectile jamming while allowing a superior mechanism to self-clear jams and reduced instances of a user pausing their play to clear a flywheel dart-jam.

The expanding flywheel technology offers many benefits, such as:

Increased dart velocities for the same motor, gear-train, and battery pack configuration Alternatively, a smaller and lighter motor may be implemented instead, demanding less power from the battery pack while offering the desired dart velocities Increased traction (with practically nearly zero to zero slip between dart and flywheel)

Longer dart-accelerating time (the rubber tires provide acceleration to the dart along its entire length, not just at the tip)

Very low required dart pinch between flywheels (since traction is achieved through the expanding tire making soft-contact with the dart body) leading to:

Decreased mechanical/electrical load on motor and decreased electrical load on the batteries (darts under conventional flywheels pinch tend to apply a braking force on the flywheels, drawing more current when the dart in injected between the flywheels) allowing for:

Smaller motors to potentially be employed

More constant flywheel RPM (since voltage no longer drops because of the decrease amount of current spiking)

Increased battery life (in light of less current spikes)

Decreased mechanical loads on flywheels and flywheel housing

Allowing for less structure (plastic) to be required around the flywheels

The very low pinch also reduces the possibility of darts jamming within the flywheels, allowing:

The mechanism to self-clear jams

For reduced instances of a user pausing their play to clear a flywheel dart-jam

The user to keep firing darts until the batteries are nearly fully depleted

Figure 10F:
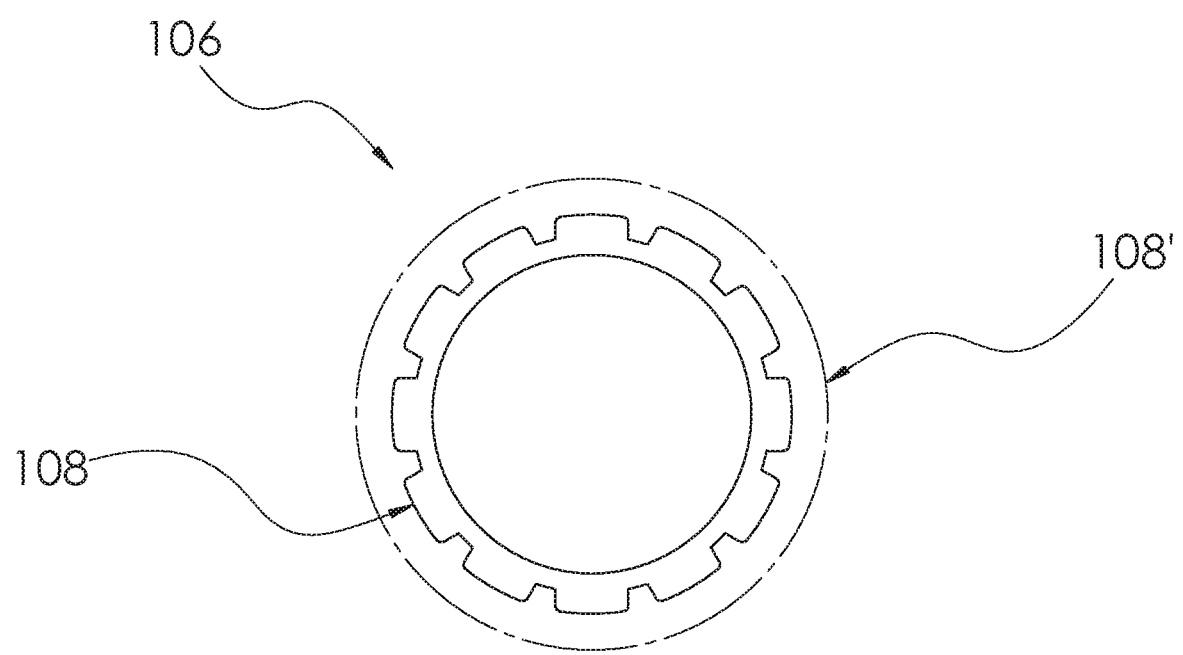
Figure 10G:
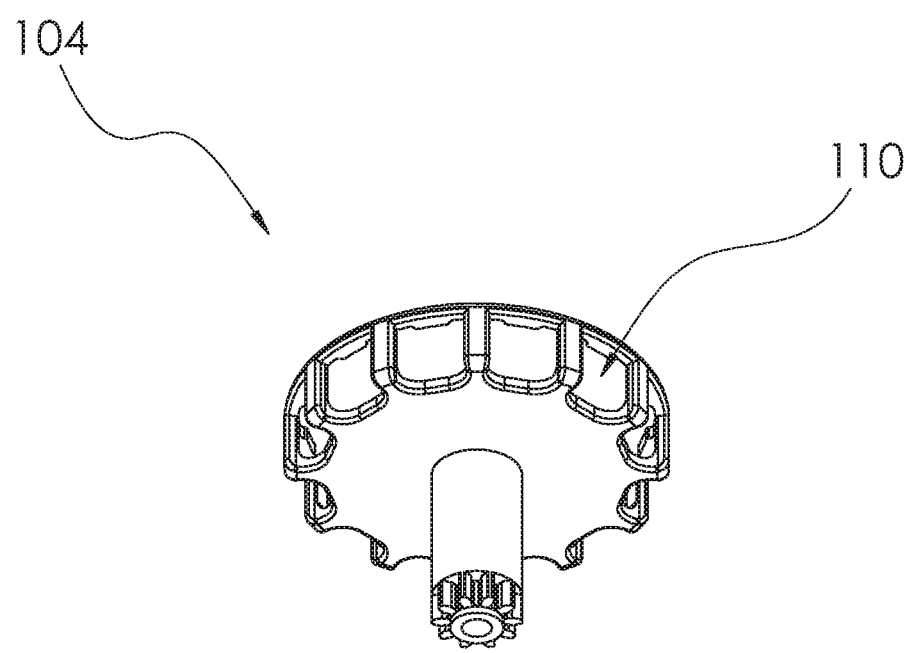
Figure 10H:
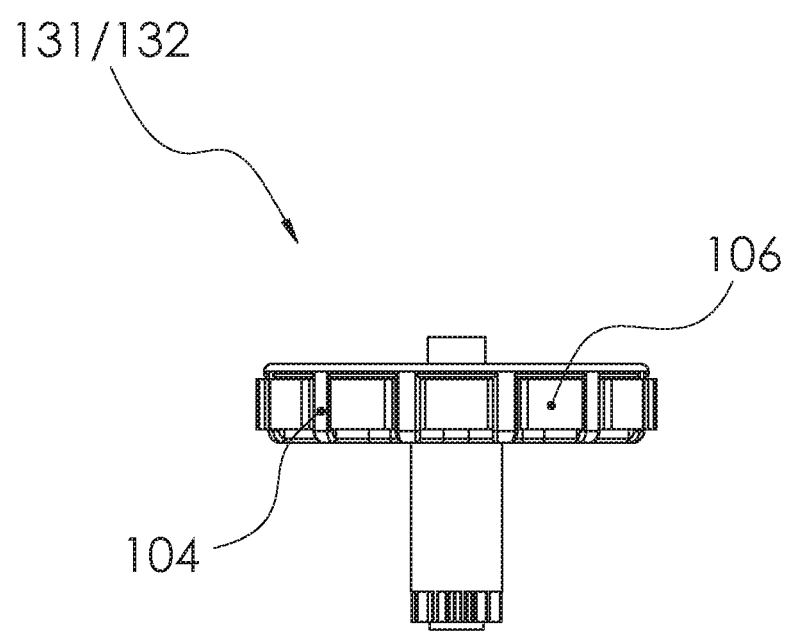
Figure 10I:
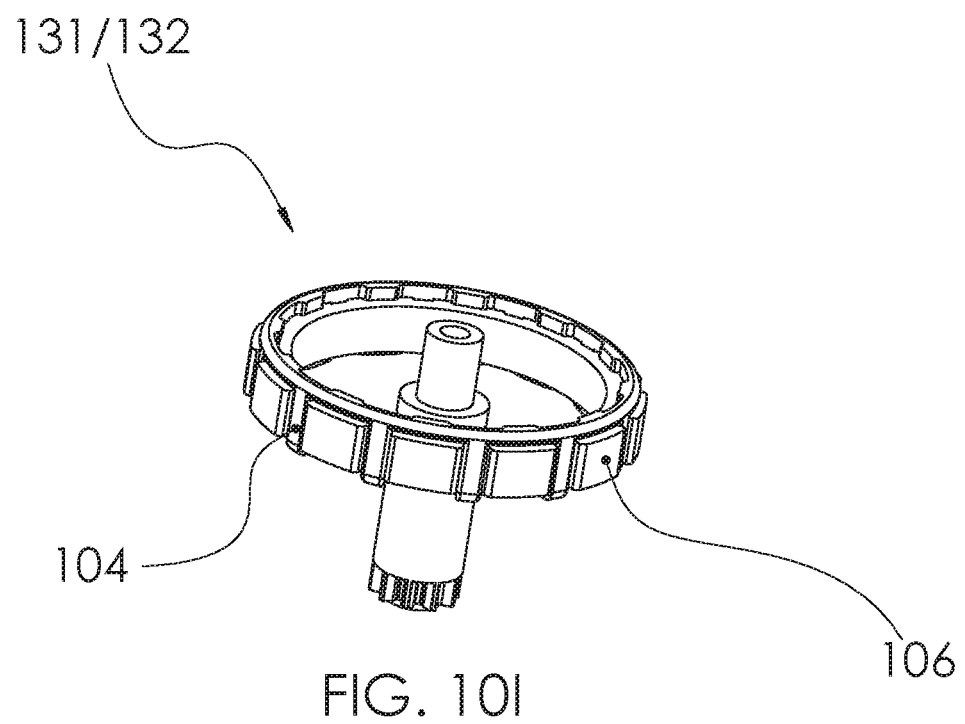

As described the expanding flywheel mechanisms 131 and 132 employed includes structures having the flywheel cage 104 which may be made from Delrin flywheel cage that is moldable using simple straight-pull tooling. The expanding elastomeric tire 106 may be made as a formed insert molded of approximately Shore 70 A durometer TPR or equivalent. The tire 106 is held in place by centrifugal force, and thus adhesive is not necessarily required. The tire 106 may be allowed to expand approximately 4 mm in diameter when spinning. Centrifugal force causes the tires to "inflate", which provided compliance similar to a pneumatic tire. The magnitude of the inflation (i.e. radial expansion) of the tire 106 may be controlled by varying angular velocity of the tire 106 and flywheel cage 104. More specifically, a faster rate of rotation (RPM) leads to a larger magnitude of radial expansion and, conversely, a slower rate of rotation leads to a smaller magnitude of radial expansion, see, e.g. FIG. 10F illustrating expansion of the tire 106 and its tire lugs 108 to 108'. The tire 106 inflation may also be controlled by varying the harness of the TPR material comprising the molded tire 106. In particular, for a given, RPM, a tire 106 molded of a Shore 60 A durometer TPR will radially expand more than a different tire 106 molded of a Shore 80 A durometer TPR. While the parameters (e.g. diameter, rotational speed, geometry, and mass distribution) of the expanding flywheel mechanisms 131 and 132 may be adjusted to work optimally with most Shore A and Shore 00 durometers, the hardness of tire 106 may practically range between Shore 30 A and Shore 90 A in the present application.

The inflating-property of the tire allows the flywheels to have extremely high traction while still maintaining a wide center-to-center wheel-spacing; whereas conventional flywheels require high pinch-force (tight spacing) to generate sufficient traction placing a high load on the motor when the dart is inserted, slowing the flywheels and increasing current-draw where projectile may require approximate insertion-loads, e.g., of 193 g to achieve a 94.4 fps dart-velocity. Even with such high pinch-force, approximately 30% slippage can be measured between conventional flywheels and dart projectiles. The effects of slippage may be mitigated by providing an even more aggressive pinch (with the intent of transferring more energy from the flywheels to the dart to obtain higher dart-velocities). Higher degrees of pinch would yield insertion-loads higher than 193 g, putting further strain on the motor, drawing more current, and worsening dart jam scenarios.

On the other hand, the disclosed novel expanding flywheels create soft compliance and high traction, similar to a pneumatic car tire. This allows for wider wheel spacing, which results in a higher flywheel speed and a lower current-draw. For example, for a dart with a 0.5 inch nominal outer diameter (OD), and a 1 inch flywheel OD, the flywheel center-to-center spacing may be set at 1.45 inches. Observed projectiles may require approximate insertion-loads of only 18.8 g to achieve 106.8 fps. Employing tires cast of lower durometer TRP materials would allow for increased center-to-center flywheel distances and hence further lower pinch-forces on account of the lower durometer tires expanding more for the same operating conditions, creating a scenario of high traction upon achieving full spin-rate of the flywheels and very little pinch-force when the flywheels are not spinning. In other words, if using the dart and flywheel diameter values of the example directly above, allowing the tires to radially expand an additional 0.025 inches would allow the flywheel center-to-center distance to be set to 1.50 inches, providing for nearly zero pinch on the dart by the flywheels resulting in insertion-loads amounting to even less than 18.8 g.

Even with such wide wheel spacing, video analysis shows essentially zero slippage between the flywheels and the dart projectiles. Such a launcher allows darts to be fired at around 107 ft/s using a single motor running off a 2-cell LiPo battery pack. The motor type, motor winding, and gear-ratios between the motor and flywheels may be configured to achieve the desired flywheel RPM (and extent of tire expansion) for a particular battery pack voltage (e.g. 3V-12V) and chemistry (e.g. Alkaline, Lithium, Ni—NM, Ni—Cd).

An additional benefit of wide wheel spacing is jam-clearing. Conventionally operated electric power-transmission motor driving flywheels, with conventional flywheel spacing, cannot clear a jammed dart (dart from a standing start a static position between the flywheels without power) resulting in the motor being stalled when power subsequently applied in a conventional flywheel drive. For example, a conventional flywheel drive may no longer be able to eject a dart fed into the flywheels (resulting in a jam) once a 4-pack of Alkaline batteries approaches a voltage-capacity level of around 1V (4V total voltage for a 4-battery pack). However, advantageously, with expanding flywheels the motor can clear a jammed dart from a standing start with less than 1.5 volts. This will result in fewer jams, and will also allow a blaster to continue to operate until its batteries are almost completely dead.

Figure 14A:
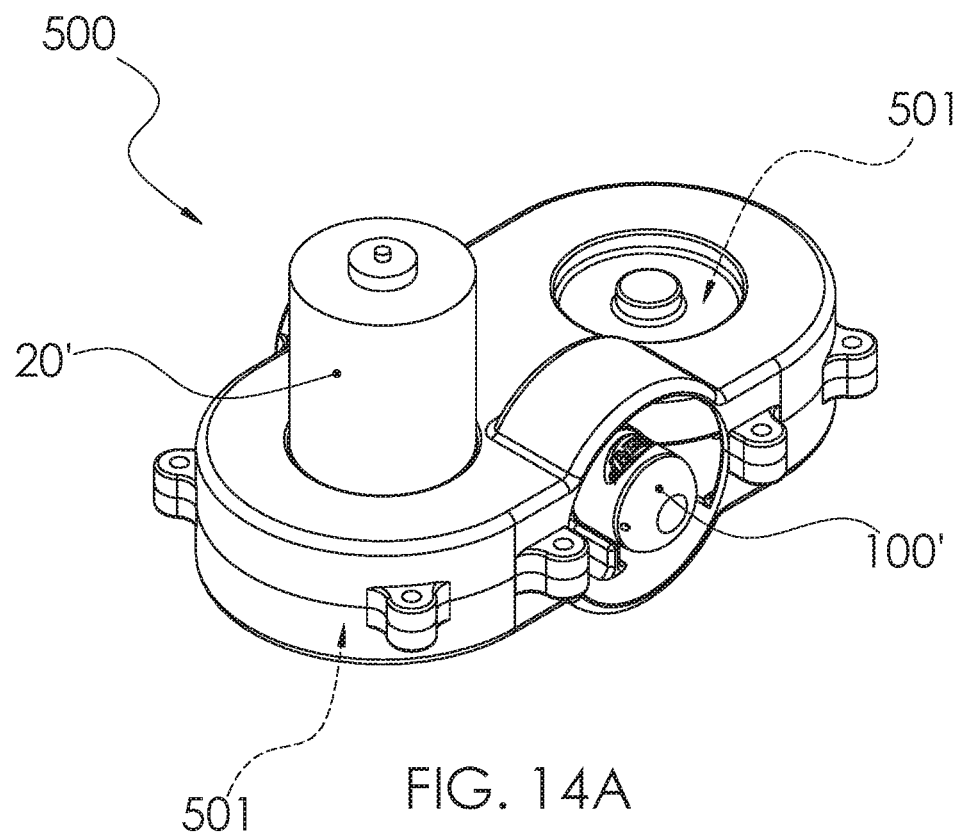
FIG. 14A is a perspective view of an alternate single-motor projectile-launching apparatus in accordance with an embodiment of the present application including an elastomeric expanding flywheel structure mechanism.
Figure 14B:
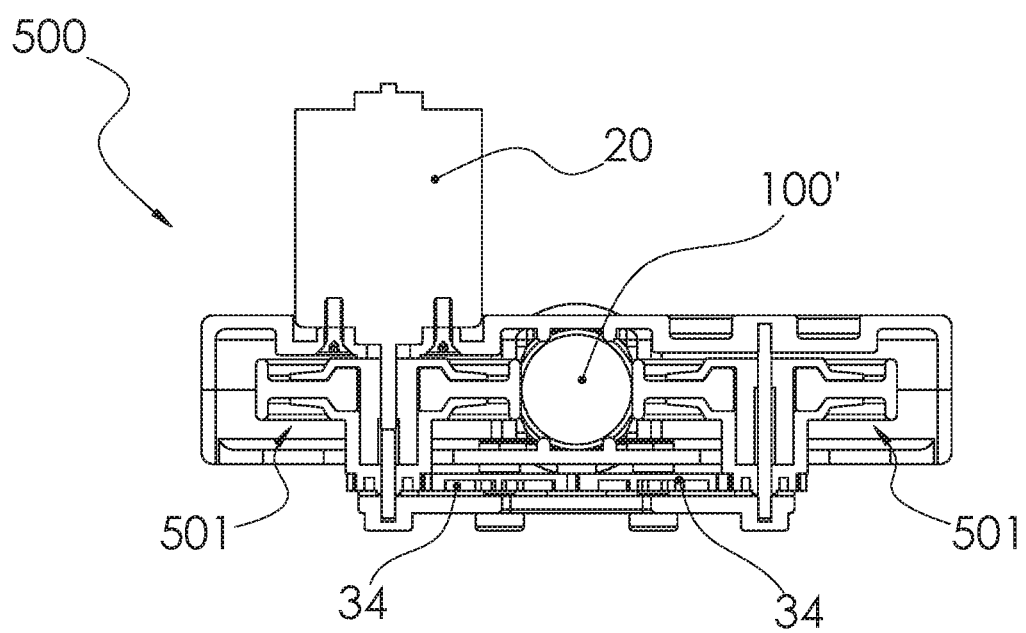
FIG. 14B is a cross-sectional view of the alternate single-motor projectile-launching apparatus of FIG. 14A, along a plane bisecting the flywheels and perpendicular to the direction of projectile launch trajectory.
Figure 14C:
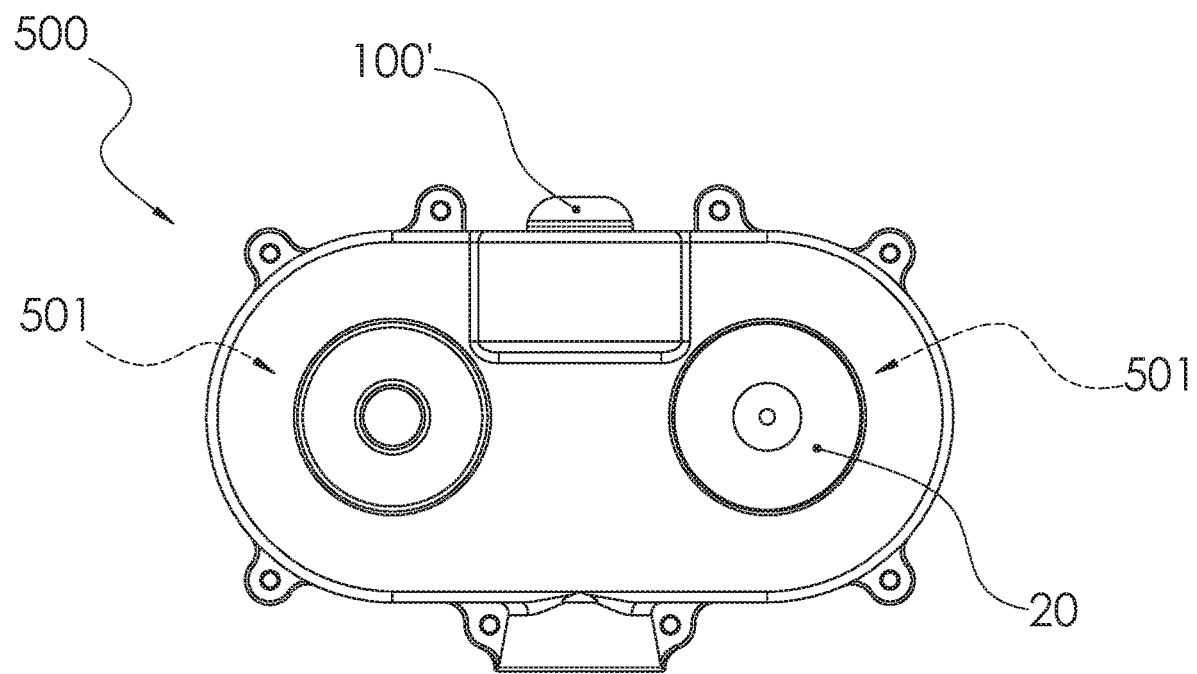
FIGS. 14C through 14F show various views of the alternate single-motor projectile-launching apparatus of FIG. 14A.
Figure 14D:
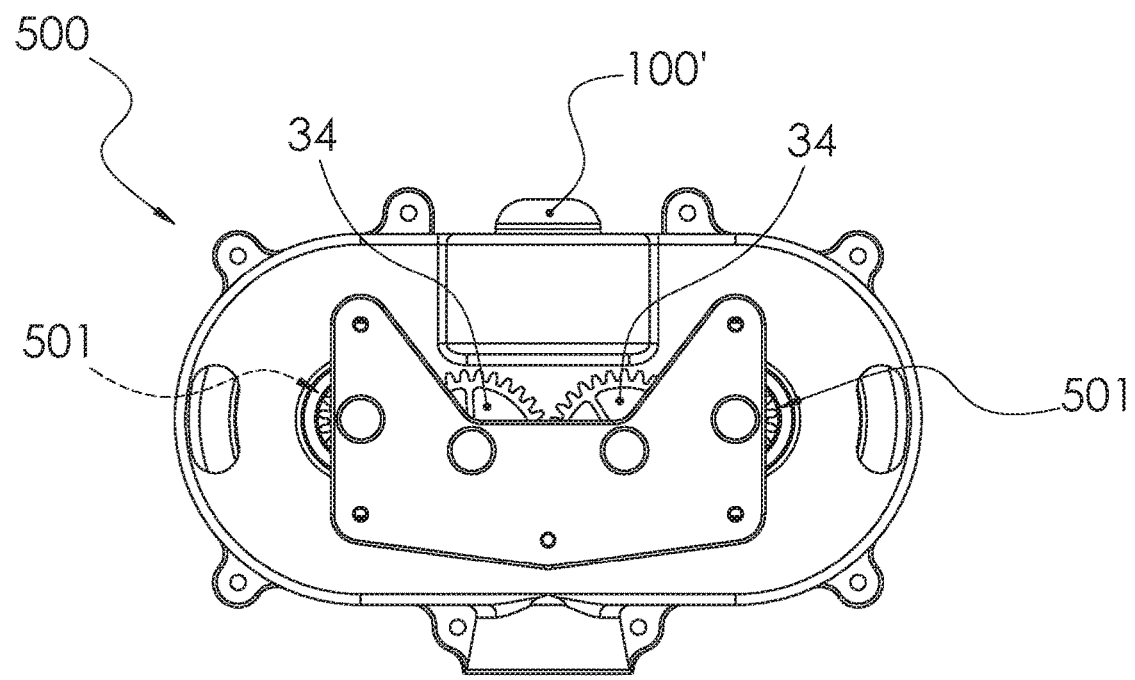
Figure 14E:
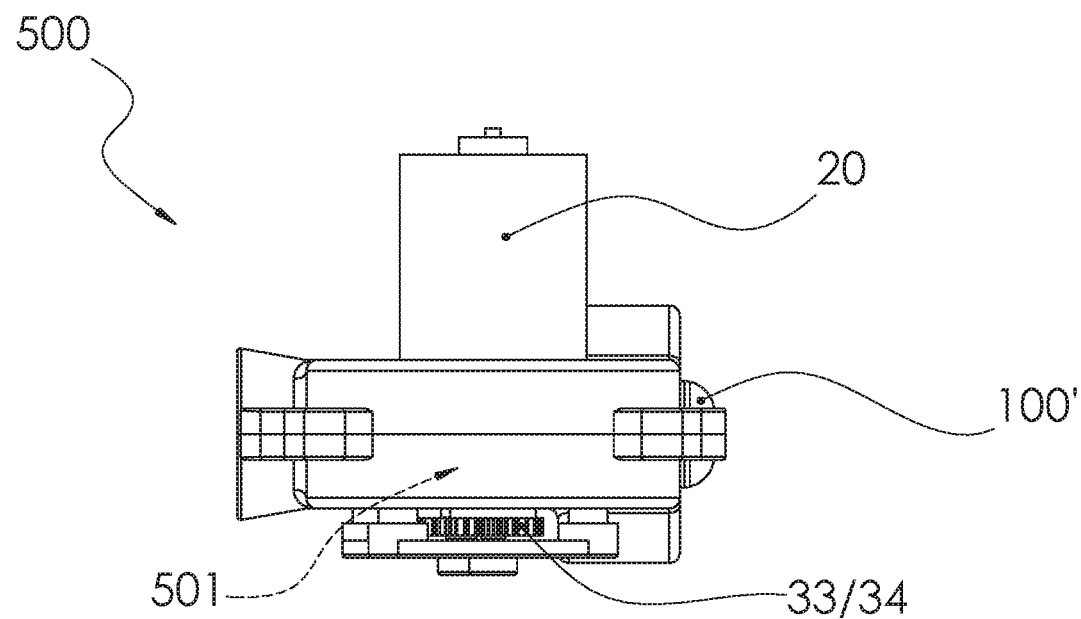
Figure 14F:
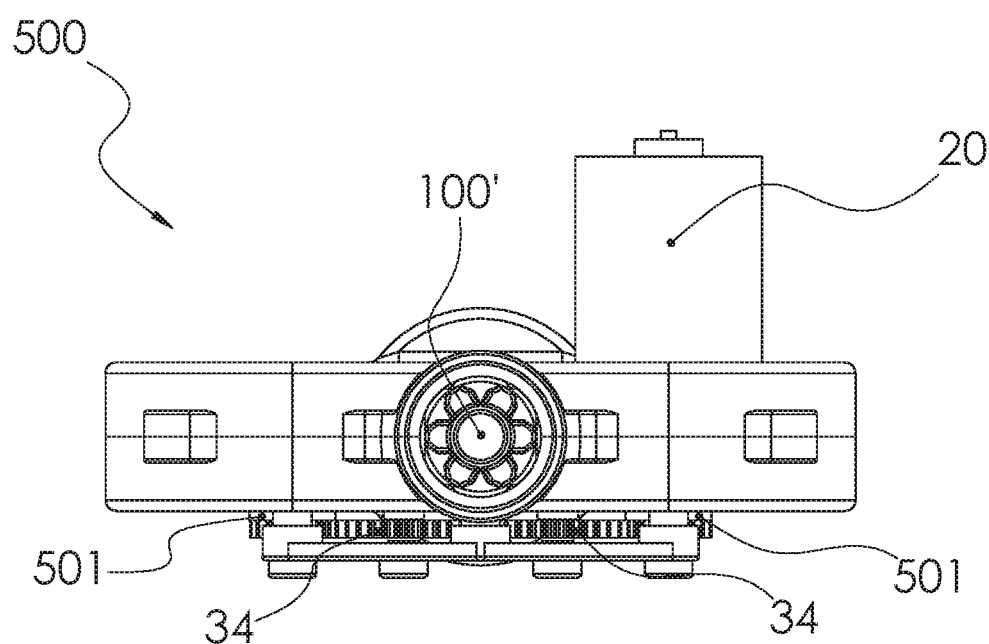
Figure 14G:
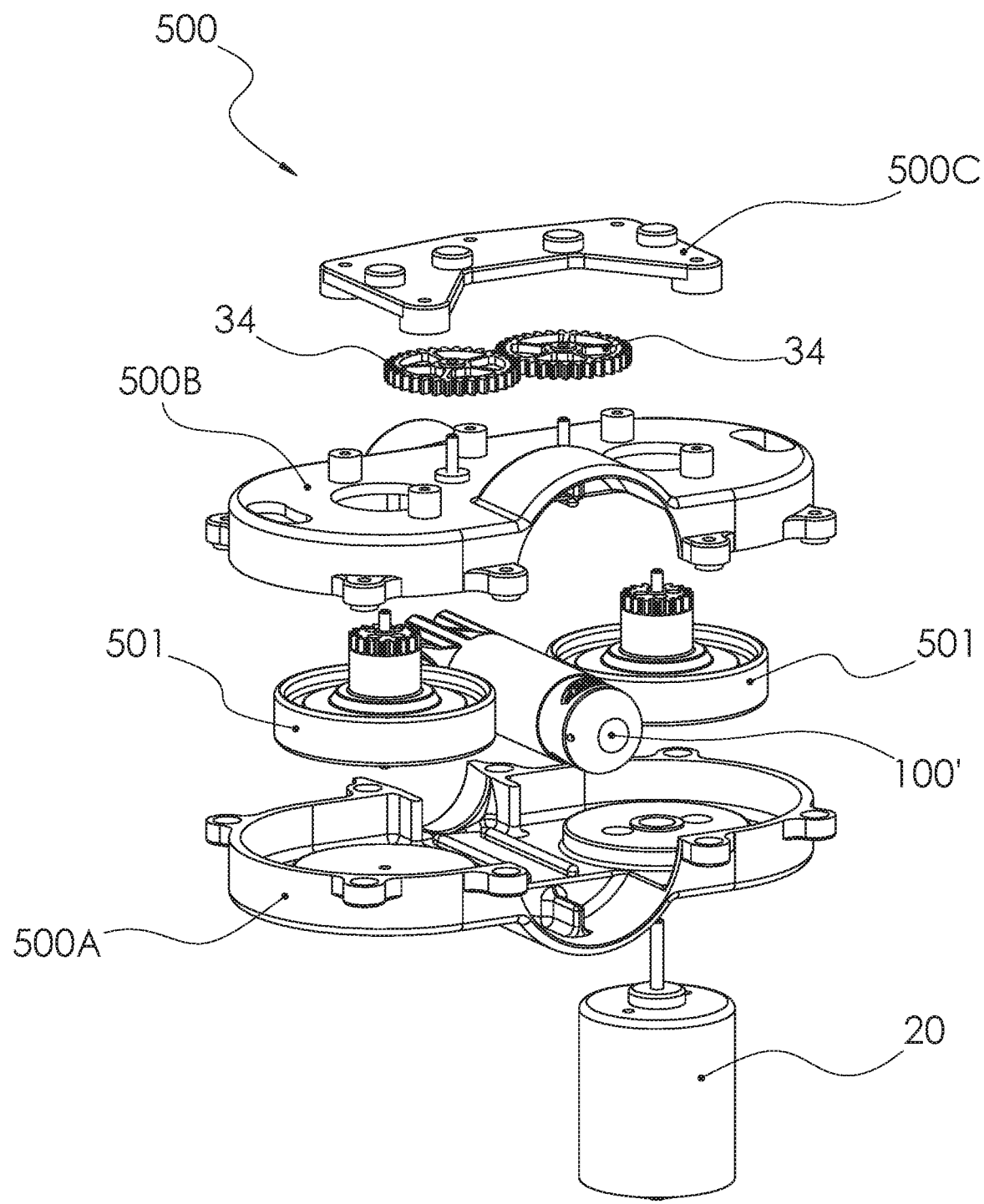
FIG. 14G is an exploded view of the alternate single-motor projectile-launching apparatus of FIG. 14A.
Figure 14H:
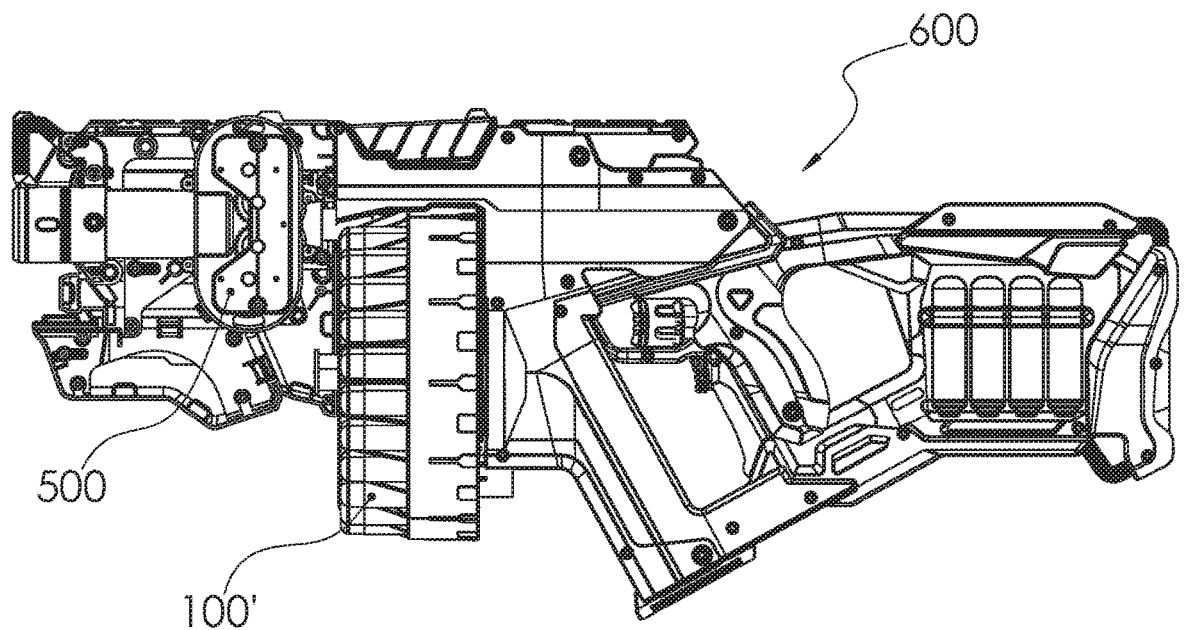
FIGS. 14H and 14I show various views of the alternate single-motor projectile-launching apparatus of FIG. 14A serving as a dart-launching mechanism within a dart-launching blaster platform, shown for example as a NERF™ Ultra One blaster.
Figure 14I:
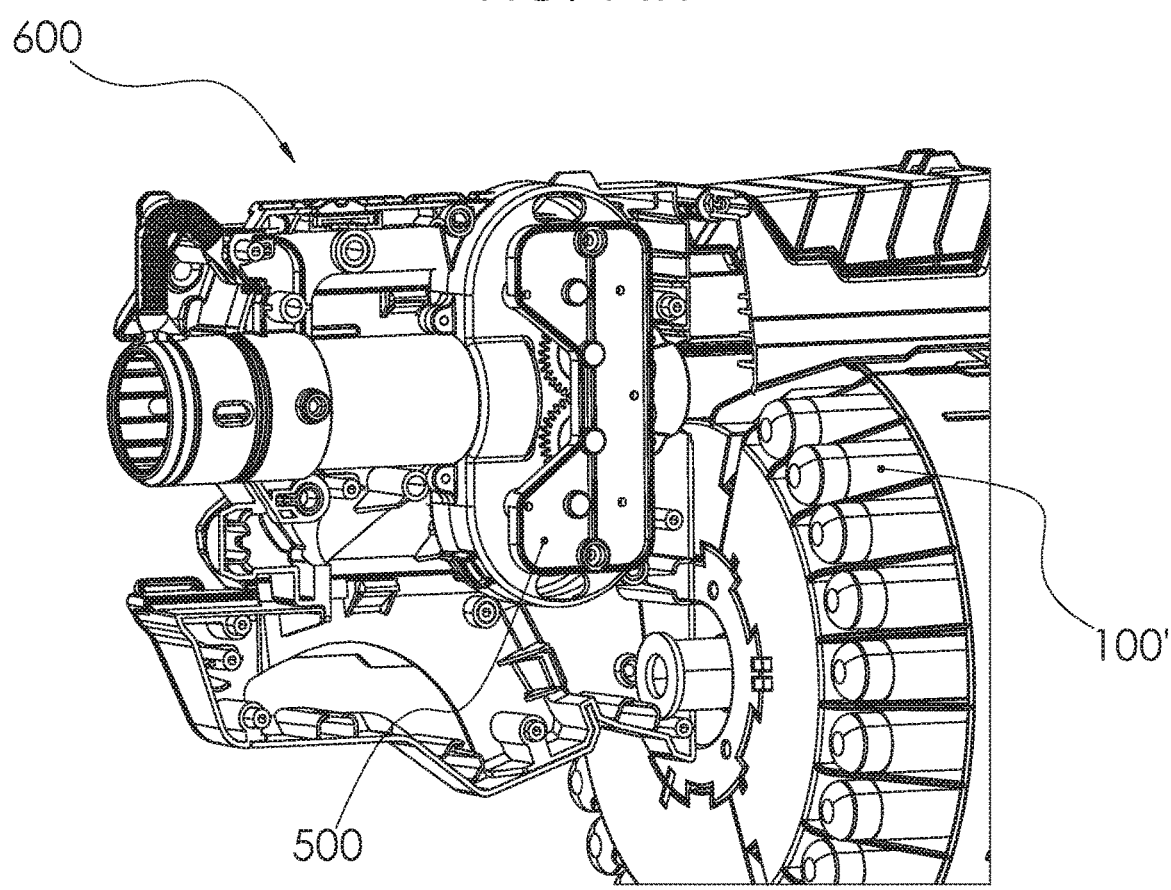
Figure 14J:
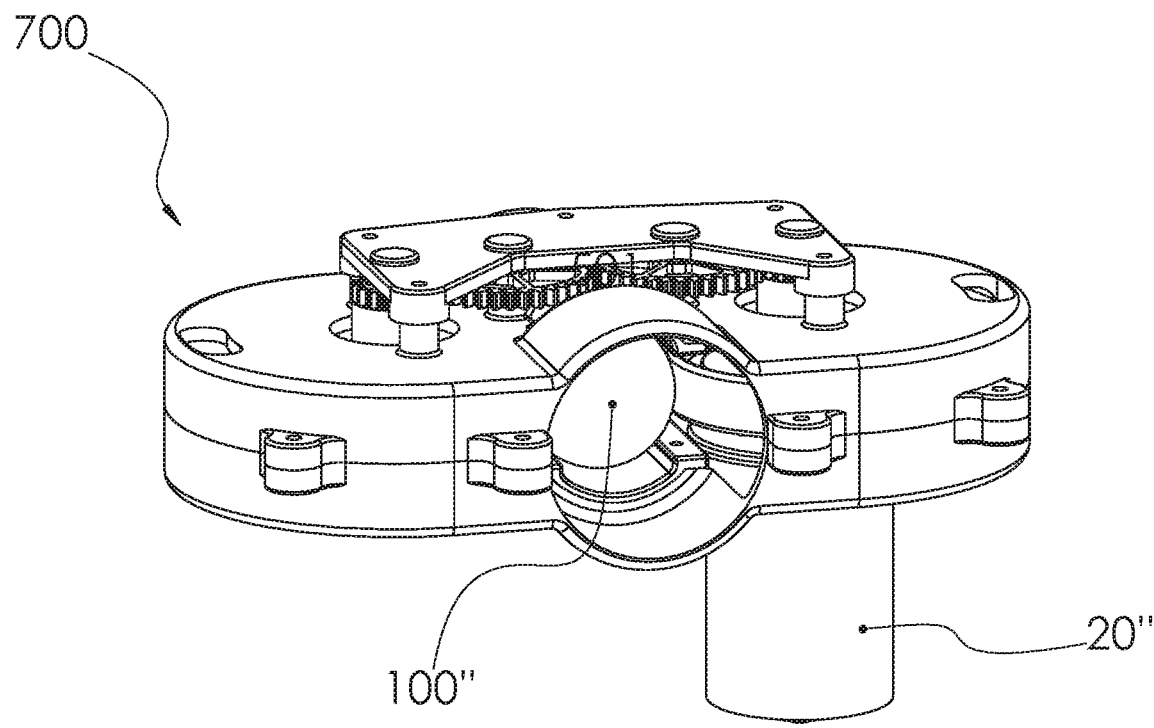
FIG. 14J is a perspective view of a second alternate single-motor projectile-launching apparatus in accordance with an embodiment of the present application including an elastomeric expanding flywheel structure mechanism and configured for launching spherical-projectiles.
Figure 14K:
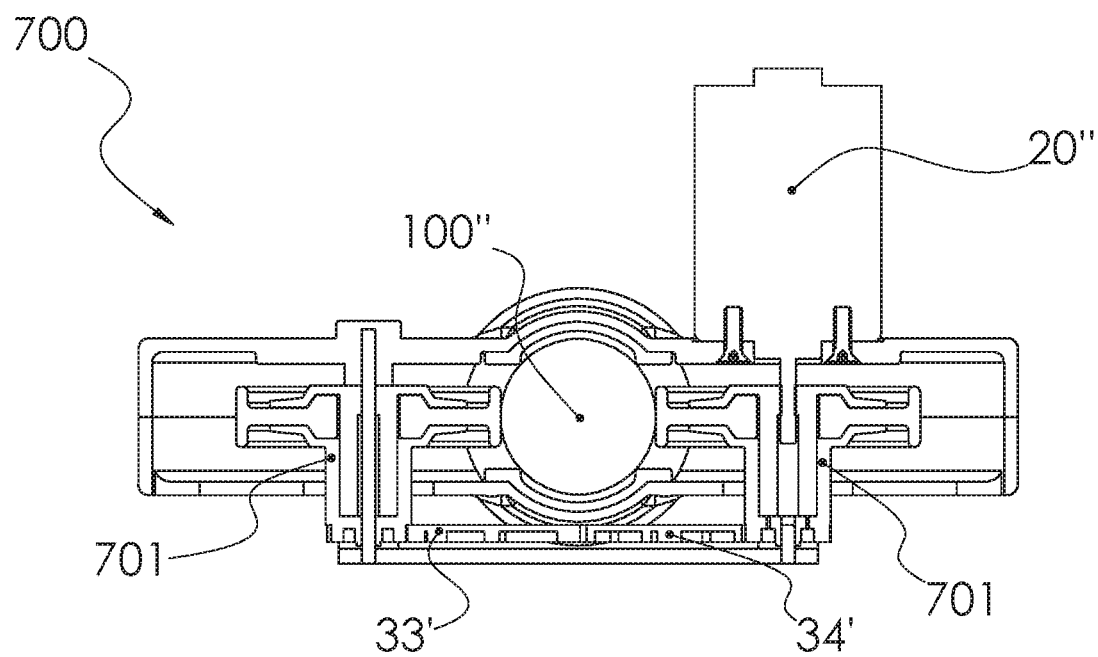
FIG. 14K is a cross-sectional view of the alternate single-motor spherical-projectile-launching apparatus of FIG. 14J, along a plane bisecting the flywheels and perpendicular to the direction of projectile launch trajectory.

As discussed herein and below alternate single-motor projectile-launching apparatus 500 may be configured to launch projectiles 100', as shown for example in FIGS. 14A and 14I. Additionally stationary, mobile, dart and projectiles launcher or hand-held structures for propelling darts, balls or other projectiles of motor assembly 20'. A further alternate single-motor projectile-launching apparatus 500 may be configured to launch spherical-projectiles 100", as shown for example in FIGS. 14J and 17A, which illustrate a single-motor spherical-projectile-launching apparatus 700 and 800, respectively with motor assembly 20" via the idler-gears 33' and 34'. The single-motor spherical-projectile-launching apparatus 700 includes a pair of elastomeric expanding flywheels 701 and 702 whose center-to-center spacing is adjusted to allow a clearance between the outer diameters of the elastomeric expanding flywheels 701/702 that is smaller than the diameter of the spherical projectile 100" when the elastomeric expanding flywheels 701/702 are not spinning, such that the pinch of the spherical-projectile 100" is greater than the pinch on the dart-like projectile 100', as seen in FIG. 14B. The elastomeric expanding flywheel structure 501 may be implemented in the single-motor projectile-launching apparatus 10, 102, 202, 302, 302, as well as alternate single-motor projectile-launching apparatus 600, as follows. FIG. 14A is a perspective view of an alternate single-motor projectile-launching apparatus in accordance with an embodiment of the present application including an elastomeric expanding flywheel structure mechanism. FIG. 14B is a cross-sectional view of the alternate single-motor projectile-launching apparatus of FIG. 14A, along a plane bisecting the flywheels and perpendicular to the direction of projectile launch trajectory. FIG. 14G is an exploded view of the alternate single-motor projectile-launching apparatus of FIG. 14A with housing 500A/500B and cover 500C.

Figure 15A:
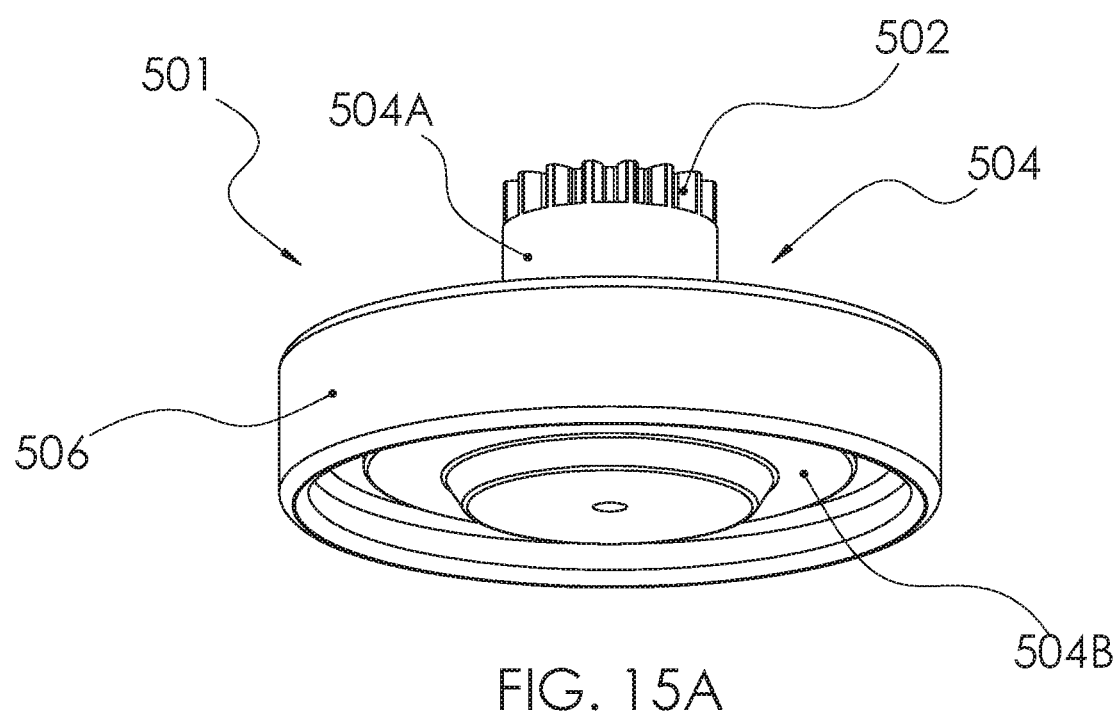
FIGS. 15A and 15B shows various views of an exemplary elastomeric expanding flywheel structure mechanism showing an elastomeric expanding tire and a hub structure, where the hub structure retains said elastomeric expanding tire between two hub parts and showing a power-transmission feature of the hub structure.
Figure 15B:
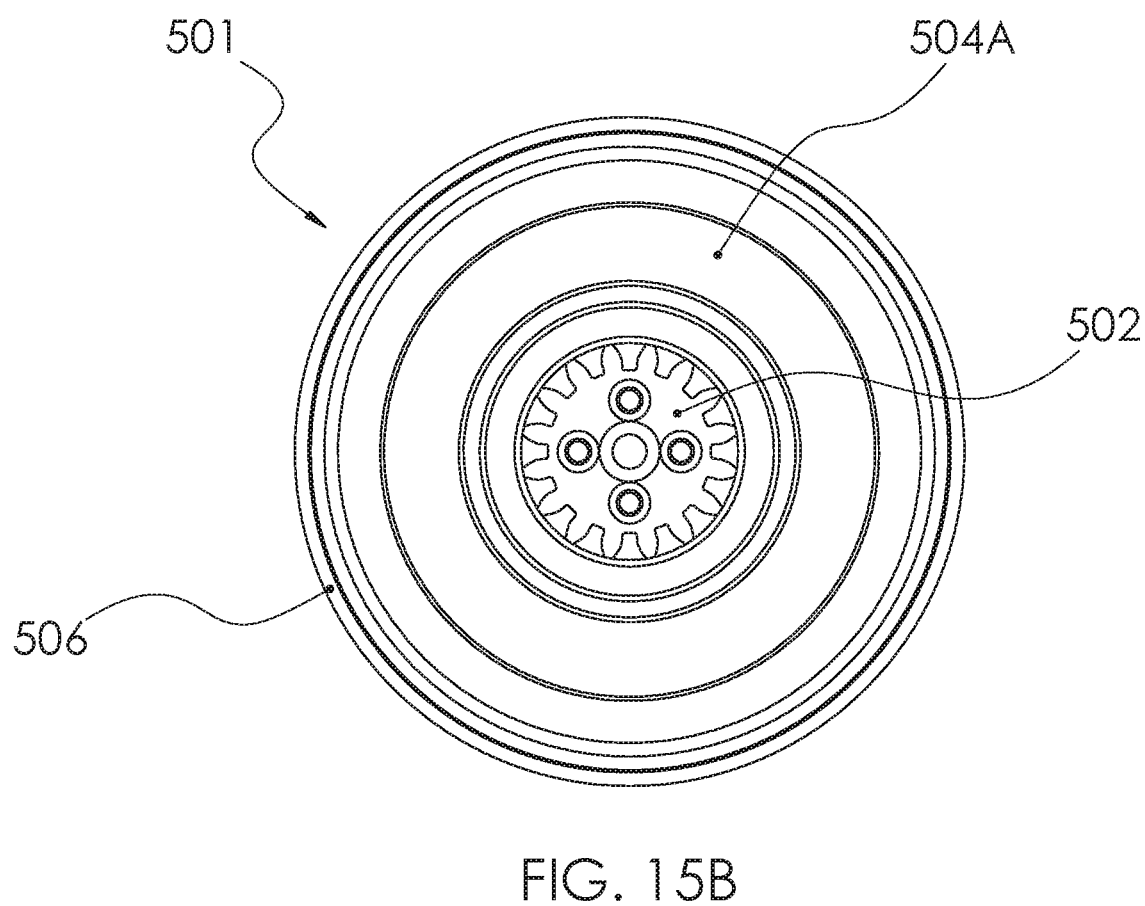
Figure 15C:
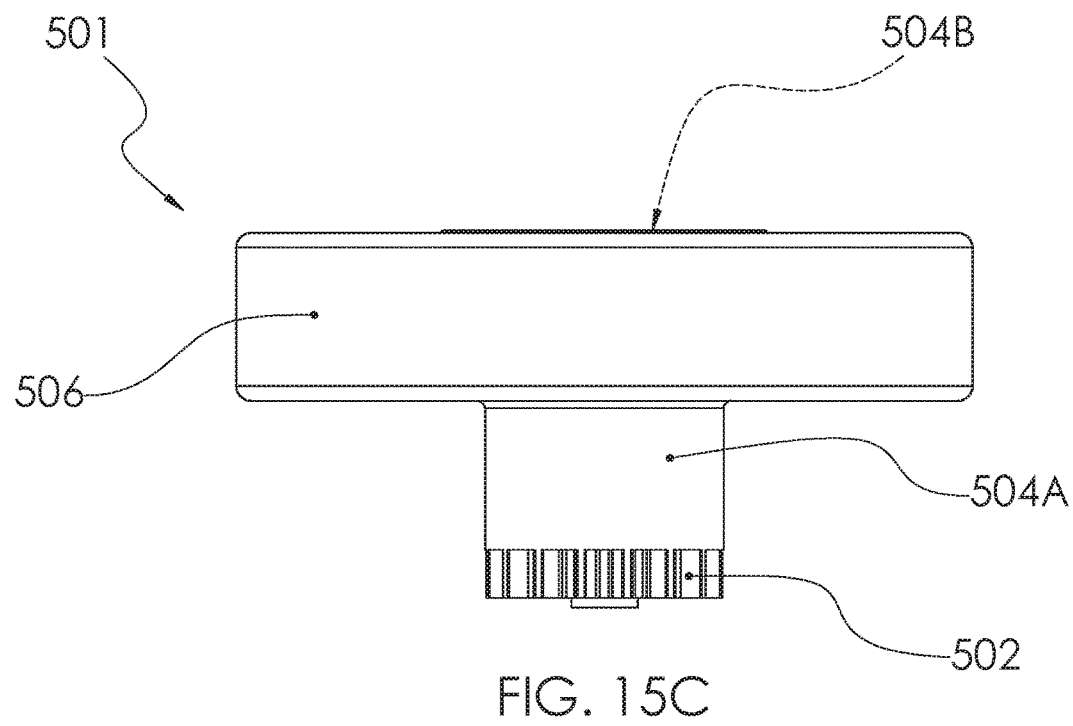
FIG. 15C is a side view of the view of the elastomeric expanding flywheel structure mechanism of FIG. 15A.
Figure 15D:
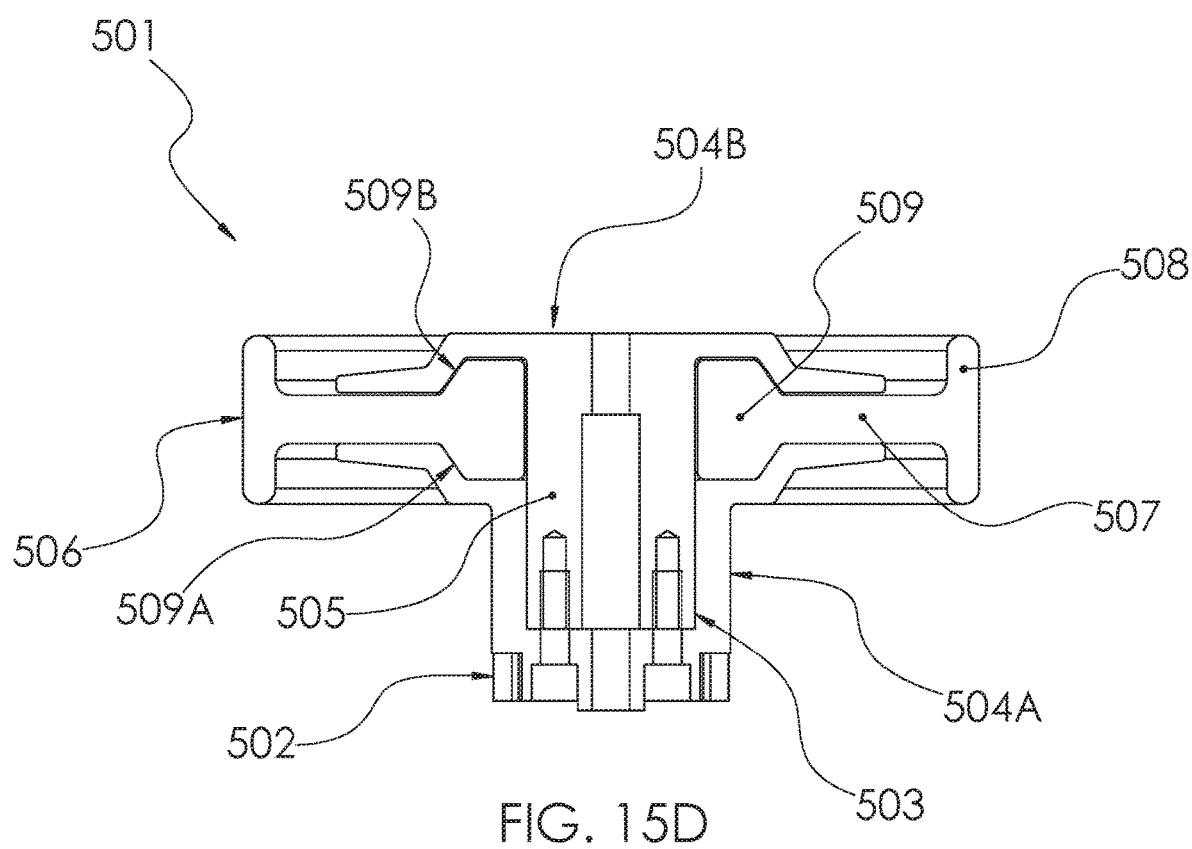
FIG. 15D is a cross-sectional view of the elastomeric expanding flywheel structure mechanism of FIG. 15C, showing in detail the elastomeric expanding tire rim, elastomeric expanding tire stem, elastomeric expanding tire retaining feature, hub side A, hub side B, hub stem, hub stem cavity, and hub power-transmission feature.
Figure 15E:
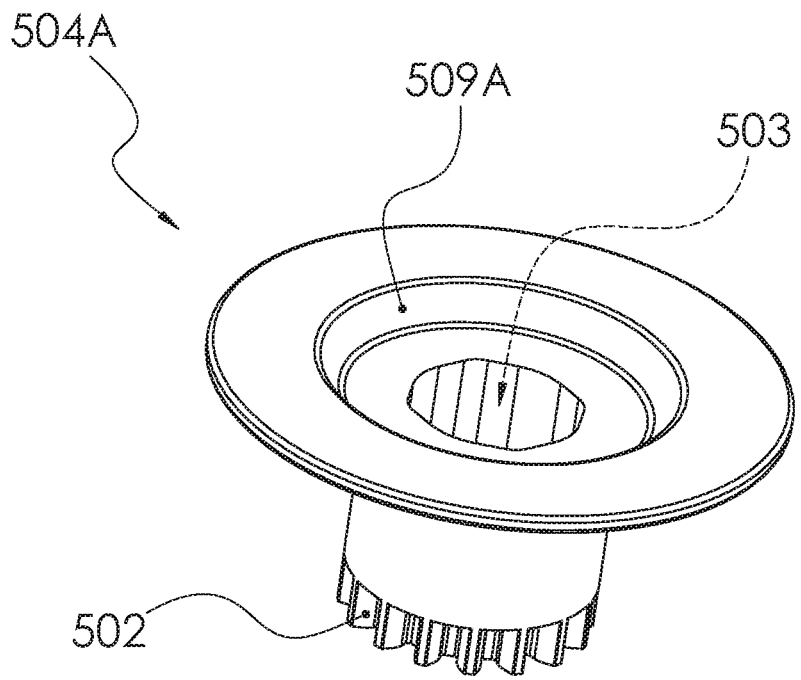
FIG. 15E is a perspective view of hub side A of FIGS. 15A-15D, showing the power transmission feature, the hub stem cavity, and the retaining feature.
Figure 15F:
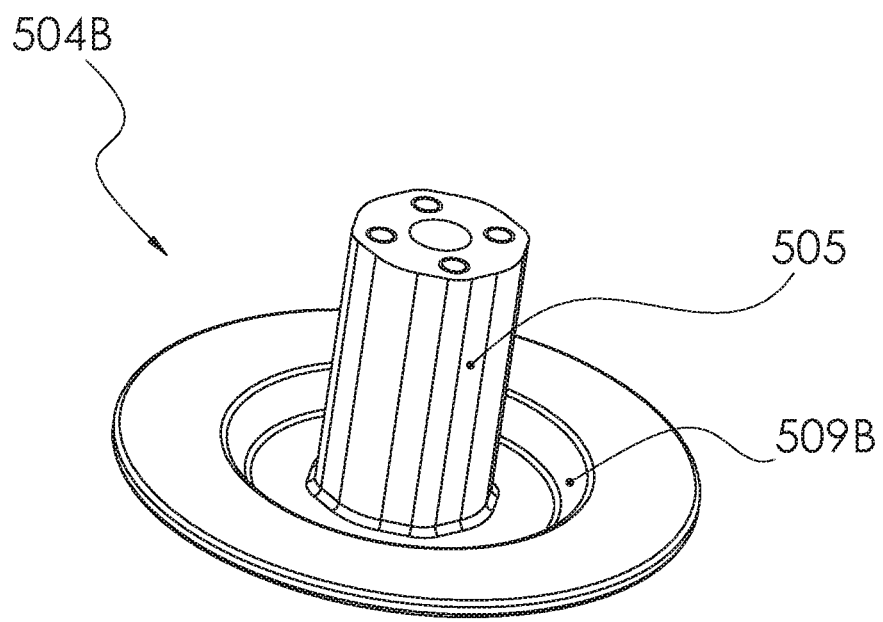
FIG. 15F is a perspective view of hub side B of FIGS. 15A-15D, showing the hub stem, and the retaining feature.
Figure 15G:
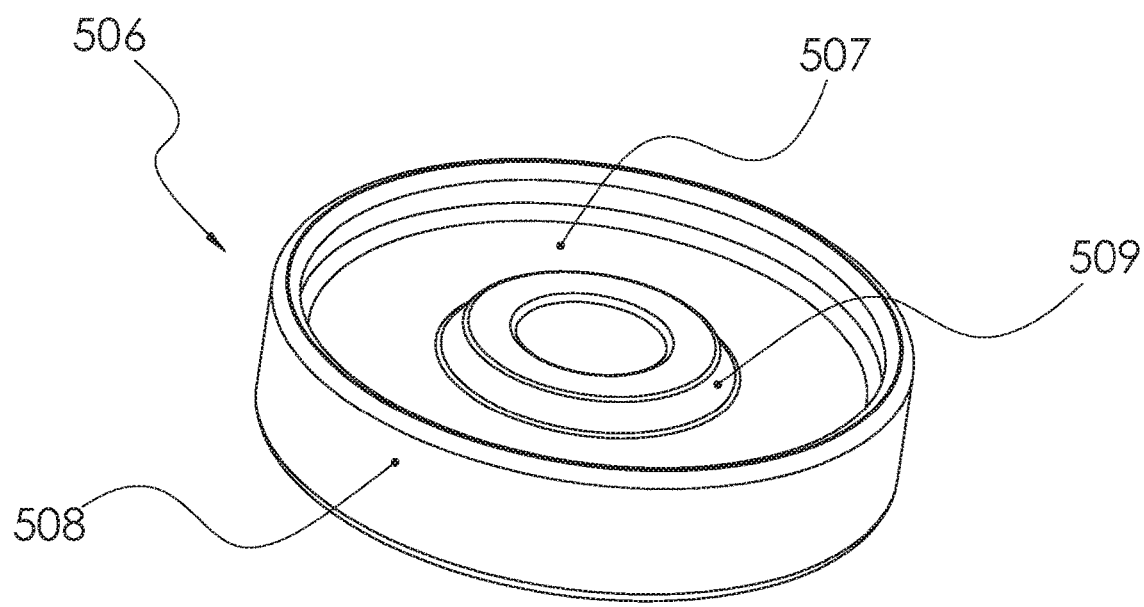
FIGS. 15G and 15H show various views of the elastomeric expanding tire of FIGS. 15A-15D.
Figure 15H:
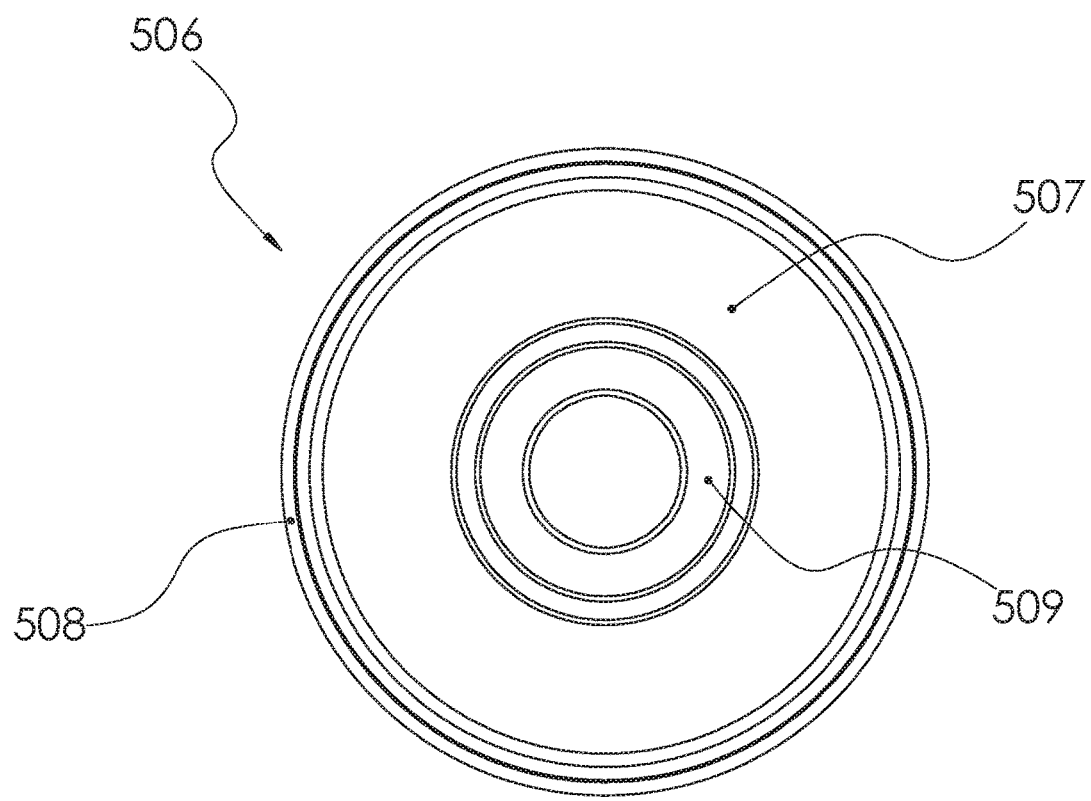

In an embodiment of the inventions, as seen in FIGS. 15A-15D, a elastomeric expanding flywheel structure 501 includes an elastomeric expanding tire 506, and a hub structure 504 comprising a hub side A 504A and a hub side B 504B. As seen in FIGS. 15D-15F, the hub side B 504B includes a hub stem 505 and a retaining feature 509B, and the hub side A 504A includes a hub stem cavity 503 and a retaining feature 509A. Hub side A 504A includes a power transmission feature 502 situated at the end of hub side A 504A distal to the retaining feature 509A. As illustrate in FIGS. 15G and 15H, the elastomeric expanding tire 506 includes an annular rim 508 that is smooth along its circumference, an annular elastomeric expanding tire retaining feature 509, and a spine 507 which extends out radially between the elastomeric expanding tire retaining feature 509 and rim 508, bridging the elastomeric expanding tire retaining feature 509 and rim 508.

While the power transmission features 502/512/522/532/542/552/562/572 as illustrated as a gear in the figures, any suitable power transmission mechanism as understood by one skilled in the art may be employed. For example, a belt, friction wheel, chain, or direct motor-drive may be used in place of the gear as a means to provide power to, or take power from, the hub wheel structure 504 and, in-turn, the elastomeric expanding flywheel structure 501.

In an assembled elastomeric expanding flywheel structure 501, the elastomeric expanding tire 506 is seated over the hub stem 505 and situated between hub stem A 504A and hub stem B 504B such that the elastomeric expanding tire retaining feature 509 is engaged by the retaining features 509A and 509B (see FIG. 15D, for example). As also shown in FIG. 15D, the hub stem cavity 503 of hub side A 504A receives hub stem 505 of hub side 504B thereby centering the hub structure 504 and elastomeric expanding tire 506.

Figure 15I:
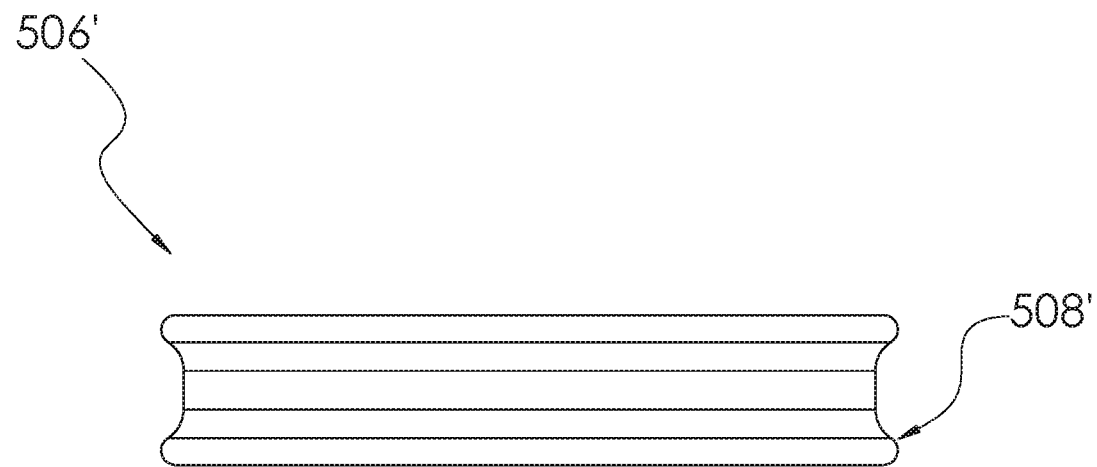
FIG. 15I is a side view of the elastomeric expanding tire of FIGS. 15G and 15H, showing the elastomeric expanding tire in a radially expanded state.
Figure 15J:
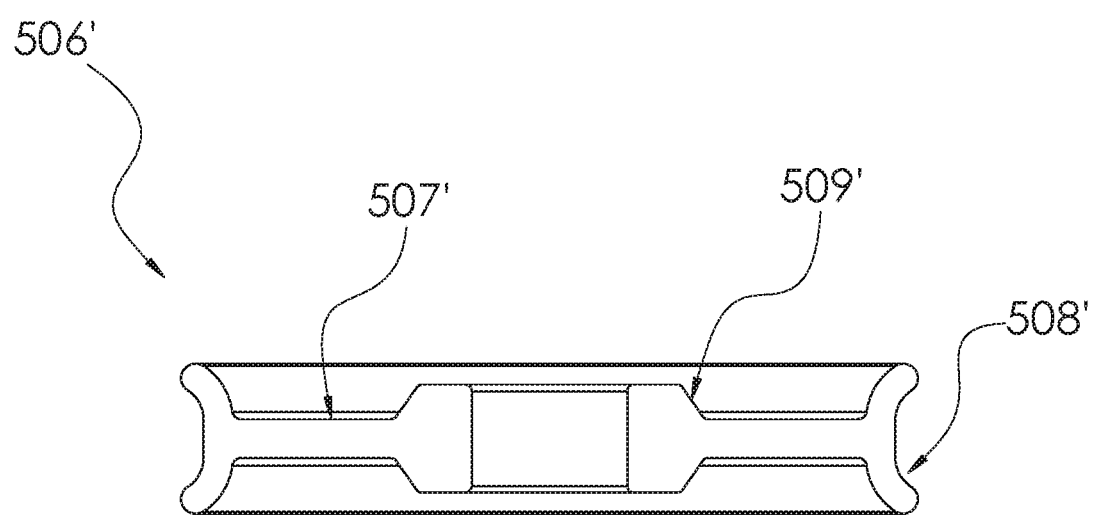
FIG. 15J is a cross-sectional view of the radially-expanded state elastomeric expanding flywheel structure mechanism of FIG. 15I, showing the elastomeric expanding tire rim assuming a curved-profile with the free-ends of the rim bending radially outward due to centrifugal force, and showing the spine assuming an axially thinner state as dictated by Poisson's ratio due to the radial expansion of the elastomeric expanding tire.

In operation, rotation of the elastomeric expanding flywheel structure 501 causes the elastomeric expanding tire 506 to experience a centrifugal force, resulting in the elastomeric expanding tire 506 expanding out radially, in a manner similar to the expanding-action of elastomeric expanding tire 106. Upon expansion of the elastomeric expanding tire 506 in response to the centrifugal force, the elastomeric expanding tire retaining feature 509' on the elastomeric expanding tire 506 bears on the retaining feature 509A of hub side A 504A and on the retaining feature 509A of hub side B 509B such that the rim 508 and spine 507 are allowed to freely expand while the expansion of the elastomeric expanding tire retaining feature 509' is retarded by retaining features 509A and 509B, such that the elastomeric expanding tire 506 is kept centered and retained within the hub structure 504. The rim 508 maintains a nominally straight profile which then becomes curved on account of the centrifugal force. FIGS. 15I and 15J illustrate a centrifugal force-induced, radially-expanded elastomeric expanding tire 506' where the elastomeric expanding tire rim 508' assumes a curved profile with the free-ends of the rim 508' bending radially outward due to the centrifugal force such that the rim 508' assumes a curved profile while under centrifugal load, with the spine 507' assuming an axially thinner state as dictated by Poisson's ratio, due to the radial expansion of the elastomeric expanding tire 506'. Accordingly the elastomeric expanding tire rim 508' allows for its curved profile with the free-ends of the tire rim 508' bending radially outward with the centrifugal load thereat, facilitated with the spine 507' assuming its axially thinner state as a consequence of the radial expansion of the elastomeric expanding tire.

The hub structure 504 is typically composed of a rigid material, e.g. Delrin or Polyoxymethylene (POM) plastic, while the elastomeric expanding tire 506 is composed of a rubber-like material (e.g. Urethane or TPR of Shore 40 A-Shore 55 A durometer), with an outer diameter of approximately 1.53 in, a spine 507 thickness in the range of 0.070 in to 0.125 in, and a rim 508 thickness in the range of 0.050 in to 0.075 in, with a flywheels center-to-center spacing of 2.175 in. As understood by one skill in the art, other iterations may include a hub structure 504 made of other rigid materials such as metals, hard-rubber materials such as PVC or other plastics and composites and may equally include an elastomeric expanding tire 506 made of other elastomeric materials and of other durometers, dimensions, and flywheel center-to-center spacings as further embodiments without departing from the spirit and scope of the invention. As discussed in connection with FIGS. 14A and 14B and FIGS. 15A-15J the elastomeric expanding flywheel structure 501 may be implemented in the single-motor projectile-launching apparatus 10, 102, 202, 302, 302, as well as alternate single-motor projectile-launching apparatus 600.

Figure 16A:
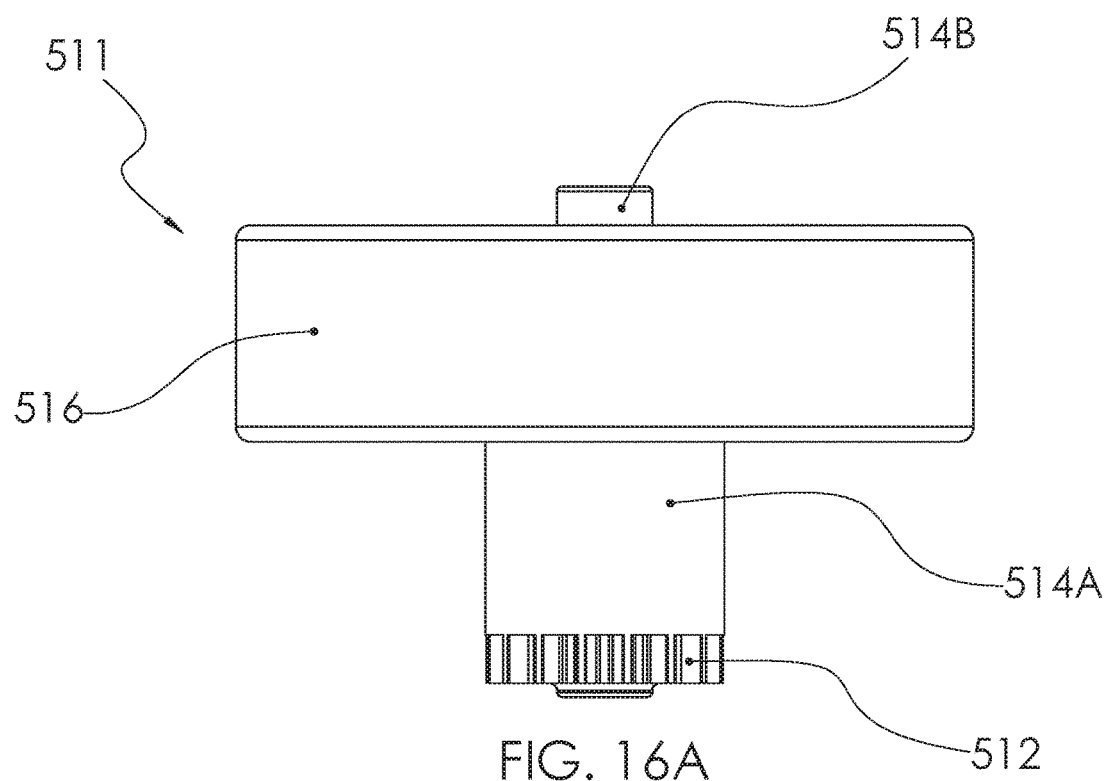
FIGS. 16A and 16B illustrate views of an alternate elastomeric expanding flywheel structure mechanism.
Figure 16B:
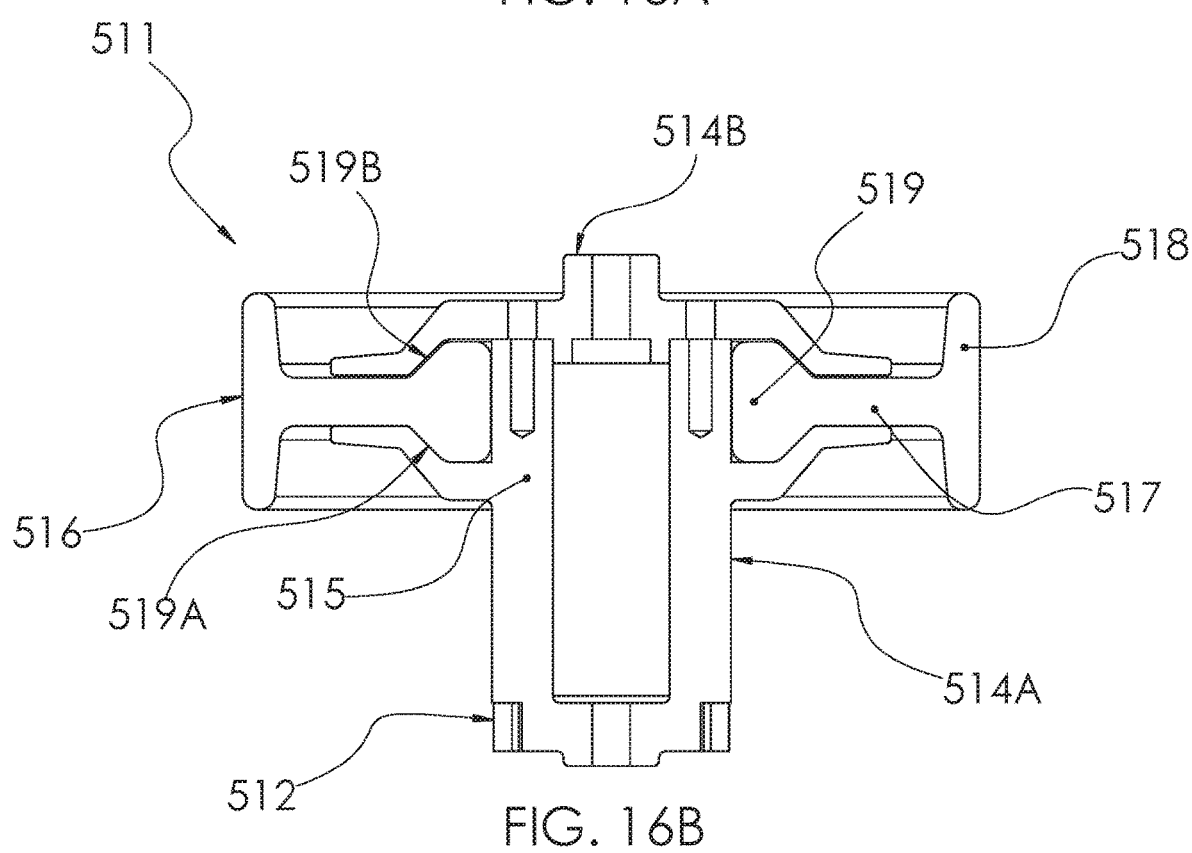
Figure 16C:
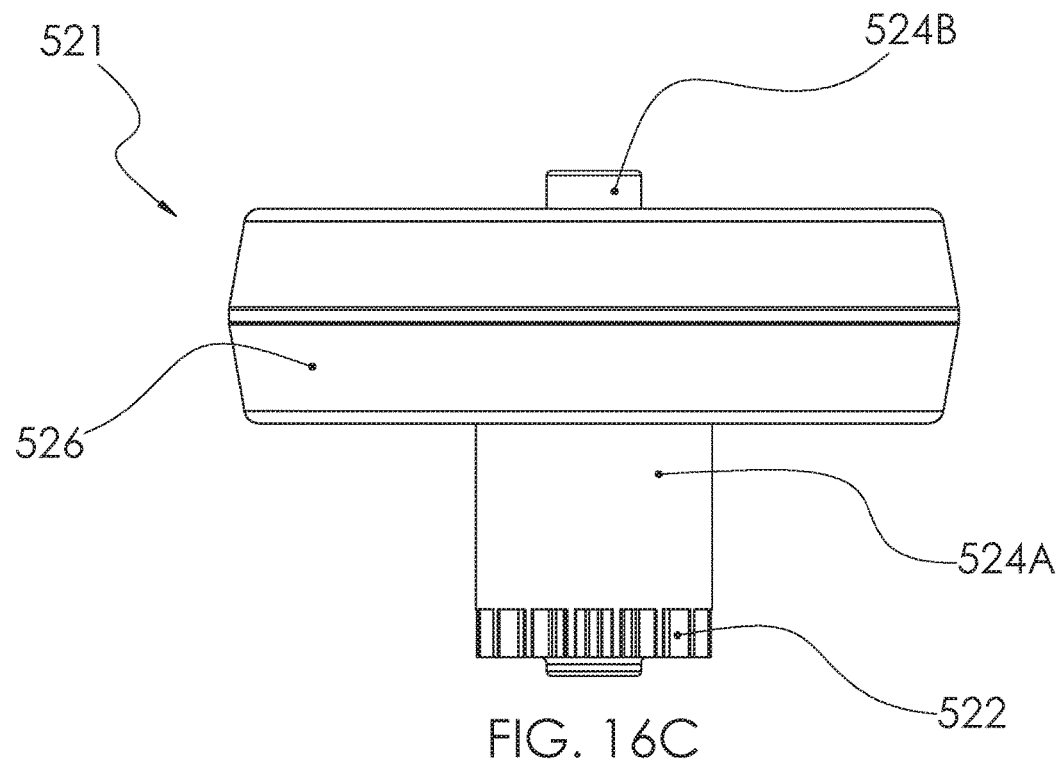
FIGS. 16C and 16D illustrate views of an alternate elastomeric expanding flywheel structure mechanism.
Figure 16D:
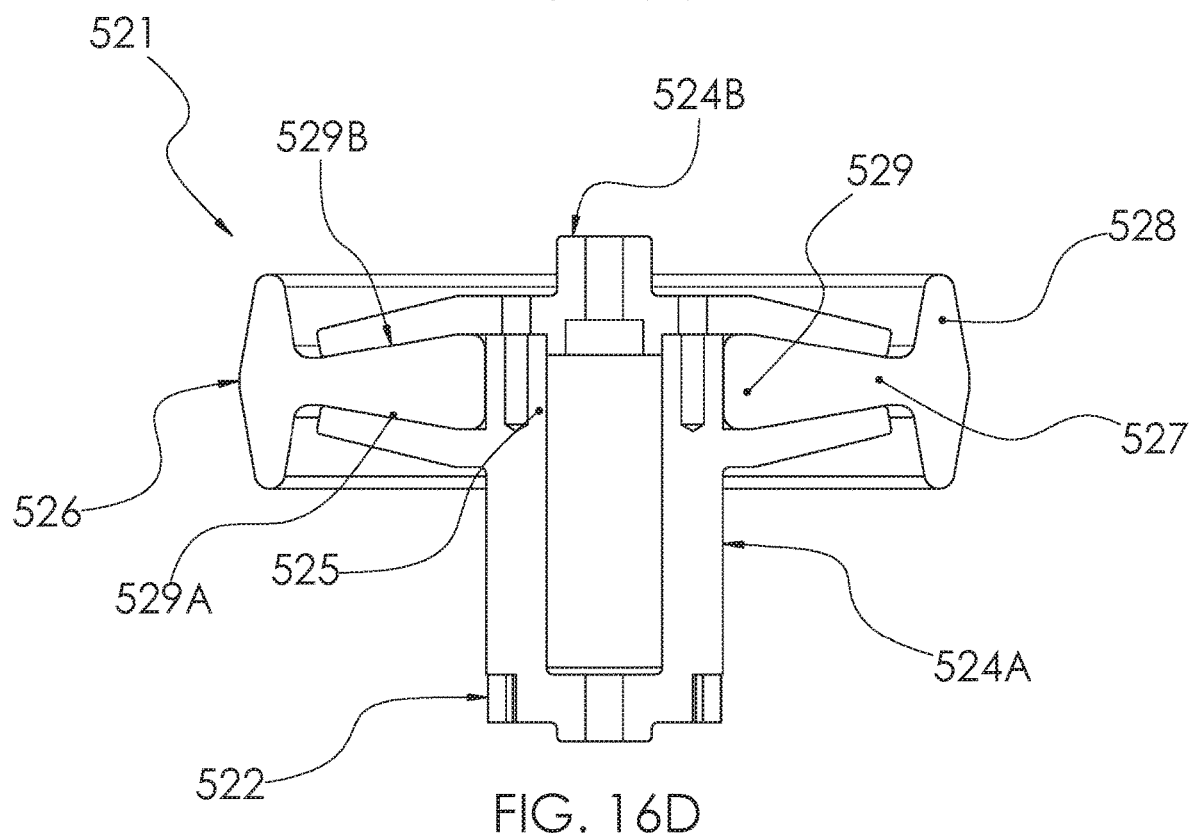
Figure 16E:
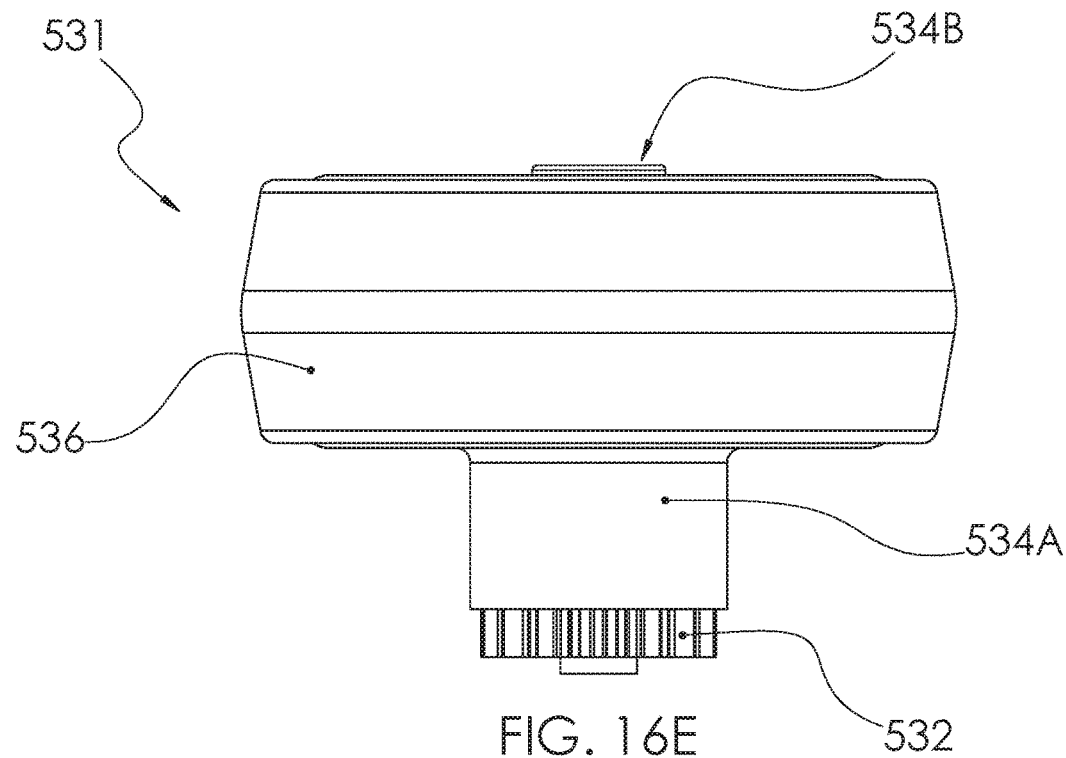
FIGS. 16E and 16F illustrate views of an alternate elastomeric expanding flywheel structure mechanism.
Figure 16F:
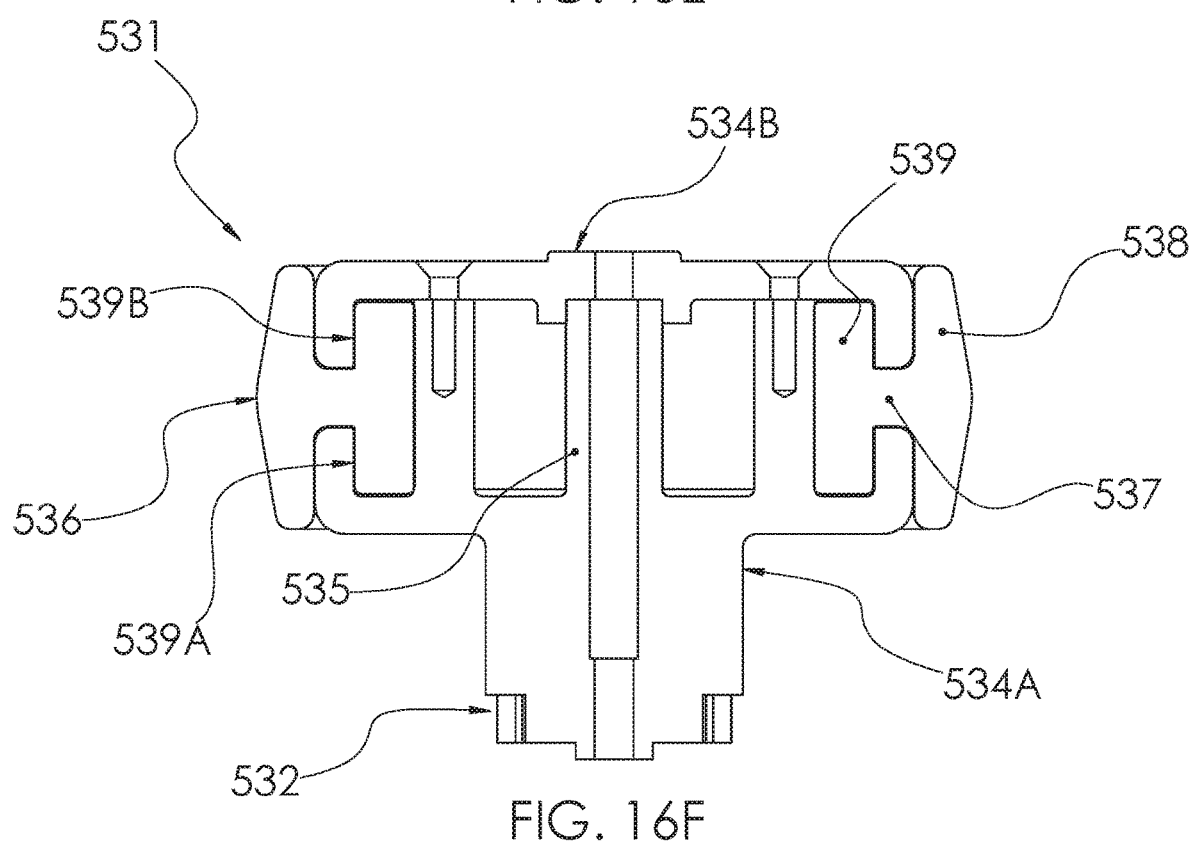
Figure 16G:
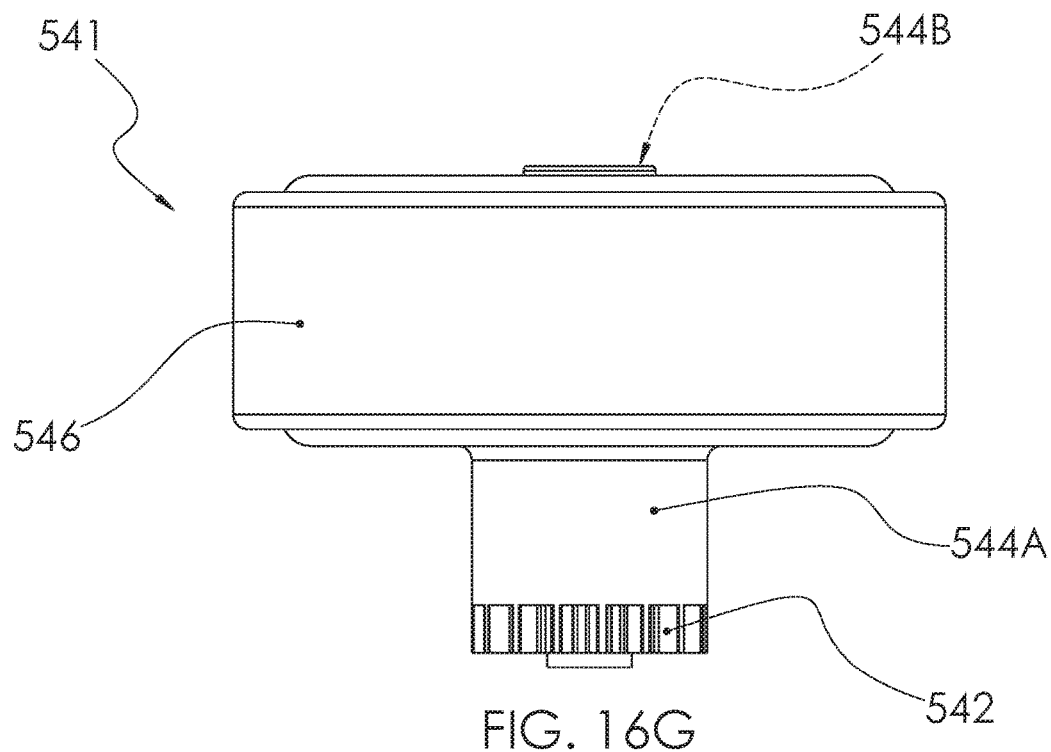
FIGS. 16G and 16H illustrate views of an alternate elastomeric expanding flywheel structure mechanism.
Figure 16H:
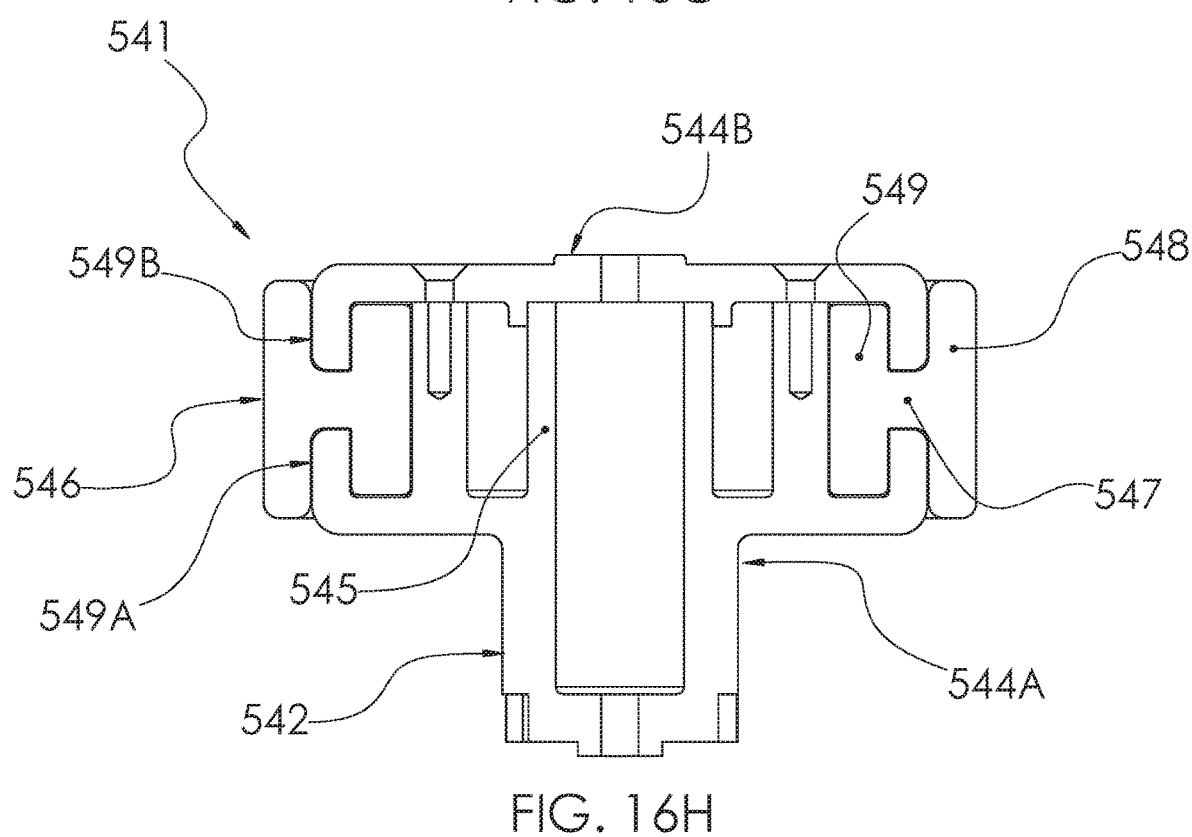
Figure 16I:
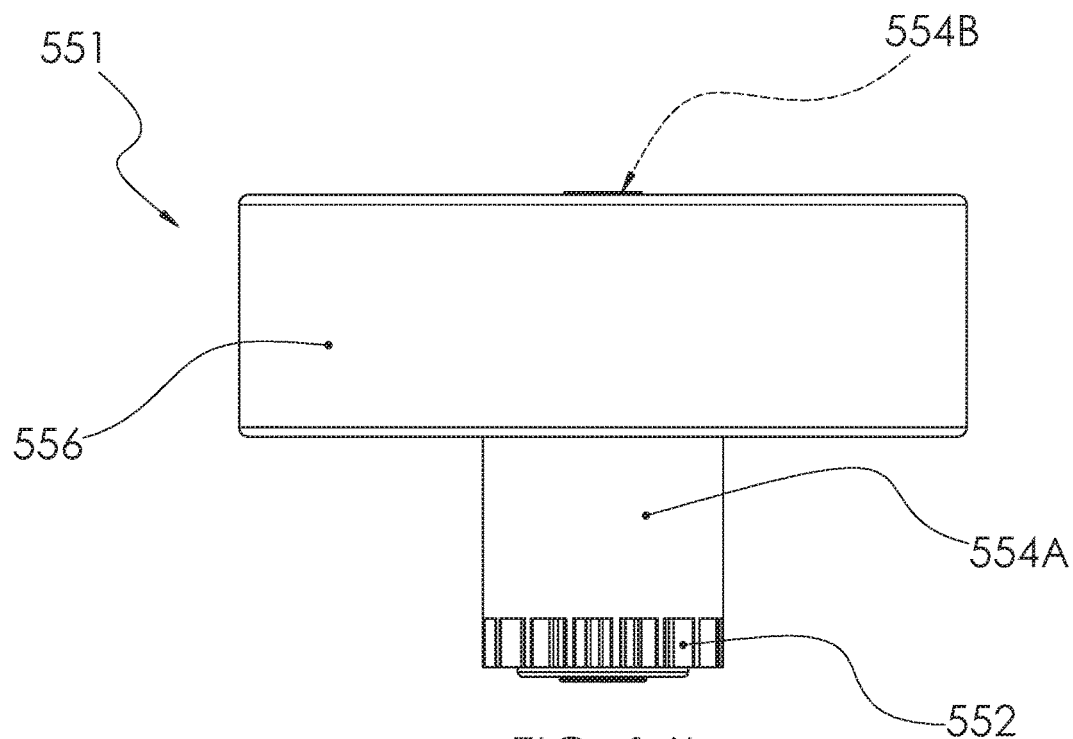
FIGS. 16I and 16J illustrate views of an alternate elastomeric expanding flywheel structure mechanism.
Figure 16J:
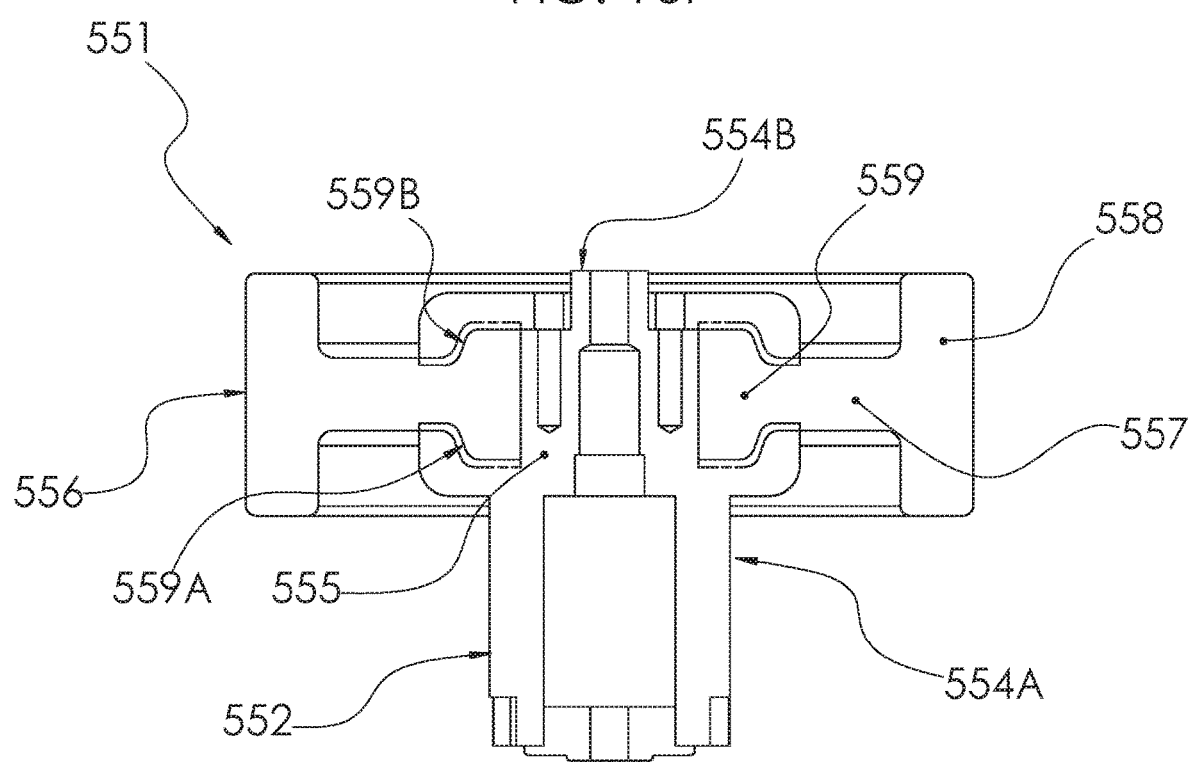
Figure 16K:
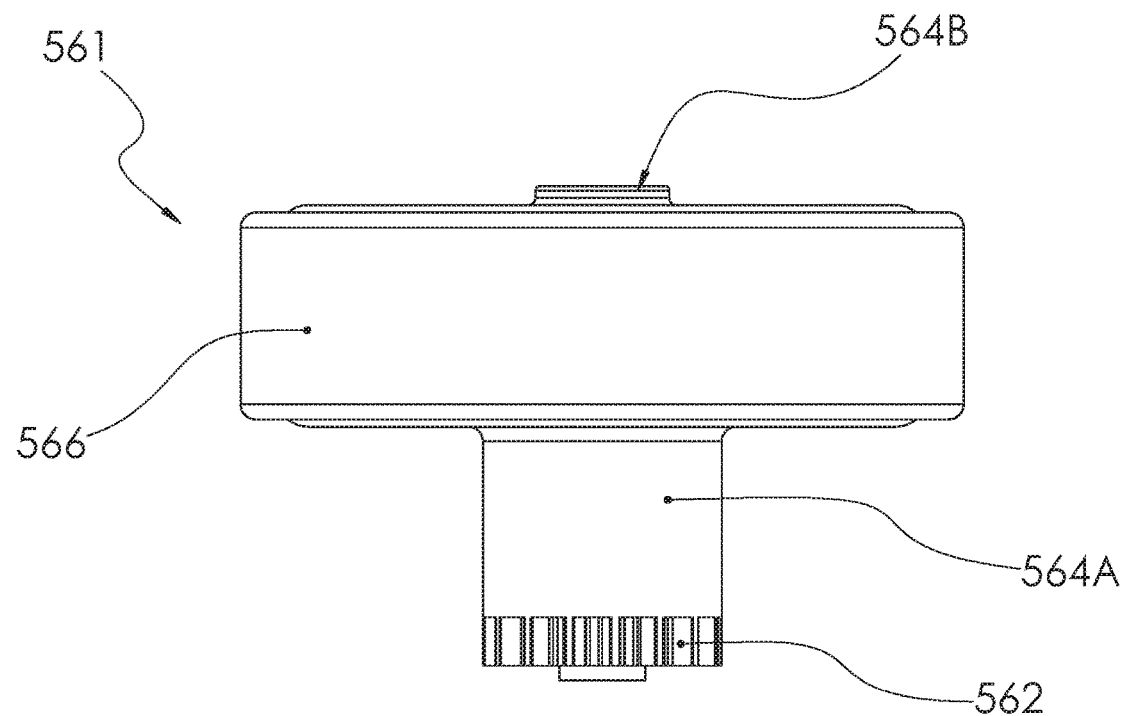
FIGS. 16K and 16L illustrate views of an alternate elastomeric expanding flywheel structure mechanism.
Figure 16L:
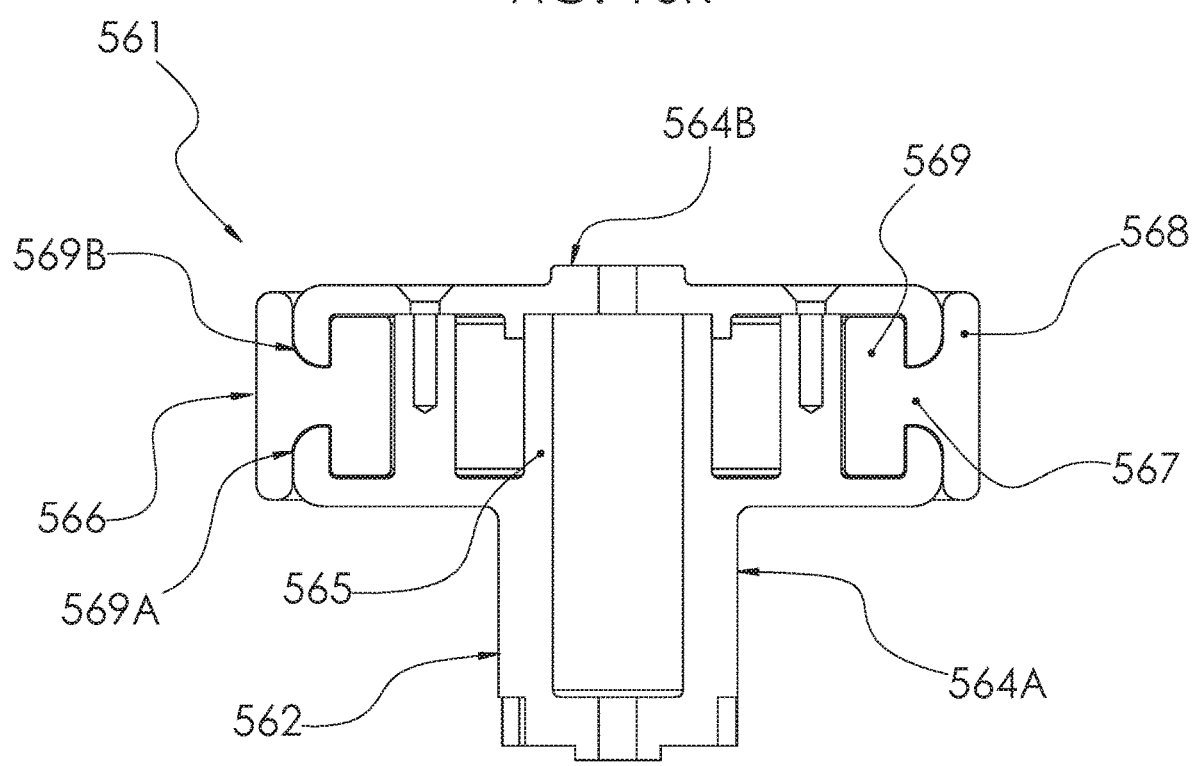
Figure 16M:
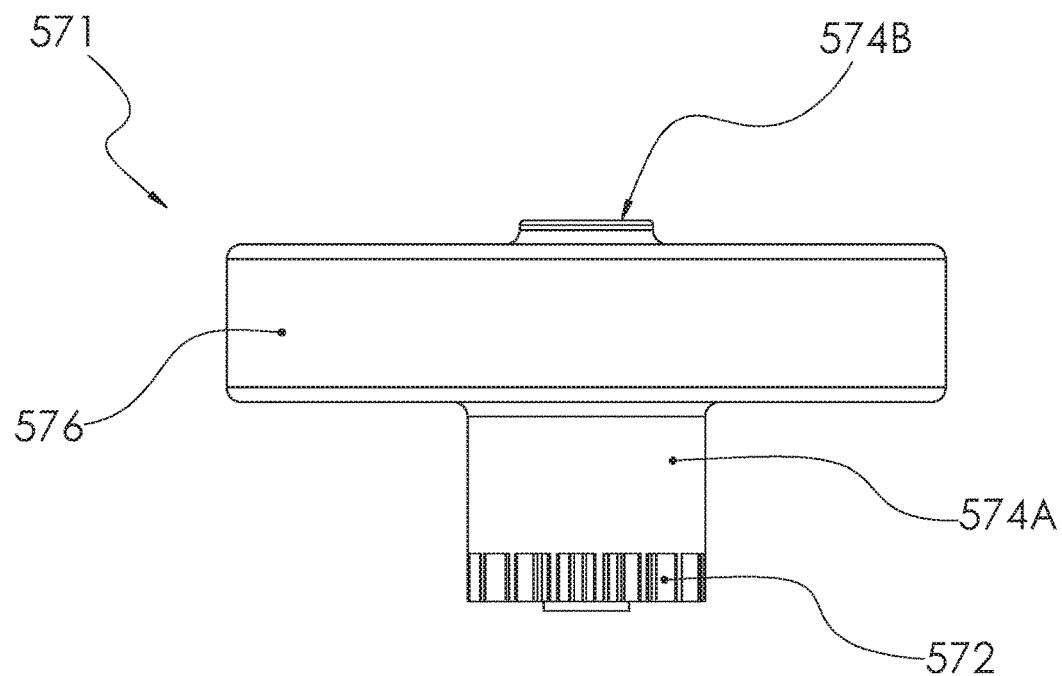
FIGS. 16M and 16N illustrate views of an alternate elastomeric expanding flywheel structure mechanism.
Figure 16N:
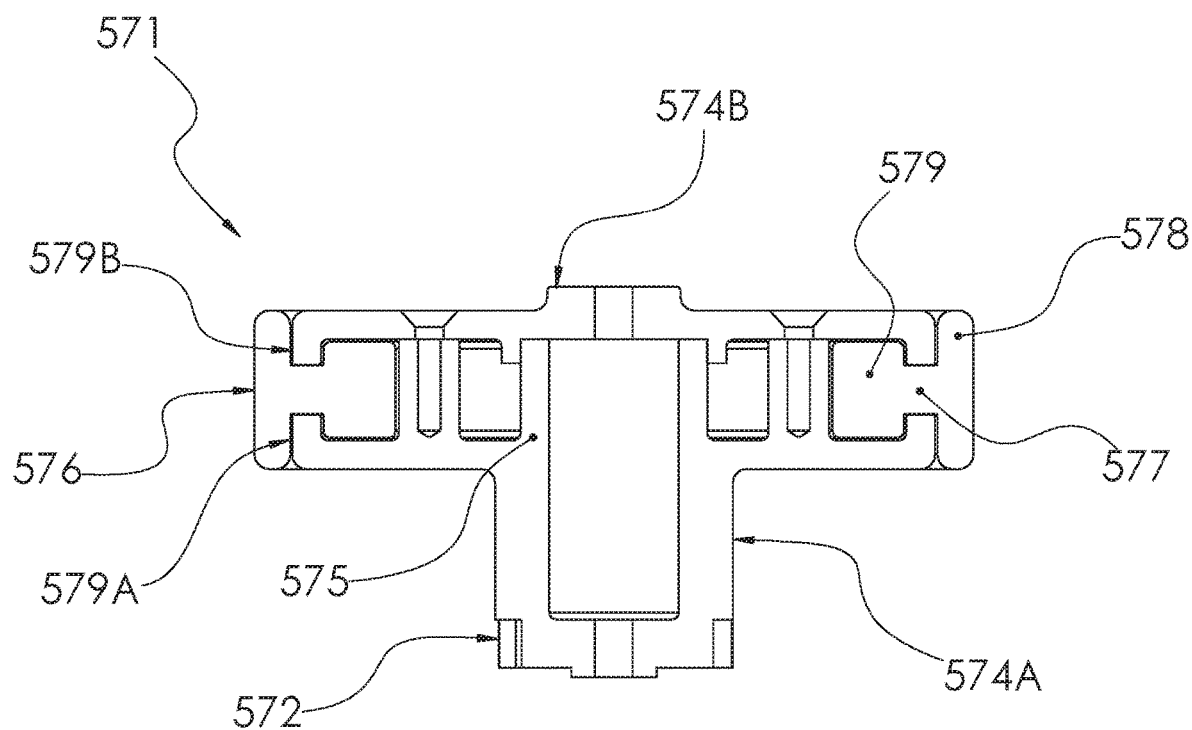

FIGS. 16A-16N show various iterations of the elastomeric expanding flywheel structure 501. In FIGS. 16A-16N each iteration is designated by a varying middle numeral in the designation (e.g. a first iteration of the elastomeric expanding flywheel structure 501 is designated as 511, e.g. a second iteration is designated as 521.) A similar designation scheme is applied to the individual components of the elastomeric expanding flywheel structure 501 (e.g. a first iteration of the elastomeric expanding tire 506 is designated as 516, with later iterations designations 526, et seq.)

FIGS. 16A and 16B show iteration 511, where the elastomeric expanding tire rim 516, 518 has an angled inner rim wall and a rounded retaining feature 519 with a spine 517 and a rounded outer wall 519A/519B and a hub side A 514A receives hub stem 515 with hub side B 514B that compress the retaining feature 519, reducing the extend of expansion of the free-ends of the rim 516. The retaining feature 529 has angled outer wall 529A/529B and a hub side A 524A receives hub stem 525 with hub side B 524B that compress the retaining feature 529. FIGS. 16C and 16D show iteration 521, where the elastomeric expanding tire rim 526, 528 has angled inner and outer rim walls and a tapered retaining feature 529 and spine 527 where the retaining feature 539 has angled outer wall 539A/539B and a hub side A 534A receives hub stem 535 with hub side B 534B that compress the retaining feature 539. FIGS. 16E and 16F show iteration 531, where the elastomeric expanding tire rim 538 has angled outer rim wall 536, prioritizing contact between the elastomeric expanding tire 506 and a projectile 100 to the central area of the rim 536 and straight-walled retaining feature 539, situated radially adjacent to the elastomeric expanding tire rim 538 and spine 537 where the retaining feature 539 has outer walls 539A/539B and a hub side A 534A and hub side B 534B that compress the retaining feature 539. FIGS. 16G and 16H show iteration 541, where the elastomeric expanding tire rim 548 has angled outer rim wall 546 with straight walls and the retaining feature 549 has straight walls and is situated radially adjacent to the elastomeric expanding tire rim and spine 547 where the retaining feature 549 has a outer wall 549A/549B and a hub side A 544A receives hub stem 545 with hub side B 544B that compress the retaining feature 549. FIGS. 16I and 16J show iteration 551, where the elastomeric expanding tire rim 558 has outer rim wall 556 with straight walls and an increased mass and the retaining feature 559 has a rounded outer wall 559A/559B and a hub side A 554A receives hub stem 555 with hub side B 554B that compress the retaining feature 559 to increase retention of the elastomeric expanding tire 556 to counteract the increased centrifugal force experienced by the elastomeric expanding tire 556 on account of the increased mass of the rim 556 and spine 557. FIGS. 16K and 16L show iteration 561, where the where the elastomeric expanding tire rim 568 has outer rim wall 566 with a heavy fillet on its inner wall for reducing the bending of the free-ends of the elastomeric expanding tire rim 566 and a retaining feature 569 with straight walls that is situated radially adjacent to the elastomeric expanding tire rim and spine 567 where the retaining feature 569 has outer wall 569A/569B and a hub side A 564A receives hub stem 565 with hub side B 564B that compress the retaining feature 569. FIGS. 16M and 16N show iteration 571, where the where the elastomeric expanding tire rim 578 has angled outer rim wall 576 with straight walls and the retaining feature 579 has straight walls and an increased volume for improving retention of the elastomeric expanding tire 576 and spine 577 where the retaining feature 579 has a rounded outer wall 579A/579B and a hub side A 574A receives hub stem 575 with hub side B 574B that compress the retaining feature 579.

Figure 17A:
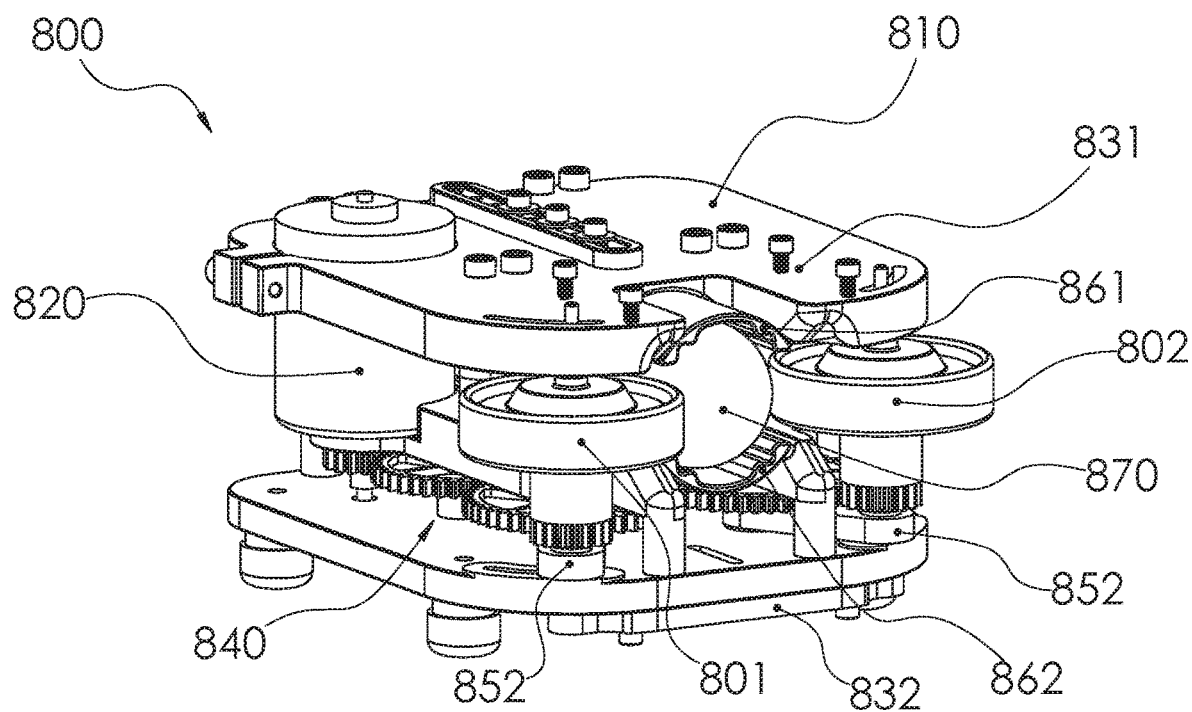
FIGS. 17A and 17B show various views of a third alternate single-motor projectile-launching apparatus that includes a flywheel center-to-center spacing and launch direction adjustment mechanisms FIG. 17C show a top-down view of the third alternate single-motor projectile-launching apparatus of FIGS. 17A and 17B illustrating the flywheels attached to swing arms, with the swing arms arranged such that the flywheels are symmetrical about longitudinal plane of the launching apparatus.
Figure 17B:
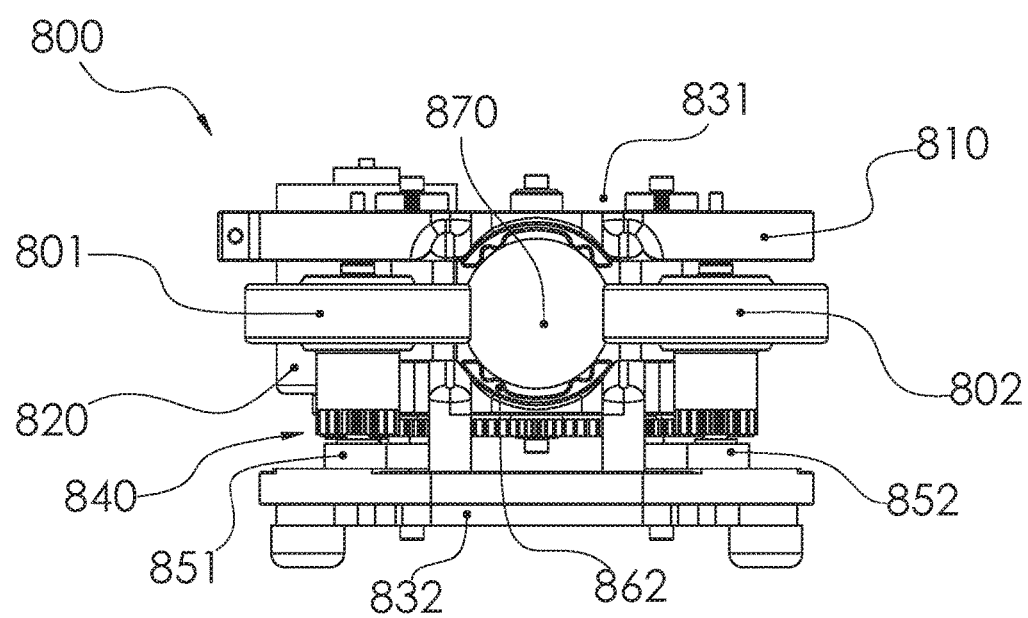

FIGS. 17A and 17B show a third alternate single-motor projectile-launching apparatus 800 that includes a housing 810, a motor 820, a power transmission mechanism 840, a first flywheel 801, a second flywheel 802, a first flywheel swing-arm 851, a second flywheel swing-arm 852, and projectile guiding elements 861/862, and flywheel locating elements 831/832, which set the center-to-center spacing between first flywheel 801 and the second flywheel 802 for variable flywheel center-to-center distance accommodating various projectiles and level of pinch on said projectiles.

In one embodiment, the motor 802 is mounted to the housing 810 and powers the flywheels 801/802 through the power transmission mechanism 840, shown for example as a gear train in FIGS. 17A and 17B, such that the flywheels 801/802 spin at a desired rotational speed for launching a projectile 870 at a desired linear speed form the projectiles launcher structures for propelling balls or similar projectiles. The projectile guiding elements 861/862 are attached to the housing 810 and center the projectile 870 with the flywheels 801/802. The guiding elements 861/862 are configured to disengage contact from the projectile 870 once the projectile is engaged within the flywheels 801/802 such that power from the flywheels may be transmitted to the projectile 870 accelerating the projectile and launching it out of the single-motor projectile-launching apparatus 700. As understood by one skilled in the art, the guiding elements 861/862 may be configured to disengage from the projectile 870 at any desired point in its travel through the launching apparatus 700.

Figure 17C:
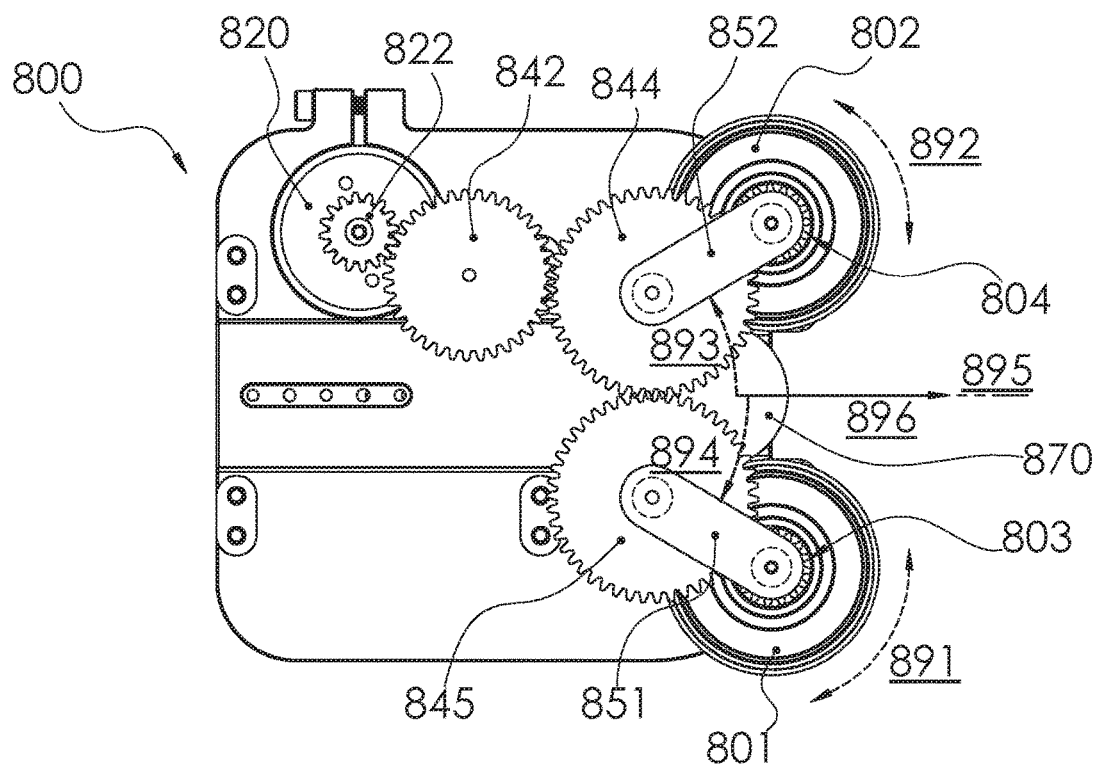
FIG. 17D show a top-down view of the third alternate single-motor projectile-launching apparatus of FIGS. 17A and 17B illustrating the flywheels attached to swing arms, with the swing arms arranged such that the flywheels are non-symmetrical about longitudinal plane of the launching apparatus and the launch direction of the projectile is not aligned with said longitudinal plane.

Referring now to FIG. 17C, an idler gear 842 transmits power from the motor 820, via motor pinion 822, to an idler gear 844. The idler gear 844 transmits to idler 845. Flywheel 801 includes a pinion 803 which is meshed to idler 845, such that idler 845 drives flywheel 801. Similarly, flywheel 802 includes a pinion 804 which is meshed to idler 844, such that idler 844 drives flywheel 802. This configuration results in flywheels 801/802 spinning in opposite angular direction but at effectively the same rotational speed upon rotation of motor 820.

One end of the swing arm 851 includes a pivot that shares an axis of rotation with idler gear 845 and the end of swing arm 851 distal to this end includes a pivot that shares an axis of rotation with flywheel 801, such that flywheel 801 can orbit idler gear 845 along the direction 891 while maintaining gear-mesh between idler gear 845 and the flywheel pinion 803. Similarly, One end of the swing arm 852 includes a pivot that shares an axis of rotation with idler gear 844 and the end of swing arm 852 distal to this end includes a pivot that shares an axis of rotation with flywheel 802, such that flywheel 802 can orbit idler gear 844 along the direction 892 while maintaining gear-mesh between idler gear 844 and the flywheel pinion 804. This configuration allows the flywheels 801/802 to be spaced apart from one another to achieve any desired center-to-center spacing, as well as any desired projectile pinch, while allowing the flywheels 801/802 to be driven by idlers 844/845.

The flywheel locating elements 831/832 position the flywheels such that the swing arm 852 is at an angular distance defined by angle 893 with respect to the housing 801 longitudinal plane 895 and such that the swing arm 851 is at an angular distance defined by angle 894 with respect to the housing 801 longitudinal plane 895. FIG. 17C illustrates an arrangement where angle 893 equals angle 892 such that direction of projectile launch 896 is nominally in-line with the longitudinal plane 895. The flywheel locating elements 831/832 may be adjusted to vary the center-to-center distance between the flywheels 801/802 such that projectiles of various diameters may be launched from the launching apparatus 800 without the need to change the flywheels 801/802. The projectile guiding elements 861/862 may also be configured or adjusted to accommodate projectiles of various diameters. Further, the flywheels 801/802 could be expanding or traditional flywheels, such that the variable center-to-center mechanism 800, as show for example in FIG. 17A, could be applied to any type of flywheel.

Figure 17D:
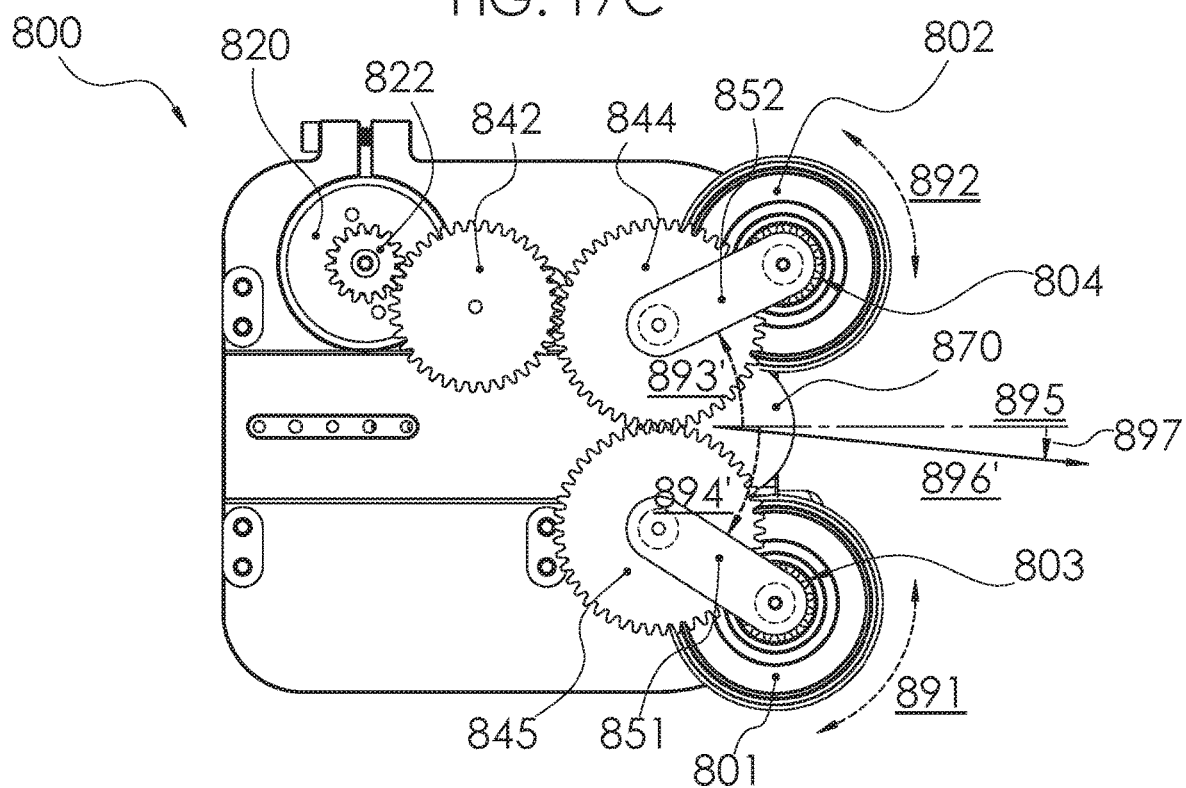

Referring now to FIG. 17D, where the flywheel locating elements 831/832 are configured such that angle 893' is, for example, less than angle 894' such that direction of projectile launch 896' is not in-line with the longitudinal plane 895 such that the projectile 870 will exit the launching apparatus 800 at an angle 897 with respect to the longitudinal plane 895. The angle 897 may be adjusted to true-up the direction of launch of the projectile 870 by adjusting the angles 893' and 894' by varying the arrangement of the flywheel locating elements 831/832.

While the flywheel locating elements 831/832 and projectile guiding elements 861/862 are shown as fixed element in FIGS. 17A and 17B, one skilled in the art understands that the flywheel locating elements 831/832 can be implemented as varying elements through any suitable mechanism such that a user may change the arrangement or configuration of flywheel locating elements 831/832 on the fly through any suitable user-interface setting system.

The toys for foam projectile launch generating platforms where methods may be embodied as different toy products in a wide variety of shapes, sizes and components. It is to be understood that the embodiments of the inventions herein described are merely illustrative of the application of the principles of the inventions.

While a particular embodiments of the present inventions have been shown and described, it will be obvious to those skilled in the art that changes and modifications may be made without departing form the inventions in its broader aspects. Therefore, the aim in the appended claims is to cover all such changes and modifications as fall within the true spirit and scope to the inventions. The matter set forth in the foregoing description and accompanying drawings is offered by way of illustration only and not as a limitation. The actual scope to the inventions are intended to be defined on the following claims when viewed in their proper perspective based on the prior art.

What is claimed is:

1. A toy projectile launch apparatus, comprising:
a carriage structure including a launch channel for injecting projectiles into the launch channel;
a propelling mechanism for receiving projectiles from the launch channel with the carriage structure, the propelling mechanism including a pair of flywheels in communication with the launch channel;
said flywheels each including an elastomeric expanding flywheel structure mechanism each comprising a flywheel hub and an expanding elastomeric tire therewith, allowing the expanding elastomeric tire to move inward and outward at its circumference;
a flywheel center-to-center spacing and launch direction adjustment mechanism including a swing arm attachment with the pair of flywheels to swing about a longitudinal plane of the propelling mechanism;
a launching motor; and
a transmission gear assembly powered with the motor for driving the pair of flywheels to activate the propelling mechanism.

2. The toy projectile launch apparatus recited in claim 1, wherein the hub structure of the elastomeric expanding flywheel structure mechanism retains said elastomeric expanding tire comprising an elastomeric expanding tire rim, and an elastomeric expanding tire stem.

3. The toy projectile launch apparatus recited in claim 2, wherein the hub structure of the elastomeric expanding flywheel structure mechanism retains said elastomeric expanding tire between two hub parts.

4. The toy projectile launch apparatus recited in claim 3, wherein the two hub parts comprise a hub stem cavity, and a retaining feature.

5. The toy projectile launch apparatus recited in claim 2, wherein the elastomeric expanding tire rim allows for a curved profile with the free-ends of the tire rim bending radially outward with a centrifugal load thereat.

6. The toy projectile launch apparatus recited in claim 5, wherein the elastomeric expanding tire comprises a spine allowing for an axially thinner state of said spine according to a ratio due to the radial expansion of the elastomeric expanding tire.

7. The toy projectile launch apparatus recited in claim 2, wherein the elastomeric expanding tire rim comprises angled inner rim and outer rim walls and a tapered elastomeric expanding tire retaining feature.

8. The toy projectile launch apparatus recited in claim 1, wherein the hub structure of the elastomeric expanding flywheel structure mechanism retains said elastomeric expanding tire comprising a high mass elastomeric expanding tire rim with straight rim walls and a retaining feature with a rounded outer wall and a hub structure that compresses the elastomeric expanding tire retaining feature.

9. The toy projectile launch apparatus recited in claim 1, wherein the hub structure of the elastomeric expanding flywheel structure mechanism retains said elastomeric expanding tire comprising an elastomeric expanding tire rim with a filleted inner rim wall and a straight-walled retaining feature situated radially adjacent to the elastomeric expanding tire rim.

10. The toy projectile launch apparatus recited in claim 1, wherein the flywheel center-to-center spacing and launch direction adjustment mechanism is attached to swing non-symmetrically about a longitudinal plane of the propelling mechanism.

11. The toy projectile launch apparatus recited in claim 1, wherein the swing arm attachment of the flywheel center-to-center spacing and launch direction adjustment mechanism is attached with the flywheels to swing symmetrically about a longitudinal plane of the propelling mechanism.

12. The toy projectile launch apparatus recited in claim 1, wherein the swing arm attachment of the flywheel center-to-center spacing and launch direction adjustment mechanism is attached with the flywheels to swing non-symmetrically about a longitudinal plane of the propelling mechanism where the launch direction of the projectile is not aligned with said longitudinal plane.

13. The toy projectile launch apparatus recited in claim 1, wherein the flywheels include an elastomeric expanding flywheel structure mechanism comprising a flywheel cage and an expanding elastomeric tire therein, wherein the expanding elastomeric tire includes numerous tire lugs that are free to move inward and outward at peripheral apertures along the circumference of the flywheel cage.

14. A toy projectile launch apparatus, comprising:
a magazine for receiving and holding projectiles;
a carriage structure including a launch channel being supporting with the magazine;

a feeding mechanism in communication with the magazine for injecting projectiles from the magazine into the launch channel;

a propelling mechanism coupled with the carriage structure and including flywheels in communication with the launch channel for propelling projectiles from the magazine;

said flywheels each including an elastomeric expanding flywheel structure mechanism each comprising a flywheel hub and an expanding elastomeric tire therewith, allowing the expanding elastomeric tire to move inward and outward at its circumference;

a feeding and launching motor;

a transmission gear assembly powered with the motor to sequence and activate the feeding mechanism and the propelling mechanism; and a clutch in communication transmission gear assembly to activate the feeding mechanism with the motor.

15. The toy projectile launch apparatus recited in claim 14, wherein the clutch in communication transmission gear assembly powered with the motor operates to sequence and activate the feeding mechanism and the propelling mechanism.

16. The toy projectile launch apparatus recited in claim 15, wherein the clutch comprises a mechanically actuated clutch to initiate the feeding mechanism upon the flywheels having desired rotational speed for propelling projectiles.

17. A toy projectile launch method, comprising:
receiving and holding projectiles in a magazine for storage;

supporting a launch channel being with the magazine on a carriage structure;

injecting projectiles from the magazine into the launch channel with a feeding mechanism in communication with the magazine;

coupling a propelling mechanism at the carriage structure, the propelling mechanism including elastomeric expanding flywheels for expanding elastomeric tires to move inward and outward at their circumference while in communication with the launch channel for propelling projectiles from the magazine;

transmitting power with a transmission element to single feeding/launching motor to sequence and activate the feeding mechanism and the propelling mechanism in sequence from the transmission element; and clutching the transmission element to activate the feeding mechanism selectively in communication with the single feeding/launching motor.

18. The toy projectile launch method recited in claim 17, further comprising the step of sequencing to activate the feeding mechanism and the propelling mechanism with the clutching step in communication transmission gear assembly.

19. The toy projectile launch method recited in claim 17, further comprising the step of biasing a cam follower from the transmission gear assembly between a first extended and a second retracted position to engage and shuttle additional projectiles from the magazine, returning to the second retracted position to engage another projectile from the magazine.

20. The toy projectile launch method recited in claim 17, wherein the clutching step comprises mechanically actuating a clutch to initiate the feeding mechanism upon the flywheels having desired rotational speed for propelling projectiles.

\* \* \* \* \*